(12) United States Patent
Kanaya et al.

(10) Patent No.: US 11,439,566 B2
(45) Date of Patent: Sep. 13, 2022

(54) WALKING ASSIST DEVICE

(71) Applicant: JTEKT CORPORATION, Kariya (JP)

(72) Inventors: Manabu Kanaya, Nara (JP); Yoshiyuki Shibata, Toyota (JP); Shinji Takeuchi, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 789 days.

(21) Appl. No.: 16/285,298

(22) Filed: Feb. 26, 2019

(65) Prior Publication Data
US 2019/0262216 A1    Aug. 29, 2019

(30) Foreign Application Priority Data

Feb. 27, 2018  (JP) .............................. JP2018-033292
Sep. 3, 2018  (JP) .............................. JP2018-164901

(51) Int. Cl.
*A61H 3/04* (2006.01)
*B62B 5/06* (2006.01)
(Continued)

(52) U.S. Cl.
CPC .............. *A61H 3/04* (2013.01); *A61H 1/0277* (2013.01); *A61H 1/0281* (2013.01);
(Continued)

(58) Field of Classification Search
CPC ...... A61H 3/04; A61H 1/0277; A61H 1/0281; A61H 2003/043; A61H 2003/046;
(Continued)

(56) References Cited

U.S. PATENT DOCUMENTS 6,296,263 B1 * 10/2001 Schultz .................... A61H 3/04
                                                       280/304.5
7,669,863 B2 * 3/2010 Steiner ..................... A61H 3/04
                                                       280/648
(Continued)

FOREIGN PATENT DOCUMENTS

DE   10 2016 201 743 B3   4/2017
EP       2 845 785 A1    3/2015
(Continued)

OTHER PUBLICATIONS

Extended European Search Report dated Jul. 1, 2019 in Patent Application No. 19159122.1, 8 pages.
(Continued)

*Primary Examiner* — Garrett K Atkinson
(74) *Attorney, Agent, or Firm* — Oblon, McClelland, Maier & Neustadt, L.L.P.

(57) ABSTRACT

A walking assist device has a frame, fixed handles, rails provided with movable handles, front wheels, rear wheels and that serve as drive wheels, drive units, a battery, and a drive control unit, and travels forward or rearward together with a user that walks while grasping the fixed handles or the movable handles. The walking assist device has an operation mode switching unit that switches between a training mode, in which a load is applied to operation of the body of the user performed as the user walks, and an assist mode in which a load on operation of the body of the user performed as the user walks is alleviated.

15 Claims, 39 Drawing Sheets

(51) Int. Cl.
| | |
|---|---|
| *A63B 23/12* | (2006.01) |
| *A63B 21/00* | (2006.01) |
| *A63B 23/035* | (2006.01) |
| *A63B 23/04* | (2006.01) |
| *A61H 1/02* | (2006.01) |
| *B62B 3/00* | (2006.01) |
| *B62B 5/00* | (2006.01) |
| *B62B 5/04* | (2006.01) |
| *A63B 22/00* | (2006.01) |
| *A63B 21/005* | (2006.01) |
| *A63B 22/20* | (2006.01) |
| *A61H 3/00* | (2006.01) |

(52) U.S. Cl.
CPC ...... *A63B 21/4045* (2015.10); *A63B 21/4047* (2015.10); *A63B 23/03516* (2013.01); *A63B 23/03533* (2013.01); *A63B 23/03575* (2013.01); *A63B 23/04* (2013.01); *A63B 23/12* (2013.01); *A63B 23/1209* (2013.01); *B62B 5/06* (2013.01); *A61H 2003/043* (2013.01); *A61H 2003/046* (2013.01); *A61H 2201/0173* (2013.01); *A61H 2201/0176* (2013.01); *A61H 2201/1207* (2013.01); *A61H 2201/1215* (2013.01); *A61H 2201/1261* (2013.01); *A61H 2201/14* (2013.01); *A61H 2201/1635* (2013.01); *A61H 2201/1664* (2013.01); *A61H 2201/1669* (2013.01); *A61H 2201/1676* (2013.01); *A61H 2201/5007* (2013.01); *A61H 2201/5061* (2013.01); *A61H 2201/5064* (2013.01); *A61H 2201/5069* (2013.01); *A61H 2201/5071* (2013.01); *A61H 2201/5079* (2013.01); *A61H 2201/5082* (2013.01); *A61H 2201/5084* (2013.01); *A61H 2201/5097* (2013.01); *A61H 2203/0406* (2013.01); *A61H 2205/06* (2013.01); *A61H 2205/065* (2013.01); *A61H 2230/06* (2013.01); *A61H 2230/25* (2013.01); *A61H 2230/50* (2013.01); *A63B 21/0058* (2013.01); *A63B 21/4035* (2015.10); *A63B 22/0012* (2013.01); *A63B 22/20* (2013.01); *A63B 23/0405* (2013.01); *A63B 2022/0094* (2013.01); *B62B 5/004* (2013.01); *B62B 5/0069* (2013.01); *B62B 5/0404* (2013.01)

(58) Field of Classification Search
CPC .... A61H 2201/0173; A61H 2201/0176; A61H 2201/1207; A61H 2201/1215; A61H 2201/1261; A61H 2201/14; A61H 2201/1635; A61H 2201/1664; A61H 2201/1669; A61H 2201/1676; A61H 2201/5007; A61H 2201/5061; A61H 2201/5064; A61H 2201/5069; A61H 2201/5071; A61H 2201/5079; A61H 2201/5082; A61H 2201/5084; A61H 2201/5097; A61H 2203/0406; A61H 2205/06; A61H 2205/065; A61H 2230/06; A61H 2230/25; A61H 2230/50; A61H 3/00; A61H 2003/006; A61H 1/0237; A63B 21/4045; A63B 21/4047; A63B 23/03516; A63B 23/03533; A63B 23/03575; A63B 23/04; A63B 23/12; A63B 23/1209; A63B 21/0058; A63B 21/4035; A63B 22/0012; A63B 22/20; A63B 23/0405; A63B 2022/0094; A63B 21/023; A63B 21/0414; A63B 21/05; A63B 21/055; A63B 2220/13; A63B 2220/51; A63B 26/00; B62B 3/00; B62B 5/06; B62B 5/004; B62B 5/0069; B62B 5/0404; B62B 5/0043; B62B 5/0073; G01L 5/22; G01L 5/00

See application file for complete search history.

(56) References Cited

U.S. PATENT DOCUMENTS

| | | | | |
|---|---|---|---|---|
| 7,708,120 | B2* | 5/2010 | Einbinder | F16C 1/10 188/2 A |
| 7,900,940 | B1* | 3/2011 | Vidmar | A61H 3/008 280/271 |
| 8,007,409 | B2* | 8/2011 | Ellis | A63B 21/0616 482/54 |
| 8,627,909 | B2* | 1/2014 | Chang | A61H 3/04 180/19.2 |
| 9,770,377 | B2* | 9/2017 | Isozumi | A61G 5/14 |
| 10,765,586 | B2* | 9/2020 | Liang | A61H 1/00 |
| 10,874,562 | B2* | 12/2020 | Liang | A61G 5/1059 |
| 2007/0194547 | A1* | 8/2007 | Steiner | A61H 3/04 280/87.021 |
| 2008/0129016 | A1* | 6/2008 | Willis | A61G 5/08 280/639 |
| 2009/0045021 | A1* | 2/2009 | Einbinder | B60T 17/22 74/502.2 |
| 2009/0298653 | A1* | 12/2009 | Rodetsky | A61H 3/04 280/200 |
| 2010/0083994 | A1* | 4/2010 | Liu | A61G 5/02 135/67 |
| 2012/0000496 | A1* | 1/2012 | Razon | A61H 3/04 135/85 |
| 2012/0187661 | A1* | 7/2012 | Kim | A61H 3/04 280/47.38 |
| 2015/0051519 | A1 | 2/2015 | Morbi et al. | |
| 2015/0053042 | A1 | 2/2015 | Shirakawa et al. | |
| 2017/0001656 | A1 | 1/2017 | Katayama et al. | |
| 2017/0326019 | A1* | 11/2017 | Bramsiepe | B62B 5/064 |
| 2019/0290513 | A1* | 9/2019 | Liang | A61G 5/1059 |
| 2019/0290958 | A1* | 9/2019 | Shahriar | A63B 23/03516 |
| 2020/0352815 | A1* | 11/2020 | Raja | B60B 19/003 |
| 2021/0155278 | A1* | 5/2021 | Raja | B62B 5/0036 |

FOREIGN PATENT DOCUMENTS

| | | |
|---|---|---|
| JP | 3156367 B2 | 4/2001 |
| JP | 2007-301071 A | 11/2007 |
| JP | 2011-115323 A | 6/2011 |
| JP | 5706016 B2 | 4/2015 |
| JP | 2017-12546 | 1/2017 |
| JP | 2018-502549 A | 1/2018 |
| KR | 10-0717397 B1 | 5/2007 |
| WO | WO 2016/136370 A1 | 9/2016 |
| WO | 2017/032376 A1 | 3/2017 |
| WO | WO 2017/104847 A1 | 6/2017 |

OTHER PUBLICATIONS

Japanese Office Action issued in Japanese Patent Application No. 2018-164901 dated Jun. 7, 2022, (w/ English Translation).

* cited by examiner

FIG. 9

| CONDITION | MANUAL MODE SWITCHING UNIT 76a | STATE OF MOVABLE HANDLES (20R AND 20L) | | STATE OF FIXED HANDLES (20FR AND 20FL) |
|---|---|---|---|---|
| | | MOVABLE HANDLE GRASPING STATE (1 = GRASPED, 0 = NOT GRASPED) | ARM SWING STATE (1 = WITH ARM SWING, 0 = WITHOUT ARM SWING) | FIXED HANDLE GRASPING STATE (1 = GRASPED, 0 = NOT GRASPED) |
| C1 | ASSIST MODE | 0 | 0 | 1 |
| C2 | ASSIST MODE | 1 | 0 | 0 |
| C3 | TRAINING MODE 1 | 1 | 1 | 0 |
| C4 | TRAINING MODE 2 | 1 | 1 | 0 |
| C5 | TRAINING MODES 3 AND 4 | 1 | 0 | 0 |
| C6 | TRAINING MODES 3 AND 4 | 0 | 0 | 1 |

| CONDITION | CURRENT OPERATION MODE | STATE OF MOVABLE HANDLES (20R AND 20L) | | STATE OF FIXED HANDLES (20FR AND 20FL) |
|---|---|---|---|---|
| | | MOVABLE HANDLE GRASPING STATE (1 = GRASPED, 0 = NOT GRASPED) | ARM SWING STATE (1 = WITH ARM SWING, 0 = WITHOUT ARM SWING) | FIXED HANDLE GRASPING STATE (1 = GRASPED, 0 = NOT GRASPED) |
| CR1 | ASSIST MODE 1 (AM1) | – | – | 0 |
| CR2 | ASSIST MODE 2 (AM2) | 0 | – | – |
| CR3 | TRAINING MODE 1 (TR1) | 0 | – | – |
| CR4 | TRAINING MODE 2 (TR2) | 0 | – | – |
| CR5 | TRAINING MODE 3 (TR3) | 0 | – | – |
| CR6 | TRAINING MODE 4 (TR4) | – | – | 0 |

FIG. 11
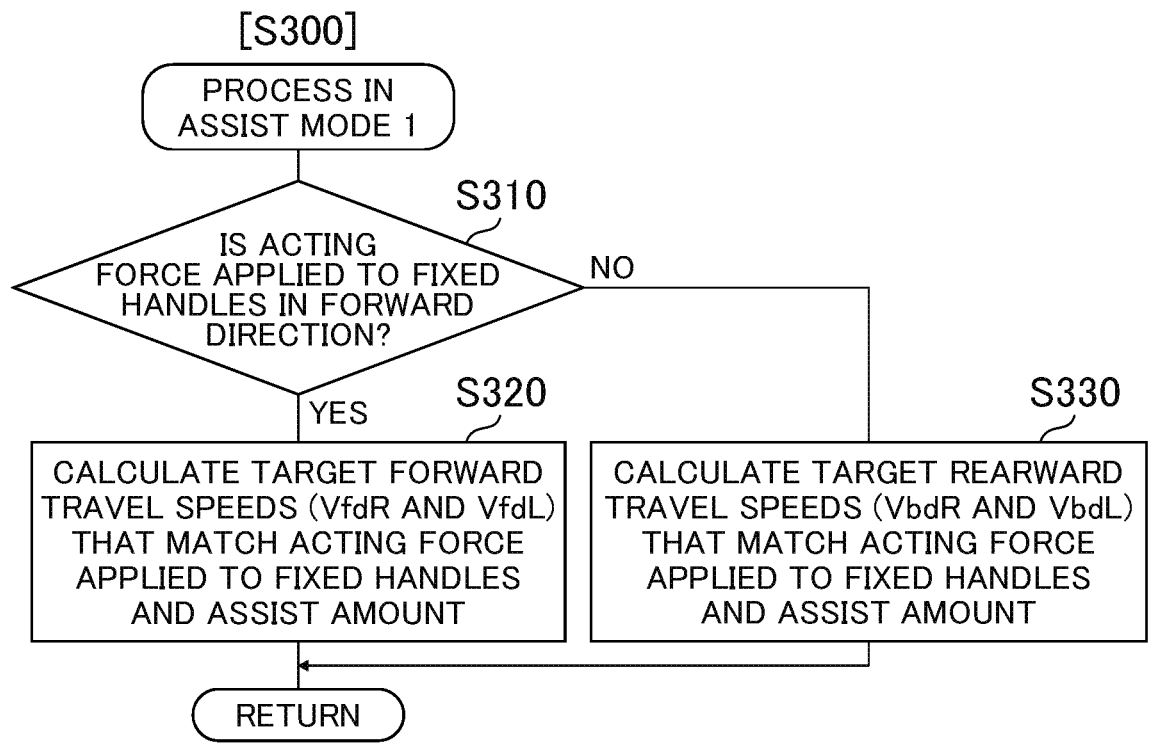
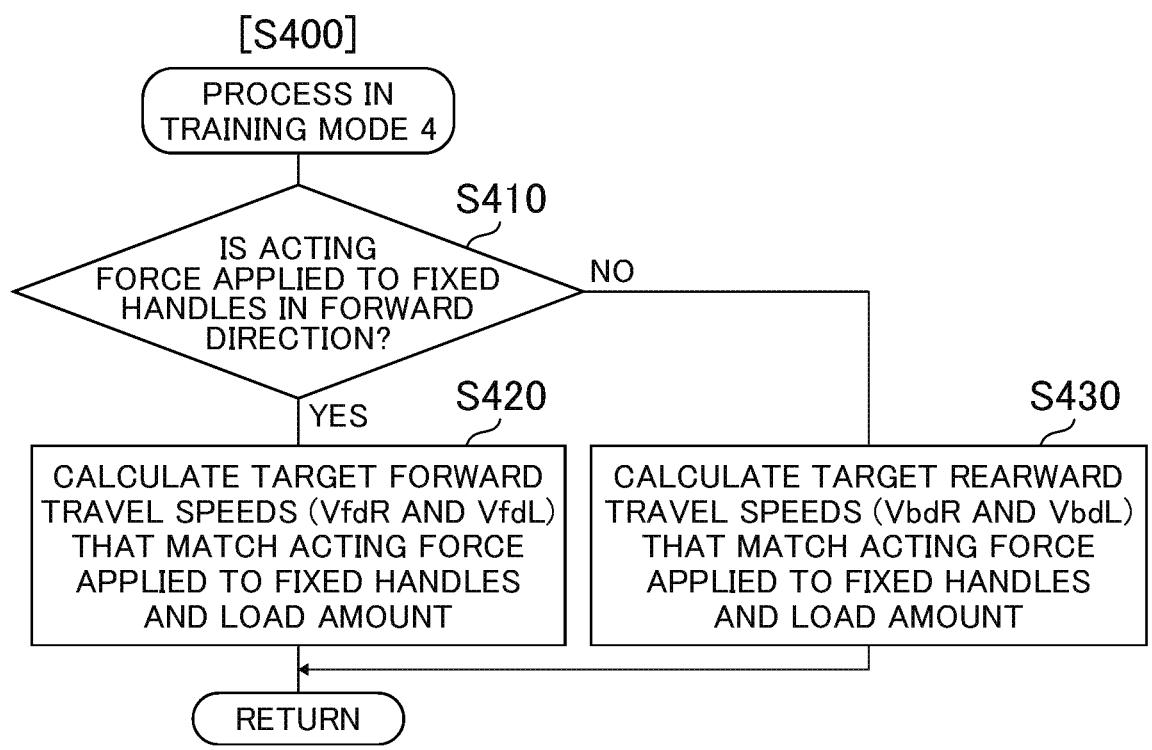

FIG. 15B

[S1300] DETERMINATION OF DEVIATION BETWEEN TRAVEL SPEED OF WALKING ASSIST DEVICE AND WALKING SPEED OF USER

S1320: IS $|Vhfd + Vhbd|$ LESS THAN $\Delta Verr$ AND ARE MOVABLE HANDLES AT POSITIONS OTHER THAN VICINITY OF FRONT END OR VICINITY OF REAR END OF MOVABLE RANGE OF RAILS?

- YES → S1330: TRAVEL SPEED OF WALKING ASSIST DEVICE ← SAME AS WALKING SPEED OF USER
- NO → S1340: IS $|Vhfd|$ MORE THAN $|Vhbd|$ OR ARE MOVABLE HANDLES IN VICINITY OF FRONT END OF MOVABLE RANGE OF RAILS?
  - YES → S1350: TRAVEL SPEED OF WALKING ASSIST DEVICE ← LOWER THAN WALKING SPEED OF USER
  - NO → S1360: TRAVEL SPEED OF WALKING ASSIST DEVICE ← HIGHER THAN WALKING SPEED OF USER

RETURN

FIG. 16

| MODE TRANSITION CONDITION (1 = WITHOUT ABNORMALITY, 0 = WITH ABNORMALITY) | BODY STATE | | ATMOSPHERIC STATE | VEHICLE BODY STATE | | | |
|---|---|---|---|---|---|---|---|
| | HEART RATE (NORMAL = 1, ABNORMAL = 0) | BODY TEMPERATURE (NORMAL = 1, ABNORMAL = 0) | OUTSIDE TEMPERATURE (COMFORTABLE = 1, UNCOMFORTABLE = 0) | INCLINATION OF VEHICLE BODY (NO = 1, YES = 0) | IMPACT ON VEHICLE BODY (NO = 1, YES = 0) | WALKING DISTANCE (SHORT = 1, LONG = 0) | WALKING TIME (SHORT = 1, LONG = 0) |
| 1 | 1 | 1 | 1 | 1 | 1 | 1 | 1 |
| 0 | 0 | – | – | – | – | – | – |
| 0 | – | 0 | – | – | – | – | – |
| 0 | – | – | 0 | – | – | – | – |
| 0 | – | – | – | 0 | – | – | – |
| 0 | – | – | – | – | 0 | – | – |
| 0 | – | – | – | – | – | 0 | – |
| 0 | – | – | – | – | – | – | 0 |

FIG. 17

| CONDI-TION | STATE OF MANUAL MODE SWITCHING UNIT 76a | STATE OF MOVABLE HANDLES (20R AND 20L) | | FIXED HANDLES (20FR AND 20FL) | MODE TRANSITION CONDITION (1 = WITHOUT ABNORMAL-ITY, 0 = WITH ABNORMALITY) |
|---|---|---|---|---|---|
| | | MOVABLE HANDLE GRASPING STATE (1 = GRASPED, 0 = NOT GRASPED) | ARM SWING WITH MOVABLE HANDLES (1 = WITH ARM SWING, 0 = WITHOUT ARM SWING) | FIXED HANDLE GRASPING STATE (1 = GRASPED, 0 = NOT GRASPED) | |
| S1 | TRAINING MODE 1 | 1 | 1 | 0 | 1 |
| S2 | TRAINING MODE 1 | 1 | 1 | 0 | 0 |
| S3 | TRAINING MODES 3 AND 4 | 1 | 0 | 0 | 1 |
| S4 | TRAINING MODES 3 AND 4 | 1 | 0 | 0 | 0 |
| S5 | TRAINING MODES 3 AND 4 | 0 | 0 | 1 | 1 |
| S6 | TRAINING MODES 3 AND 4 | 0 | 0 | 1 | 0 |

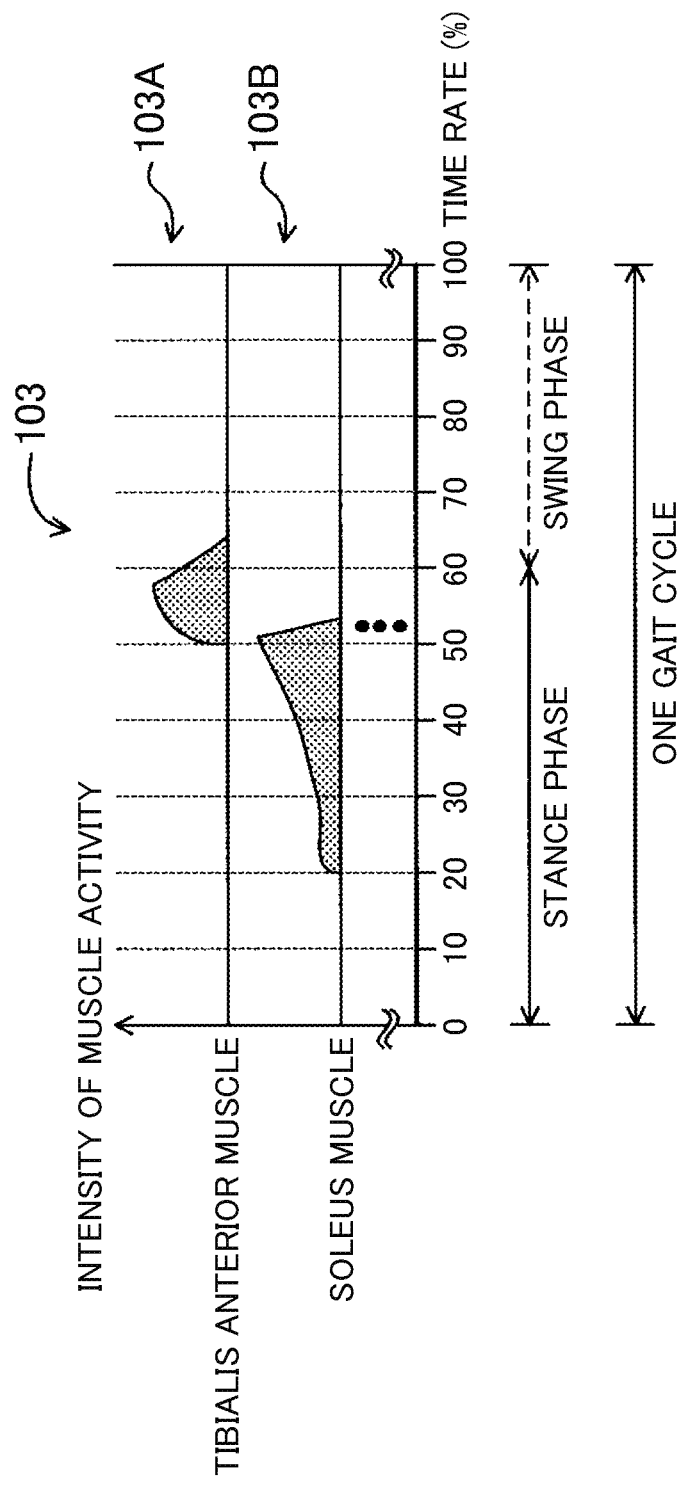

WALKING ASSIST DEVICE

INCORPORATION BY REFERENCE

The disclosures of Japanese Patent Applications No. 2018-33292 and No. 2018-164901 respectively filed on Feb. 27, 2018 and Sep. 3, 2018, each including the specification, drawings and abstract, are incorporated herein by reference in their entireties.

BACKGROUND OF THE INVENTION

1. Field of the Invention

The present invention relates to a walking assist device.

2. Description of the Related Art

In order for a user that can walk on his/her own to walk with better quality, it is very important to swing his/her arms correctly in synchronization with his/her legs in a correct posture with his/her body trunk straight without leaning on a walker.

Japanese Patent Application Publication No. 2017-12546 (JP 2017-12546 A), for example, describes a hand cart (corresponding to the walking assist device) that generates an assist force for assisting movement of the hand cart in a travel direction in accordance with the magnitude and the direction of a handle force which is a force with which a user pushes the hand cart while grasping handlebars (corresponding to the fixed handles). The hand cart has a rotational angle sensor and an inclination angle sensor, and can travel while driving wheels such that the user can walk stably by pushing the hand cart on the basis of information such as the travel direction and the inclination angle of the vehicle body in various use situations.

The hand cart described in JP 2017-12546 A drives the wheels in accordance with a force applied to the hand cart on the assumption that the user "pushes" or "pulls" the hand cart. That is, the hand cart travels while assisting a force applied to the hand cart by the user. Thus, the user always receives assist from the hand cart during use of the hand cart, which alleviates a load on his/her body due to the hand cart. A hand cart with such a walking assist function is often used in the case where elderly people or people that need assistance to walk, in particular. While such a hand cart increases opportunities to walk and facilitates activities, however, the hand cart gradually decreases the physical strength of the user by weakening his/her muscle strength, since the hand cart alleviates a physical load on the user by assisting a force applied to the hand cart by the user.

SUMMARY OF THE INVENTION

It is an object of the present invention to provide a walking assist device that can assist a user in walking and maintain the physical strength of the user by applying a moderate load.

An aspect of the present invention provides a walking assist device including:
a frame;
an arm portion provided on the frame and having a grasp portion that is graspable by a user,
a plurality of wheels provided at a lower end of the frame and including at least one drive wheel;
a drive unit that drives the drive wheel to cause the walking assist device to travel forward or rearward;
a battery that serves as a power source for the drive unit;
a drive control unit that controls the drive unit; and
an operation mode switching unit.

The walking assist device travels forward or rearward together with the user who walks while grasping the grasp portion.

The operation mode switching unit switches between a training mode, in which a load is applied to operation of a body of the user performed as the user walks, and an assist mode, in which a load on operation of the body of the user performed as the user walks is alleviated.

With the walking assist device according to the aspect described above, in the case where the operation mode of the walking assist device is switched to the training mode and in the case where the walking assist device is caused to travel forward or rearward with the user grasping the grasp portion, the walking assist device can apply a load to operation (walk and arm swing) of the body of the user performed during walk. In the case where the operation mode of the walking assist device is switched to the assist mode and in the case where the walking assist device is caused to travel forward or rearward with the user grasping the grasp portion, the walking assist device can alleviate the load on operation (walk) of the body of the user performed during walk. Consequently, it is possible to assist the user in walking, and to suppress a decrease in (maintain) the physical strength of the user by applying a moderate load at the same time.

The walking assist device according to the aspect described above may further include:
a state detection unit that detects at least one of a state of the grasp portion, a state of the walking assist device, a body state of the user, and an atmospheric state around the user; and
a load amount and assist amount change unit that changes a magnitude of the load on the basis of a detection signal from the state detection unit in the training mode, and that changes a magnitude of an assist force on the basis of the detection signal from the state detection unit in the assist mode.

With the aspect described above, the walking assist device has the state detection unit, and can acquire information on at least one of the state of the user grasping the grasp portion, the state of the walking assist device, the body state of the user, and the atmospheric state around the user. The walking assist device can change the magnitude of the load in the training mode, and the magnitude of the assist force in the assist mode, through the load amount and assist amount change unit on the basis of the acquired information. Consequently, the walking assist device can assist the user in walking appropriately in accordance with various states, and can suppress a decrease in physical strength.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9 illustrates conditions for transitioning from a determination mode to various operation modes in FIG. 8 and conditions for returning to the determination mode;

FIG. 11 is a flowchart illustrating the procedure of processes in an assist mode 1 and a training mode 4 in the drive control unit of the walking assist device;

FIG. 15B is a flowchart illustrating the procedure of processes for determination of a turn and determination of the deviation between the travel speed of the walking assist device and the walking speed of a user in the drive control unit of the walking assist device;

FIG. 16 illustrates mode transition conditions for transitioning among the operation modes on the basis of a body state, an atmospheric state, and a vehicle body state;

FIG. 17 illustrates conditions for transitioning to the various operation modes in the case where the operation mode is automatically switched;

FIG. 32 illustrates an example of gait cycle/muscle activity correlation information stored in a storage unit of a walking assist device according to a different embodiment.

DETAILED DESCRIPTION OF EMBODIMENTS

Figure 1:
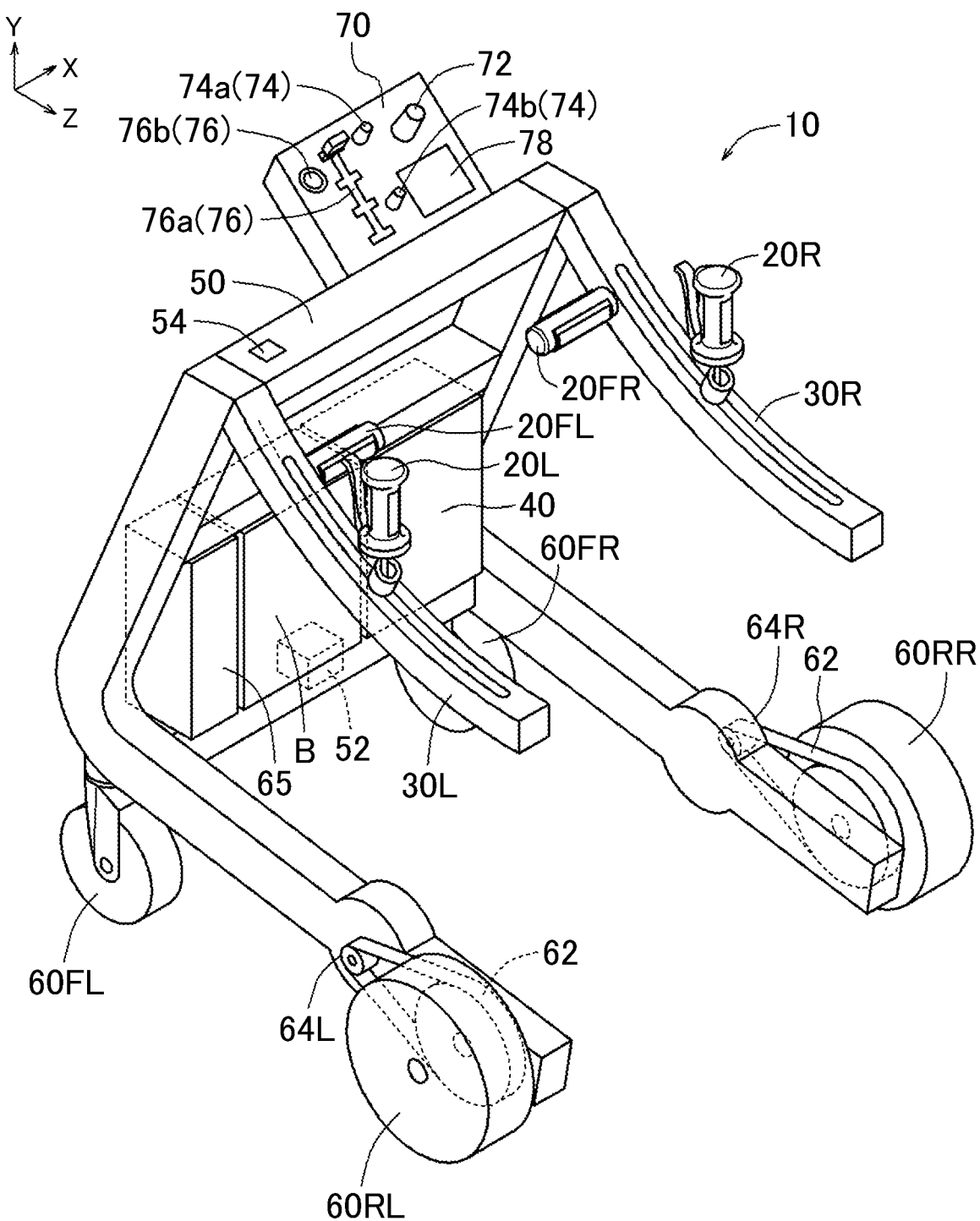
FIG. 1 is a perspective view illustrating the overall configuration of a walking assist device according to a first embodiment.

First and second embodiments that embody a walking assist device according to the present invention will be described in detail below while referring to the drawings. First, the first embodiment will be described with reference to FIGS. 1 to 17. The X axis, the Y axis, and the Z axis in the drawings are orthogonal to each other. In FIG. 1, the Z-axis direction indicates the direction from a front wheel 60FR to a rear wheel 60RR, and the X-axis direction indicates the direction from the left to the right in a frame 50. In the frame 50, the X-axis direction is referred to as "right", the direction opposite to the X-axis direction is referred to as "left", the direction opposite to the Z-axis direction is referred to as "front", and the Z-axis direction is referred to as "rear". In addition, the Y-axis direction is referred to as "upper", the direction opposite to the Y-axis direction is referred to as "lower".

The angular speed for rotation as seen in the X-axis direction is referred to as the pitch angular speed, the angular speed for rotation as seen in the Y-axis direction is referred to as the yaw angular speed, and the angular speed for rotation as seen in the Z-axis direction is referred to as the roll angular speed. The magnitude of the angular speed for clockwise rotation as seen in the direction of each of the X axis, the Y axis, and the Z axis is defined as "positive", and the magnitude of the angular speed for counterclockwise rotation as seen in the direction of each of the X axis, the Y axis, and the Z axis is defined as "negative".

A schematic configuration of a walking assist device 10 according to the first embodiment which implements the present invention will be described with reference to FIG. 1. FIG. 1 illustrates the walking assist device 10 according to the first embodiment. The walking assist device 10 has rails 30R and 30L (corresponding to the arm portion and the handle guide units), a drive control unit 40, the frame 50, front wheels 60FR and 60FL, rear wheels 60RR and 60RL, drive units 64R and 64L (e.g. electric motors), a control panel 70, a battery B, and a regenerated power collecting unit 65.

As illustrated in FIG. 1, the frame 50 is shaped symmetrically in the right-left direction, and the rail 30R and the rail 30L are provided on the right side and the left side, respectively, of the frame 50 so as to extend along the front-rear direction of the frame 50. A user enters a space between the rail 30R and the rail 30L from the open side of the frame 50, and operates the walking assist device 10. The front wheels 60FR and 60FL are follower wheels (turnable caster wheels) provided at the lower front end of the frame 50.

The frame 50 is provided with an outside temperature sensor 54 that detects an outside temperature, and a three-axis acceleration/angular speed sensor 52 that detects inclination of the walking assist device 10 in each of the X-axis direction, the Y-axis direction, and the Z-axis direction. The rear wheels 60RR and 60RL are drive wheels provided at the lower rear end of the frame 50, and are driven by the drive units 64R and 64L, respectively, via belts 62. In the example illustrated in FIG. 1, a pair of right and left rear wheels are provided as the drive wheels, and are independently driven by the respective drive units. The rear wheels 60RR and 60RL can cause the walking assist device 10 to travel forward, travel rearward, make a right turn, and make a left turn.

The rail 30R has a movable handle 20R (corresponding to the grasp portion) and a fixed handle 20FR (corresponding to the grasp portion) that can be grasped by the user. The rail 30L has a movable handle 20L (corresponding to the grasp portion) and a fixed handle 20FL (corresponding to the grasp portion) that can be grasped by the user. The movable handle 20R is provided on the rail 30R, and is movable in the front-rear direction along the rail 30R in accordance with swing of an arm during walk of the user. The movable handle 20L is provided on the rail 30L, and is movable in the front-rear direction along the rail 30L in accordance with swing of an arm during walk of the user.

The rails 30R and 30L of the frame 50 are provided with the fixed handles 20FR and 20FL, respectively. The rails 30R and 30L are not limited to being shaped to be concavely curved upward, and may have a straight shape.

As illustrated in FIG. 1, the control panel 70 is provided at a position at which the control panel 70 is easily operable by the user at the upper portion of the frame 50, for example. The control panel 70 has a main switch 72, an assist amount adjustment volume 74a, a load amount adjustment volume 74b, a manual mode switching unit 76a, an automatic mode switching unit switch 76b, and a monitor 78 (corresponding to the display unit).

The walking assist device 10 has a training mode, in which a load is applied to operation of the body of the user performed as the user walks, and an assist mode, in which the load on operation of the body of the user performed as the user walks is alleviated, as operation modes. The operation mode switching unit 76 has the manual mode switching unit 76a, the automatic mode switching unit switch 76b, and an automatic mode switching unit 76AT (see FIG. 7). The manual mode switching unit 76a switches the operation mode of the walking assist device 10 through a manual operation by the user. The manual mode switching unit 76a allows selection of one of four operation modes including an "assist mode", a "training mode 1", a "training mode 2", and "training modes 3 and 4" (see FIG. 9).

The automatic mode switching unit switch 76b is a switch that permits the drive control unit 40 to automatically switch the operation mode. In the case where the automatic mode switching unit switch 76b is on, the automatic mode switching unit 76AT of the drive control unit 40 automatically switches the operation mode on the basis of information selected through the manual mode switching unit 76a and conditions in FIGS. 16 and 17.

The assist amount adjustment volume 74a is used to adjust the magnitude (assist amount) of an assist force in the assist mode. The load amount adjustment volume 74b is used to adjust the magnitude (load amount) of a load in the training mode.

The monitor 78 is a monitor that displays operation mode information, and displays the charge amount of the battery B, a walking history, information on the body state of the user, a body information history of the user, a surrounding atmospheric state, a load amount/assist amount, an operation history of the walking assist device 10, a vehicle body state, etc., for example, besides the operation mode information.

Figure 2:
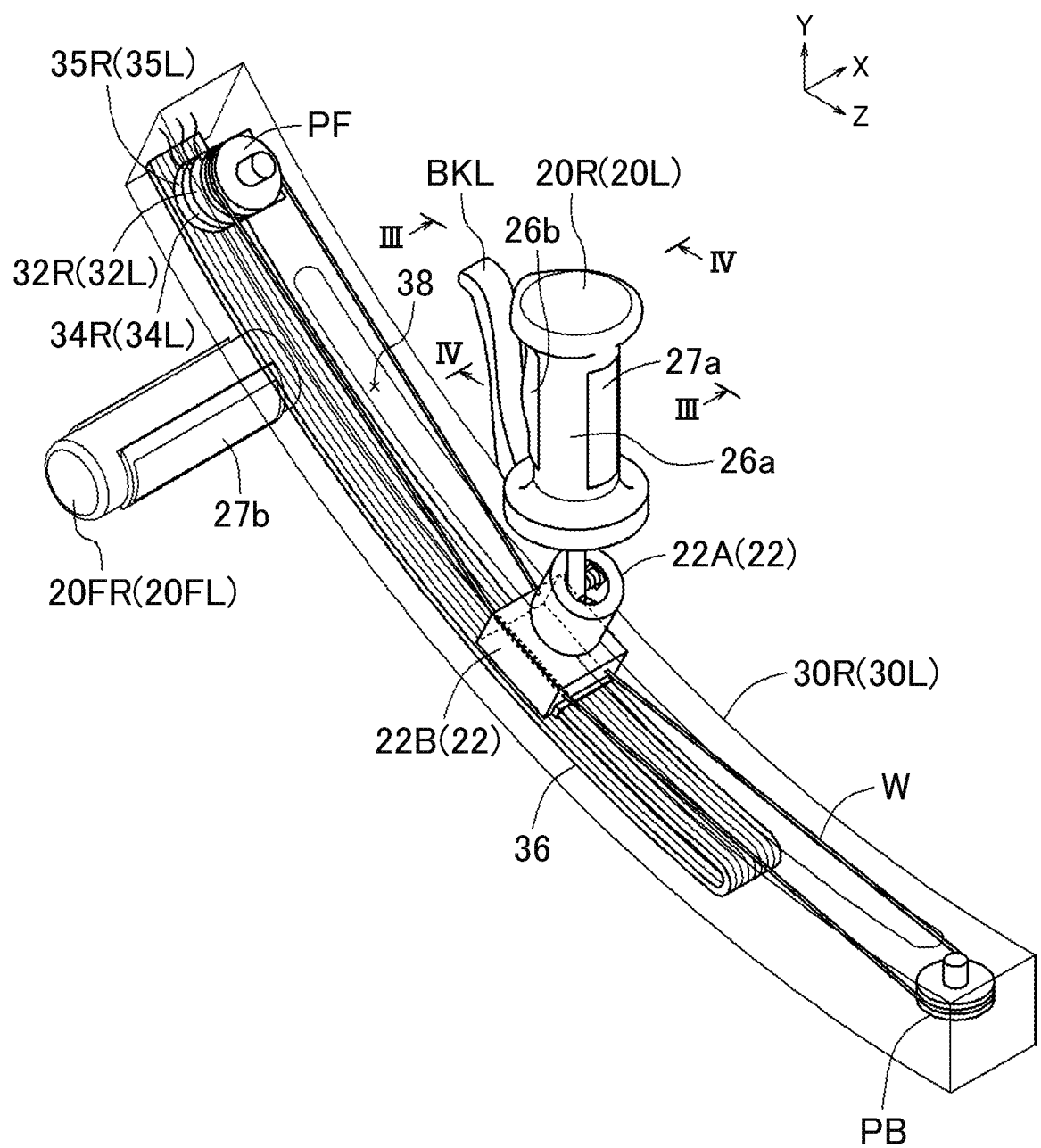
FIG. 2 is a perspective view illustrating the configuration and the function of a movable handle, a fixed handle, and a rail.
Figure 3:
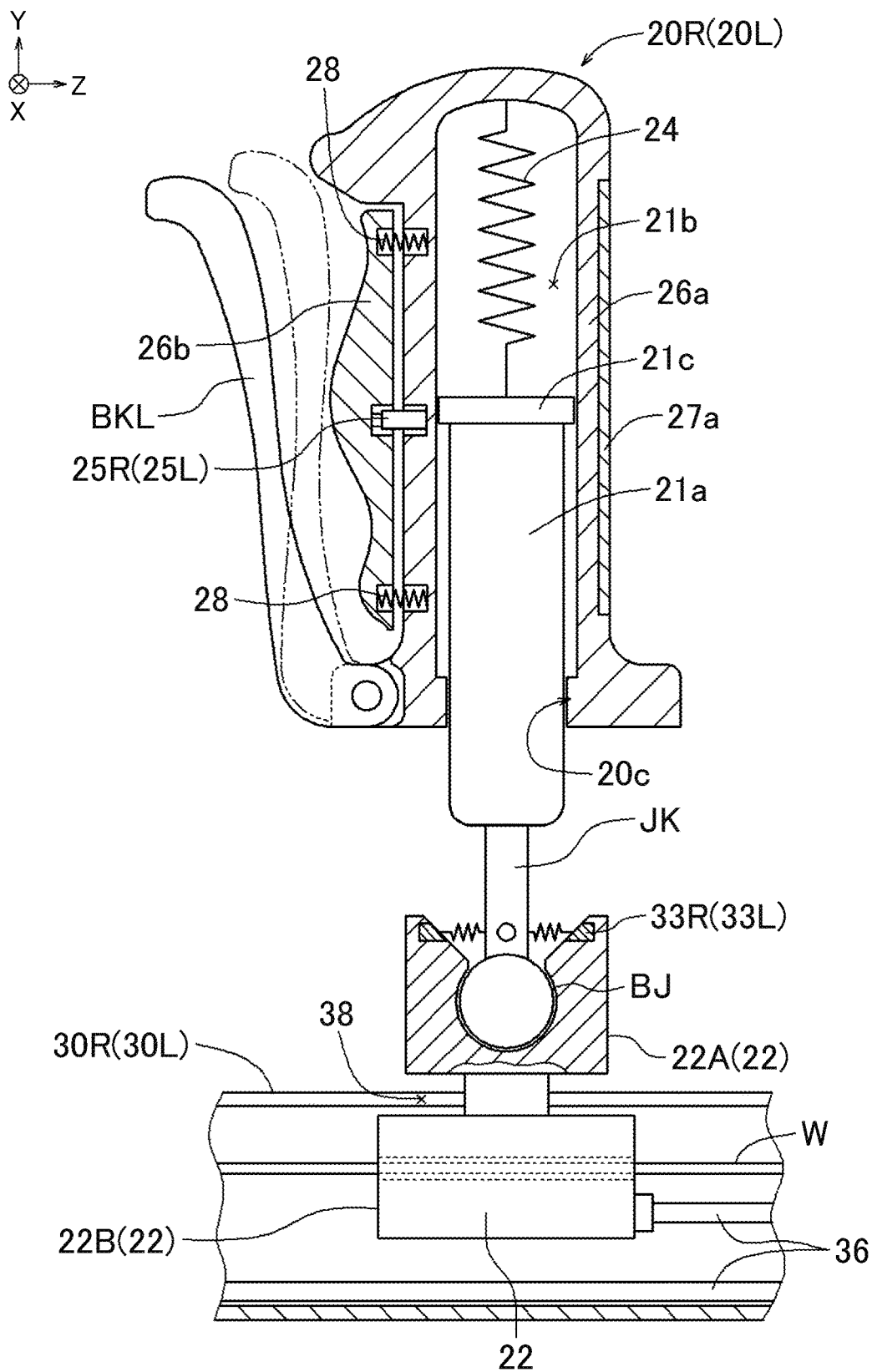
FIG. 3 is a sectional view of the movable handle as seen in the direction in FIG. 2.
Figure 4:
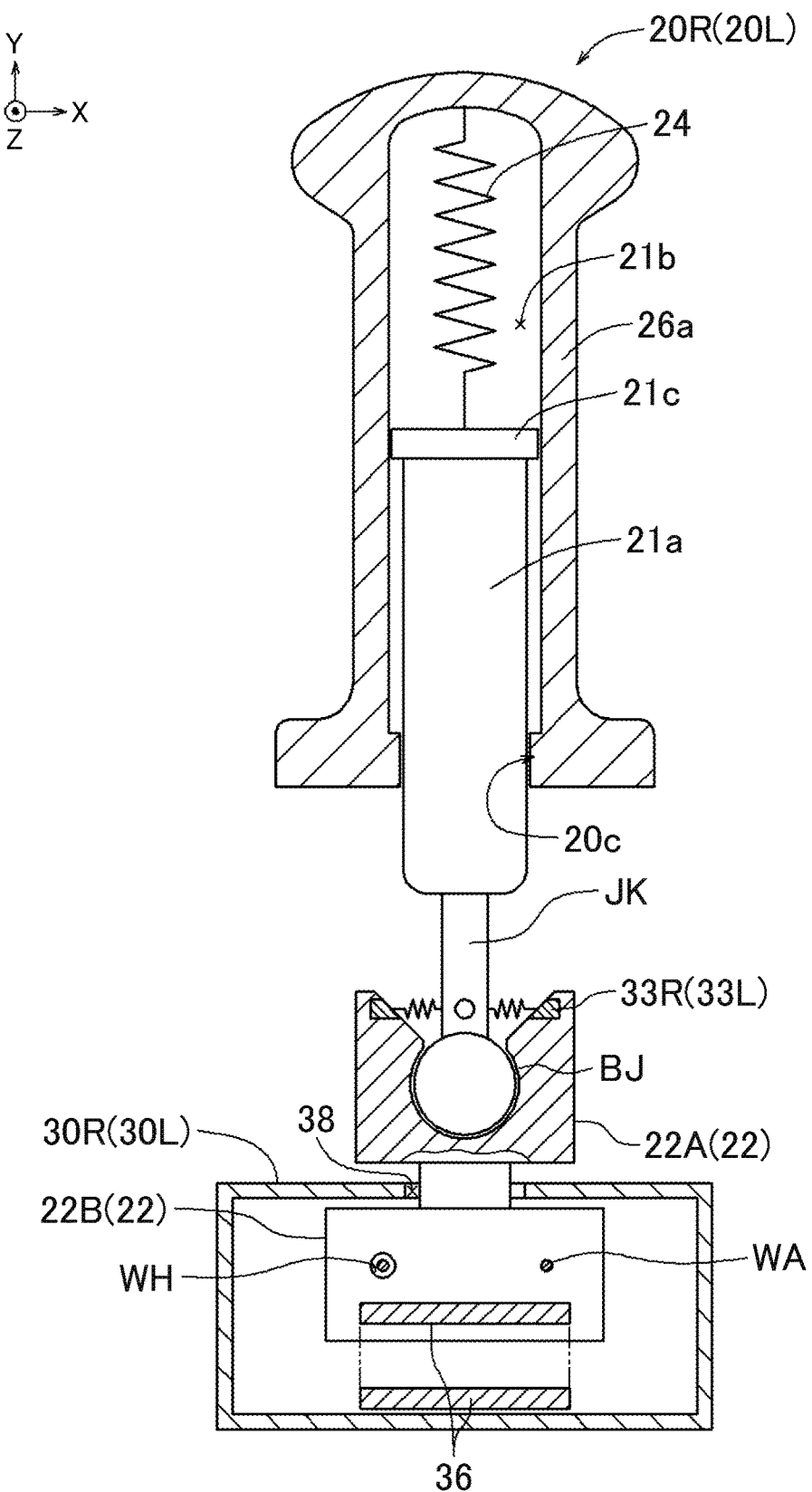
FIG. 4 is a sectional view of the movable handle as seen in the IV-IV direction in FIG. 2.
Figure 5:
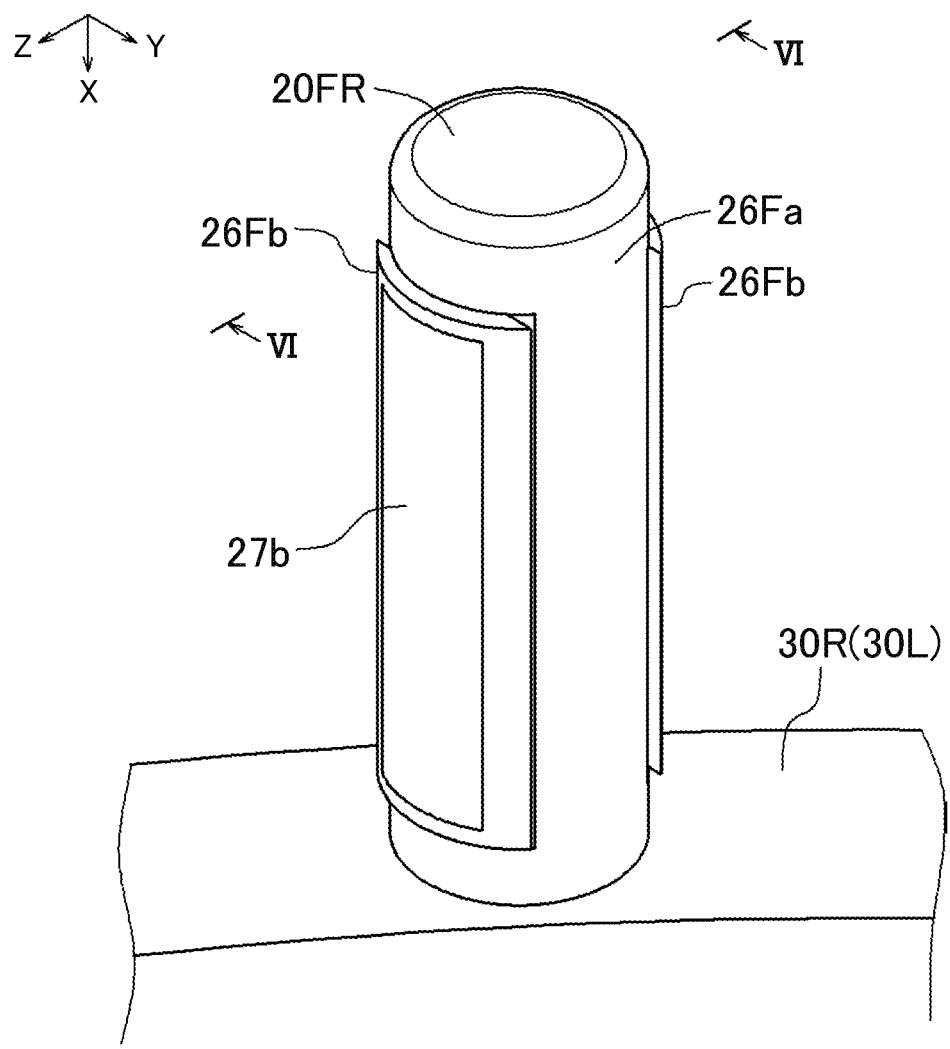
FIG. 5 is an enlarged perspective view of the fixed handle in FIG. 2.
Figure 6:
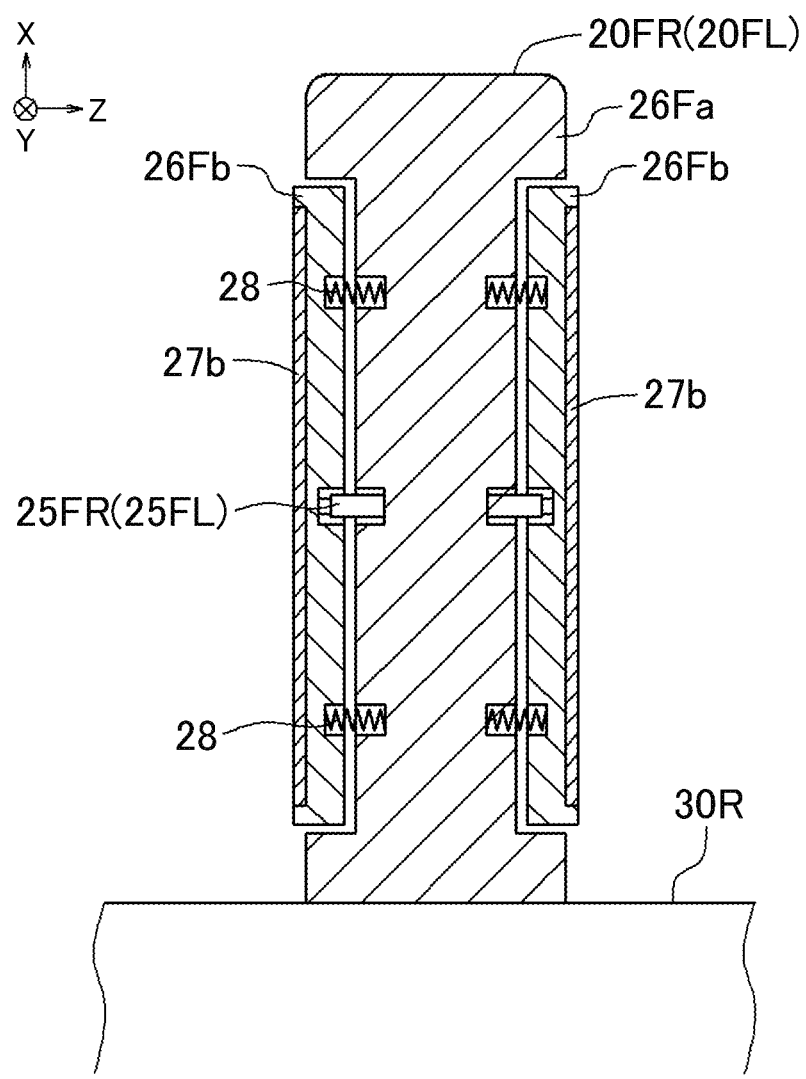
FIG. 6 is a sectional view of the fixed handle as seen in the VI-VI direction in FIG. 5.

The structure of the walking assist device 10 will be described in detail with reference to FIGS. 2 to 6. The walking assist device 10 has a symmetrical structure between the right and the left of the frame 50 except for the control panel 70, the drive control unit 40, the battery B, and the regenerated power collecting unit 65. Therefore, the structure on the right side will be mainly described, and description of the structure on the left side will be omitted. FIG. 2 is a perspective view illustrating the configuration and the function of the movable handle 20R, the fixed handle 20FR, and the rail 30R. FIG. 3 is a sectional view of the movable handle 20R as seen in the direction in FIG. 2. FIG. 4 is a sectional view of the movable handle 20R as seen in the IV-IV direction in FIG. 2. FIG. 5 is an enlarged perspective view of the fixed handle 20FR in FIG. 2. FIG. 6 is a sectional view of the fixed handle 20FR as seen in the VI-VI direction in FIG. 5.

As illustrated in FIG. 2, the rail 30R has the movable handle 20R, pulleys PB and PF, and a wire W. The rail 30R is shaped to be concavely curved upward, and has a rail slit portion 38 that opens upward, extends along the front-rear direction, and defines the movable range of the movable handle 20R. The rail 30R is provided with the pulleys PB and PF at both ends in the front-rear direction. The wire W is wound around the pulley PF, which is provided on the front side, and the pulley PB, which is provided on the rear side, so that the pulleys PF and PB are rotated in conjunction with each other. A motor 32R, a right handle position detection unit 34R (e.g. an encoder), and a handle movement limiting unit 35R are provided coaxially with the pulley PF. As illustrated in FIG. 4, the wire W is fixed to a wire connection portion WA of an anchor portion 22B, and the wire W is inserted through a wire hole WH without being fixed thereto. The movable handle 20R is connected to the anchor portion 22B. Consequently, the motor 32R can assist movement of the movable handle 20R, or apply a load to movement of the movable handle 20R, by rotating the pulley PF to rotate the wire W between the pulleys. The right handle position detection unit 34R outputs the amount of rotation of the pulley PF which accompanies movement of the movable handle 20R on the rail 30R to the drive control unit 40.

As illustrated in FIG. 3, the movable handle 20R has a handle shaft portion 21a, a shaft portion fitting hole 21b, a slider 22, a grip portion 26a, a switch grip portion 26b, and a brake lever BKL. The slider 22 is composed of a handle holding portion 22A and the anchor portion 22B.

As illustrated in FIG. 3, one end of an urging unit 24 is connected to the handle shaft portion 21a, and the other end thereof is connected to the bottom portion of the shaft portion fitting hole 21b. A flange portion 21c that extends in the circumferential direction is provided at the end portion of the handle shaft portion 21a to which the urging unit 24 is connected. An inner flange portion 20c is provided on an inside wall surface at an opening of the shaft portion fitting hole 21b. Consequently, the grip portion 26a is slidable up and down along the longitudinal direction of the handle shaft portion 21a without separating from the handle shaft portion 21a. That is, the movable handle 20R has an expansion/contraction mechanism that enables expansion and contraction in the projecting direction.

A handle support shaft JK is provided on the side of the handle shaft portion 21a to which the urging unit 24 is not connected. The distal end of the handle support shaft JK is formed in a generally spherical shape, and forms a ball joint together with a recess provided in the handle holding portion 22A. Consequently, the movable handle 20R can be tilted to the front, rear, right, and left within a range defined by an opening with respect to the handle holding portion 22A (see FIGS. 3 and 4). A right handle tilt detection unit 33R that detects the tilt amount is provided at the opening of the handle holding portion 22A, and disposed on the front, rear, right, and left with respect to the handle support shaft JK. The right handle tilt detection unit 33R may be a pressure sensor that detects a pressure in accordance with expansion and contraction of springs provided between the side surfaces of the handle support shaft JK and the opening of the handle holding portion 22A, for example.

As illustrated in FIG. 3, the switch grip portion 26b is provided such that a predetermined gap is formed between the grip portion 26a and the switch grip portion 26b by grip urging units 28 (e.g. springs). A grasp detection unit 25R is turned on when a pressure is applied with the switch grip portion 26b moved toward the grip portion 26a when the user grasps the movable handle 20R, and turned off when a pressure is not applied. The grasp detection unit 25R may be a pressure switch or a push switch, for example.

As illustrated in FIG. 3, a heart rate/body temperature sensor 27a is provided at a part of the grip portion 26a. The heart rate/body temperature sensor 27a measures the heart rate and the body temperature of the user in predetermined cycles in the case where the user grasps the movable handle 20R (20L). The heart rate of the user may be measured by measuring the blood flow at a portion grasped by his/her hand using infrared radiation, for example. The body temperature of the user may be measured by measuring variations in the resistance of a thermistor which is varied in accordance with temperature variations, or variations in infrared radiation emitted by the portion which is grasped by the user, for example.

One end of the brake lever BKL is connected to the lower front side of the grip portion 26a. A mechanism that locks rotation of the front wheels 60FR and 60FL and the rear wheels 60RR and 60RL when the brake lever BKL is grasped and pulled toward the grip portion 26a by the user, that maintains the locked state, and unlocks such rotation when the brake lever BKL is further pulled is provided (not illustrated).

As illustrated in FIG. 2, the rail 30R is provided with the handle movement limiting unit 35R which permits and prohibits movement of the movable handle 20R with respect to the frame 50. The handle movement limiting unit 35R has a lock mechanism that locks rotation of the motor 32R, for example. The handle movement limiting unit 35R prohibits movement of the handle by locking rotation of the motor 32R, and permits movement of the handle with respect to the rail (i.e. with respect to the frame) by unlocking rotation of the motor 32R.

As illustrated in FIGS. 2 and 4, one end of the wire W is inserted through the wire hole WH which is provided in the anchor portion 22B, and the other end of the wire W is connected (fixed) to the wire connection portion WA. The movable handle 20R is movable on the rail 30R with a constricted portion that connects between the handle holding portion 22A and the anchor portion 22B sliding in the rail slit portion 38.

A signal cable 36 transfers detection signals from the grasp detection unit 25R and the right handle tilt detection unit 33R to the drive control unit 40 with one end of the signal cable 36 connected to the anchor portion 22B and with the other end thereof connected to the drive control unit 40. The signal cable 36 may be a cable that is flexible such as a flexible cable, for example. The drive control unit 40 can detect the position of the movable handle 20R on the rail 30R on the basis of a detection signal from the right handle position detection unit 34R. The drive control unit 40 can detect the tilt amount of the movable handle 20R toward any of the front, rear, right, and left directions on the basis of the detection signal from the right handle tilt detection unit 33R. The drive control unit 40 can detect whether or not the movable handle 20R is grasped by the user on the basis of the detection signal from the grasp detection unit 25R.

As illustrated in FIG. 5, the fixed handle 20FR (20FL) has a grip portion 26Fa and a switch grip portion 26Fb. A heart rate/body temperature sensor 27b measures the heart rate and the body temperature of the user in predetermined cycles in the case where the user grasps the fixed handle 20FR (20FL). Measurement of the heart rate and the body temperature of the user by the heart rate/body temperature sensor 27b is the same as that by the heart rate/body temperature sensor 27a, and therefore is not described.

As illustrated in FIG. 6, the switch grip portion 26Fb is provided such that a predetermined gap is formed between the grip portion 26Fa and the switch grip portion 26Fb by grip urging units 28 (e.g. springs). A grasp detection unit 25FR is turned on when a pressure is applied with the switch grip portion 26Fb moved toward the grip portion 26Fa to output a detection signal that is proportional to the pressure when the user grasps the fixed handle 20FR, and turned off when a pressure is not applied. The grasp detection unit 25FR may be any component that outputs a detection signal that is proportional to an applied pressure such as a pressure sensor, for example.

The function of the walking assist device 10 and the processes in the various operation modes will be described in detail with reference to FIGS. 7 to 17.

Figure 7:
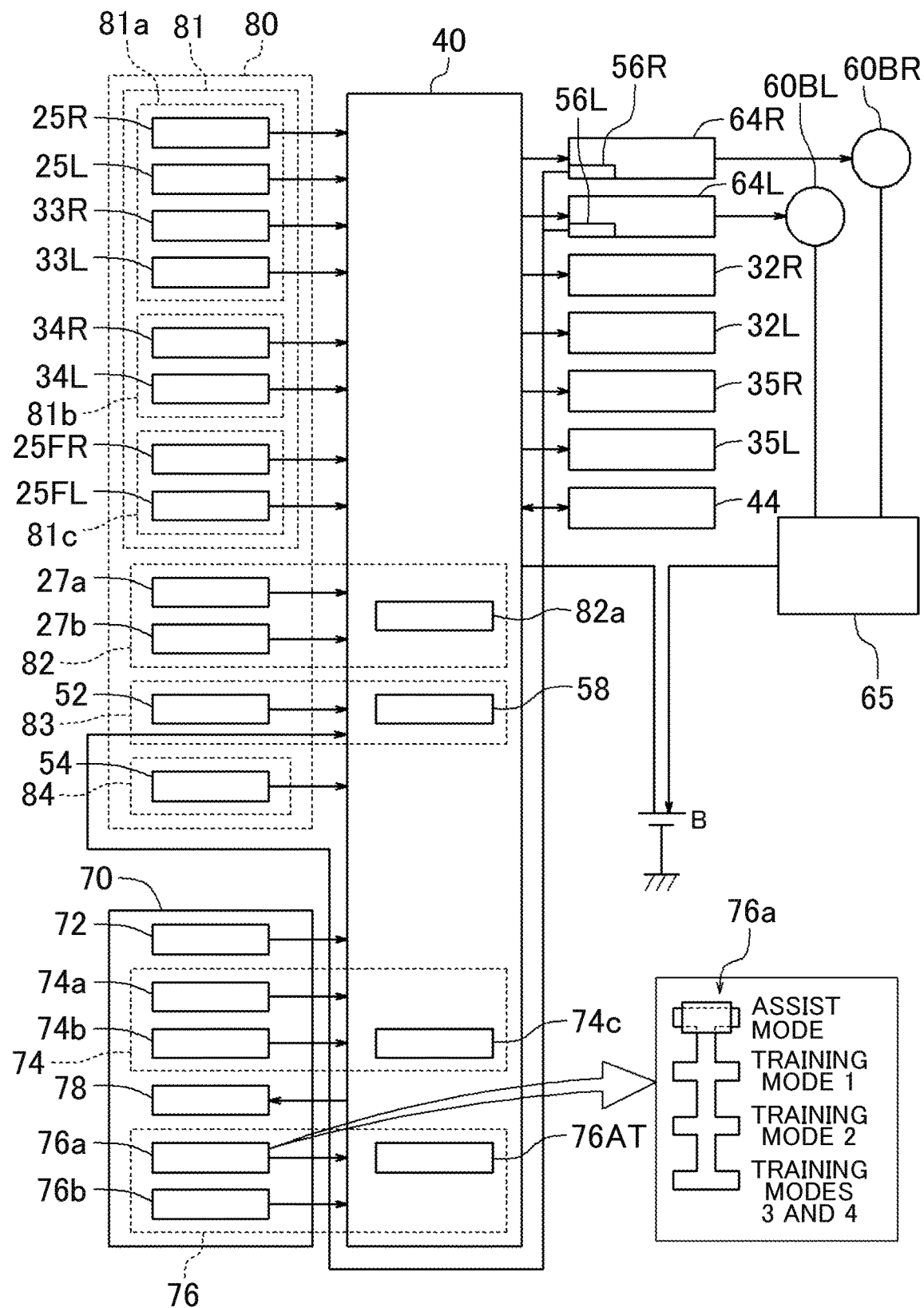
FIG. 7 is a block diagram illustrating inputs and outputs of a drive control unit of the walking assist device according to the first embodiment.

FIG. 7 is a block diagram illustrating inputs and outputs of the drive control unit 40 (e.g. a control device that includes a CPU) of the walking assist device 10 (see FIG. 1). As illustrated in FIG. 7, the drive control unit 40 controls the motors 32R and 32L, the handle movement limiting units 35R and 35L, and the drive units 64R and 64L on the basis of information input from a state detection unit 80, information stored in a storage unit 44, and information input from the control panel 70.

The drive control unit 40 drives the rear wheels 60RR and 60RL, which are drive wheels, by controlling the drive units 64R and 64L so as to achieve target travel speeds (VR and VL) which are targets for travel of the walking assist device 10. The target travel speed VR is a target travel speed at which the rear wheel 60RR of the walking assist device 10 is caused to travel on the basis of operation by the user, and the target travel speed VL is a target travel speed at which the rear wheel 60RL of the walking assist device 10 is caused to travel on the basis of operation by the user (see FIG. 1).

As illustrated in FIG. 7, the state detection unit 80 is composed of a grasp portion state detection unit 81, a body state detection unit 82, a vehicle body state detection unit 83, and an atmospheric state detection unit 84.

The grasp portion state detection unit 81 is composed of a movable handle acting force detection unit 81a, a movable handle movement amount detection unit 81b, and a fixed handle acting force detection unit 81c.

The movable handle acting force detection unit 81a has grasp detection units 25R and 25L, the right handle tilt detection unit 33R, and a left handle tilt detection unit 33L. The movable handle acting force detection unit 81a detects the presence or absence of a grasp on the movable handles 20R and 20L (see FIG. 1) by the user and a movable handle acting force which is a force to push forward and pull rearward the movable handles 20R and 20L which are grasped by the user, and outputs a signal that matches a detected state to the drive control unit 40.

The movable handle movement amount detection unit 81b has the right handle position detection unit 34R and a left handle position detection unit 34L. The movable handle movement amount detection unit 81b detects the amount of movement, in a predetermined time, of the movable handles 20R and 20L with respect to the rails 30R and 30L (see FIG. 1) made as the user walks while grasping the movable handles 20R and 20L and swinging his/her arms, and outputs a signal that matches the detected amount to the drive control unit 40.

The movable handle movement amount detection unit 81b detects movement widths DR and DL (corresponding to the arm swing width) by which the movable handles 20R and 20L are moved in the front-rear direction with respect to the rails 30R and 30L as the user walks while grasping the movable handles 20R and 20L and swinging his/her arms, and outputs a signal that matches a detected state to the drive control unit 40.

The fixed handle acting force detection unit 81c has grasp detection units 25FR and 25FL. The fixed handle acting force detection unit 81c detects the presence or absence of a grasp on the fixed handles 20FR and 20FL by the user and a fixed handle acting force which is a force to push forward and pull rearward the fixed handles 20FR (20FL) (see FIG. 1) which are grasped by the user, and outputs a signal that matches a detected state to the drive control unit 40.

The body state detection unit 82 is a device that detects the body state of the user, and has the heart rate/body temperature sensors 27a and 27b and a body information history 82a. The body state detection unit 82 detects the body state of the user, e.g. the heart rate and the body temperature of the user, through the heart rate/body temperature sensors 27a and 27b, and outputs a signal that matches a detected state to the drive control unit 40.

The body state detection unit 82 stores a history of body information (e.g. the heart rate, the body temperature, and the number of footsteps) on the user in the body information history 82a. The number of footsteps is calculated on the basis of information from the movable handle movement amount detection unit 81b on the assumption that the user makes two steps when he/she swings his/her arms back and forth once in the front-rear direction, for example.

The vehicle body state detection unit 83 is a device that detects the state of the walking assist device 10 including an operation history of the walking assist device 10, and has a travel speed acquisition unit 56R, a travel speed acquisition unit 56L, the three-axis acceleration/angular speed sensor 52, and operation history information 58.

The travel speed acquisition unit 56R and the travel speed acquisition unit 56L are connected to the drive units 64R and 64L, respectively, and output a detection signal corresponding to travel speeds (VdR and VdL) at which the rear wheels 60RR and 60RL (see FIG. 1) travel forward and rearward to the drive control unit 40.

The three-axis acceleration/angular speed sensor 52 measures an acceleration for each of the axes in the three directions, namely the X axis, the Y axis, and the Z axis, and measures an angular speed of rotation about each of the axes in the three directions. In the case where the walking assist device 10 travels on an inclined surface, for example, the three-axis acceleration/angular speed sensor 52 outputs a detection signal that matches the tilt of the vehicle with respect to the inclined surface for each of the X axis, the Y axis, and the Z axis to the drive control unit 40. The three-axis acceleration/angular speed sensor 52 also detects variations in the acceleration applied to the vehicle body of the walking assist device 10 (impact on the vehicle body), and outputs a signal that matches the detected variations in the acceleration to the drive control unit 40. The three-axis acceleration/angular speed sensor 52 also detects the pitch angular speed, the yaw angular speed, and the roll angular speed of the vehicle body of the walking assist device 10, and outputs a signal that matches the detected angular speeds to the drive control unit 40.

The vehicle body state detection unit 83 stores an operation history (e.g. the walking distance and the walking time) of the walking assist device 10 in the operation history information 58, and detects the state of the walking assist device 10 (e.g. the travel speed of the walking assist device 10, the tilt of the vehicle body, and the travel speed).

The atmospheric state detection unit 84 is a device that detects the atmospheric state (e.g. the outside temperature) around the user, and has the outside temperature sensor 54. The atmospheric state detection unit 84 detects the outside temperature through the outside temperature sensor 54, and outputs a signal that matches a detected state to the drive control unit 40.

The drive control unit 40 calculates forward-direction evaluation speeds (VRhf and VLhf), which are speeds of movement in the forward direction of the movable handles 20R and 20L with respect to the frame 50, and rearward-direction evaluation speeds (VRhb and VLhb), which are speeds of movement in the rearward direction of the movable handles 20R and 20L with respect to the frame 50, on the basis of the amounts of movement of the movable handles 20R and 20L (see FIGS. 1 and 2). The magnitude of the speeds of movement of the movable handles 20R and 20L with respect to the frame 50 is defined as "positive" in the case of movement in the forward direction, and defined as "negative" in the case of movement in the rearward direction.

The forward-direction evaluation speeds (VRhf and VLhf) or the rearward-direction evaluation speeds (VRhb and VLhb) are calculated from the speeds of movement of the movable handle (20R and 20L) in a case where the user swings his/her arm forward or rearward, for example. Specifically, the evaluation speed is derived in accordance with the following procedure. The processes are the same for the right and left movable handles, and therefore only the forward-direction evaluation speed (VRhf) and the rearward-direction evaluation speed (VRhb) of the right movable handle 20R will be described.

Derivation of the forward-direction evaluation speed (VRhf) of the right movable handle 20R: The drive control unit 40 calculates the speed of movement of the movable handle 20R on the basis of the amount of movement of the movable handle 20R which is measured at predetermined intervals. The drive control unit 40 integrates (integration process) only the speeds of forward movement (speeds of movement having a "positive" magnitude) at which the movable handle 20R moves forward, among the calculated speeds of movement of the movable handle 20R. The drive control unit 40 derives the forward-direction evaluation speed (VRhf) by dividing the speed of forward movement of the movable handle 20R, which is obtained through integration, by a predetermined time (averaging process).

Derivation of the rearward-direction evaluation speed (VRhb) of the right movable handle 20R: The drive control unit 40 calculates the speed of movement of the movable handle 20R on the basis of the amount of movement of the movable handle 20R which is measured at predetermined intervals. The drive control unit 40 integrates (integration process) only the speeds of rearward movement (speeds of movement having a "negative" magnitude) at which the movable handle 20R moves rearward, among the calculated speeds of movement of the movable handle 20R. The drive control unit 40 derives the rearward-direction evaluation speed (VRhb) by dividing the speed of rearward movement of the movable handle 20R, which is obtained through integration, by a predetermined time (averaging process).

A load amount/assist amount change unit 74 has the assist amount adjustment volume 74a and the load amount adjustment volume 74b. The assist amount adjustment volume 74a outputs a detection signal that matches the adjustment amount (assist adjustment amount) for the magnitude (assist amount) of an assist force in the assist mode to the drive control unit 40. The load amount adjustment volume 74b outputs a detection signal that matches the adjustment amount (load adjustment amount) for the magnitude (load amount) of a load in the training mode to the drive control unit 40. In the assist mode, the load amount/assist amount change unit 74 changes the assist amount on the basis of information from the state detection unit 80 and the assist adjustment amount. In the training mode, the load amount/assist amount change unit 74 changes the load amount on the basis of information from the state detection unit 80 and the load adjustment amount.

The load amount/assist amount change unit 74 has a learning unit 74c, and adjusts the load amount in the training mode, and adjusts the assist amount in the assist mode, on the basis of the atmospheric state around the user which is detected using the atmospheric state detection unit 84, the operation history of the walking assist device 10 which is detected using the vehicle body state detection unit 83, and the body state of the user which is detected using the body state detection unit 82. A learning unit in the learning unit 74c determines an appropriate load amount and an appropriate assist amount on the basis of the past history of use (walking time, walking distance, load amount, and assist amount) by the user and the past body information history (heart rate, body temperature, and number of footsteps) on the user which are stored in the storage unit 44, for example. Consequently, an excessive load is not applied to the user, or the user is not assisted excessively, which makes it possible to suppress a decrease in (maintain) the physical strength of the user more appropriately.

The storage unit 44 is a device that stores information, and stores and reads information in response to a request from the drive control unit 40. The storage unit 44 stores information such as information acquired by the state detection unit 80, the result of computation performed by the drive control unit 40, the operation history of the walking assist device 10, the assist amount in the assist mode in the past during walk of the user, and the load amount in the training mode.

The control panel 70 provides switches and the monitor 78 which are necessary for the user to operate the walking assist device 10. The user makes the walking assist device 10 ready for travel by turning on the main switch 72. The user can adjust the assist amount in the assist mode and the load amount in the training mode using the assist amount adjustment volume 74a and the load amount adjustment volume 74b, respectively. The user can select a desired operation mode ("assist mode", "training mode 1", "training mode 2", and "training modes 3 and 4") by operating the manual mode switching unit 76a. In the case where the automatic mode switching unit switch 76b is turned on, the drive control unit 40 automatically switches the operation mode between the operation mode which is selected by the user and a predetermined operation mode.

The determination of the operation mode of the walking assist device 10 (see FIG. 1) by the drive control unit 40 (see FIG. 7) and the processes based on the determined operation mode will be described in detail with reference to FIGS. 8 to 17.

Figure 8:
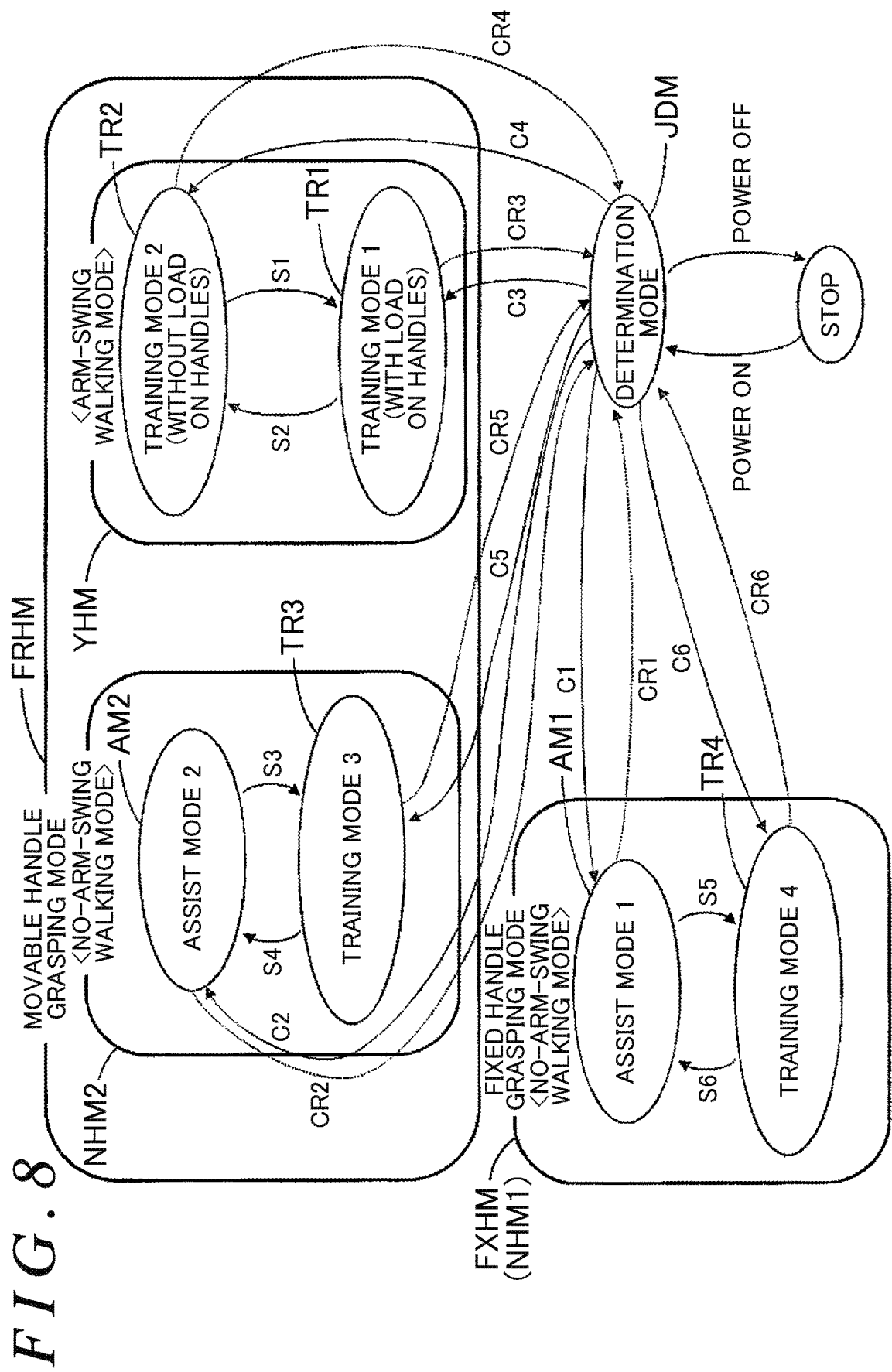
FIG. 8 illustrates operation modes of the walking assist device determined on the basis of outputs of various detection units.
Figure 10A:
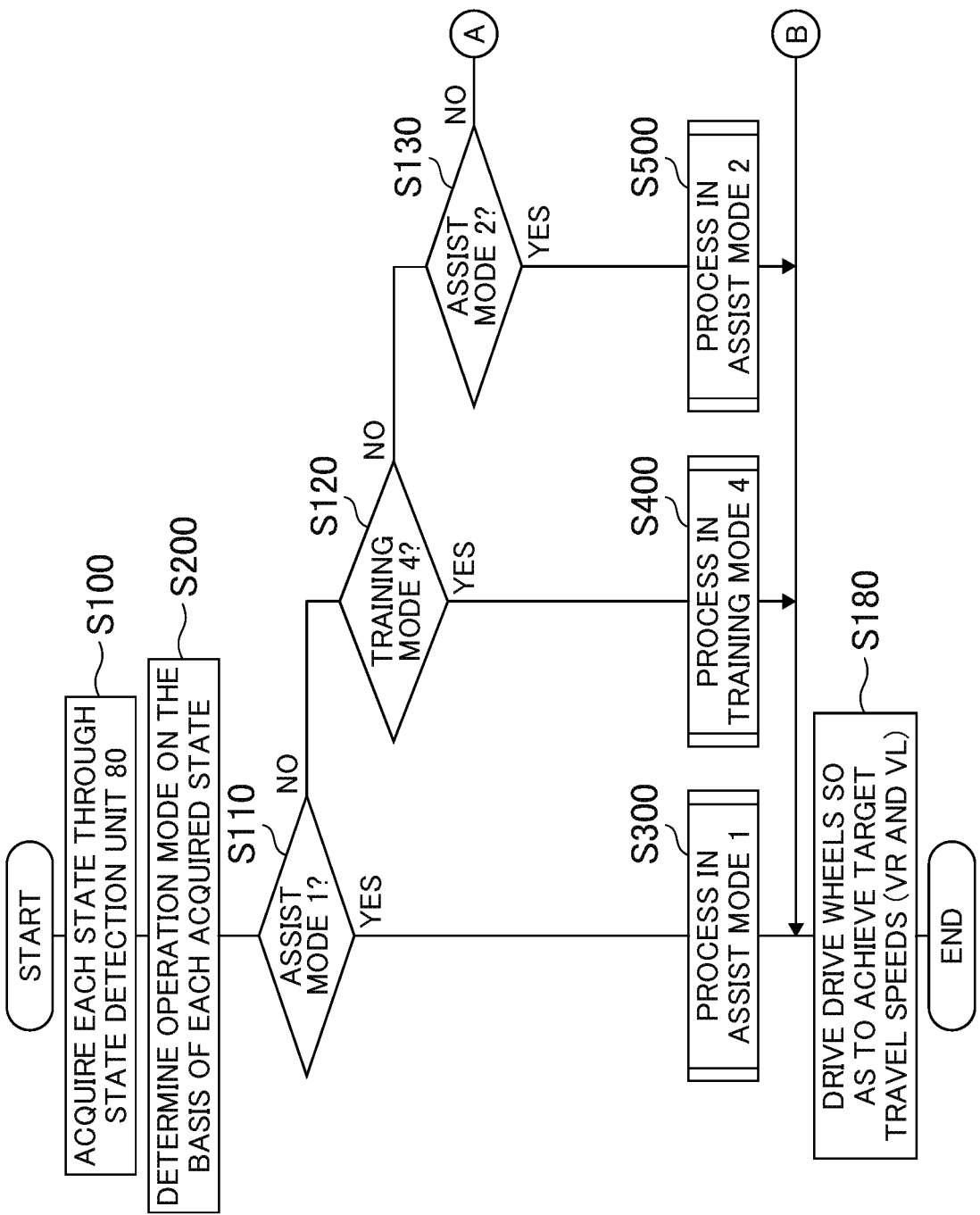
FIG. 10A is a flowchart illustrating the procedure of the overall process for the drive control unit of the walking assist device according to the first embodiment.
Figure 10B:
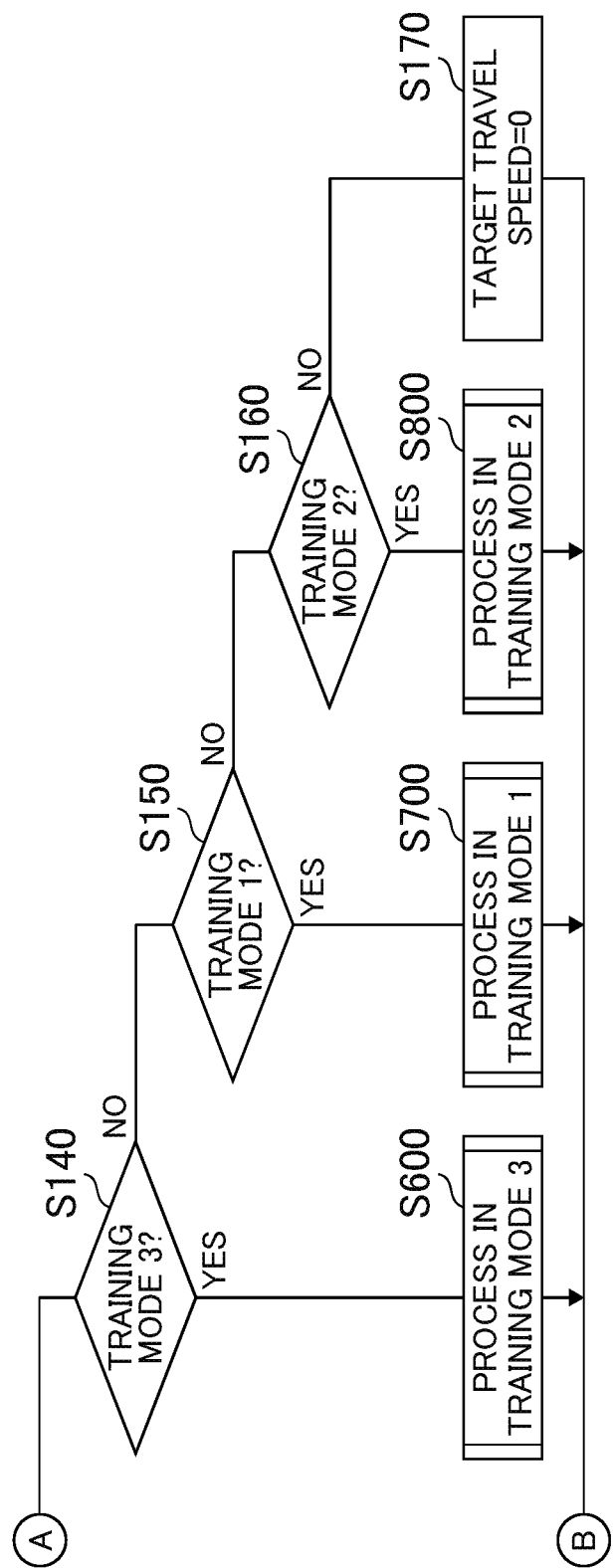
FIG. 10B is a flowchart illustrating the procedure of the overall process for the drive control unit of the walking assist device according to the first embodiment.

FIG. 8 is a state transition diagram illustrating the operation modes of the walking assist device 10 determined on the basis of outputs of the various detection units. FIG. 9 illustrates conditions for transitioning from a determination mode JDM to various operation modes in FIG. 8 and conditions for returning to the determination mode JDM. FIG. 10A and FIG. 10B are flowcharts illustrating the procedure of the overall process for the drive control unit 40 of the walking assist device 10.

FIG. 8 illustrates the operation modes of the walking assist device 10 determined on the basis of outputs of the various detection units. As illustrated in FIG. 8, the walking assist device 10 has operation modes including the determination mode JDM, an assist mode 1 (AM1), an assist mode 2 (AM2), a training mode 1 (TR1), a training mode 2 (TR2), a training mode 3 (TR3), and a training mode 4 (TR4).

When the main switch 72 (see FIG. 7) is turned on (energized), the drive control unit 40 reads the operation history which is stored in the storage unit 44, and writes the operation history into the operation history information 58. After that, the drive control unit 40 causes the walking assist device 10 to transition to the determination mode JDM. After a transition to the determination mode JDM, the drive control unit 40 acquires each state through the state detection unit 80, and causes the walking assist device 10 to transition to an operation mode based on the acquired state. When the main switch 72 is turned off (de-energized), the drive control unit 40 stores information (e.g. the walking distance and the walking time) about the operation history in the operation history information 58 in the storage unit 44, and finishes the operation.

As illustrated in FIG. 8, the operation modes include a fixed handle grasping mode FXHM and a movable handle grasping mode FRHM. In the fixed handle grasping mode FXHM, the user walks while causing the walking assist device 10 to travel by grasping the fixed handles 20FR and 20FL (see FIG. 1). In the movable handle grasping mode FRHM, the user walks while causing the walking assist device 10 to travel by grasping the movable handles 20R and 20L (see FIG. 1).

The fixed handle grasping mode FXHM, in which the user grasps the fixed handles 20FR and 20FL, is a no-arm-swing walking mode NHM1. The movable handle grasping mode FRHM includes a no-arm-swing walking mode NHM2, in which the user grasps the movable handles 20R and 20L but does not swing his/her arms, and an arm-swing walking mode YHM, in which the user swings his/her arms.

The no-arm-swing walking mode NHM2 of the movable handle grasping mode FRHM, in which the user grasps the movable handles 20R and 20L which are fixed at a predetermined position on the rails 30R and 30L (see FIG. 1), corresponds to the fixed handle grasping mode FXHM (no-arm-swing walking mode NHM1). In the arm-swing walking mode YHM, the user walks while causing the walking assist device 10 to travel by grasping the movable handles 20R and 20L and moving the movable handles 20R and 20L along the front-rear direction of the rails 30R and 30L.

The fixed handle grasping mode FXHM includes the assist mode 1 (AM1) and the training mode 4 (TR4). The no-arm-swing walking mode NHM2 of the movable handle grasping mode FRHM includes the assist mode 2 (AM2) and the training mode 3 (TR3). The arm-swing walking mode YHM of the movable handle grasping mode FRHM includes the training mode 1 (TR1) and the training mode 2 (TR2).

In the assist mode 1 (AM1) and the assist mode 2 (AM2), the load on operation of the body of the user of the walking assist device 10 can be alleviated. Specifically, the walking assist device 10 can be caused to travel with an assist force that is larger by a predetermined amount than an assist force with which operation (walk) of the body of the user performed as the user walks is equivalent to operation (walk) in a no-load state. Consequently, the load on operation (walk) of the body of the user performed as the user walks can be alleviated.

In the training mode 1 (TR1), the walking assist device 10 is caused to travel while causing the regenerated power collecting unit 65 to operate. The regenerated power collecting unit 65 is connected to the rear wheels 60RR and 60RL (see FIG. 1), and converts rotational energy into electric power to be collected (see FIGS. 1 and 7). In the training mode 1 (TR1), the walking assist device 10 can be caused to travel by applying a load to movement of the movable handles 20R and 20L in the front-rear direction through the motors 32R and 32L. Consequently, a load can be applied to operation (walk and arm swing) of the body of the user performed as the user walks.

In the training mode 2 (TR2), no load is applied to the movable handles 20R and 20L, and the walking assist device 10 can be caused to travel with an assist force with which operation (walk) of the body of the user performed as the user walks is equivalent to operation in a no-load state. Consequently, the load on operation (walk) of the body of the user performed as the user walks can be alleviated.

In the training mode 3 (TR3), the walking assist device 10 is caused to travel while causing the regenerated power collecting unit 65 to operate. Thus, it is necessary for the user to push or pull the walking assist device 10 with a stronger force than in the assist mode 2 (AM2) in order to cause the walking assist device 10 to travel. Consequently, a load can be applied to operation (walk) of the body of the user performed as the user walks.

In the training mode 4 (TR4), the walking assist device 10 is caused to travel while causing the regenerated power collecting unit 65 to operate. Thus, it is necessary for the user to push or pull the walking assist device 10 with a stronger force than in the assist mode 1 (AM1) in order to cause the walking assist device 10 to travel. Consequently, a load can be applied to operation (walk) of the body of the user performed as the user walks.

FIG. 9 illustrates conditions for transitioning from the determination mode JDM to the various operation modes in FIG. 8 and conditions for returning to the determination mode JDM. In FIG. 9, conditions C1 to C6 are conditions for transitioning from the determination mode JDM to the various operation modes in FIG. 8, and conditions CR1 to CR6 are conditions for returning from the various operation modes to the determination mode JDM. In FIG. 9, the symbol "–" indicates that the state may be either "0" or "1".

A transition to the various operation modes is determined in accordance with the manual mode switching unit 76*a* (see FIG. 7), the state (see FIG. 1) of the movable handles (20R and 20L), and the state (see FIG. 1) of the fixed handles (20FR and 20FL). The conditions for transitioning from the various operation modes to the determination mode JDM are determined in accordance with the current operation mode, the state of the movable handles (20R and 20L), and the state of the fixed handles (20FR and 20FL).

In FIG. 9, the moving handle grasping state is "1=grasped" in the case where it is detected by the grasp detection units 25R and 25L (see FIG. 3) that the user is grasping any of the movable handles 20R and 20L, and "0=not grasped" in the case where it is detected that the user is not grasping any of the movable handles 20R and 20L.

The fixed handle grasping state is "1=grasped" in the case where it is detected by the grasp detection units 25FR and 25FL (see FIG. 6) that the user is grasping any of the fixed handles 20FR and 20FL, and "0=not grasped" in the case where it is detected that the user is not grasping any of the fixed handles 20FR and 20FL.

The state of arm swing with the movable handles 20R and 20L is "1=with arm swing" in the case where a detection signal with movement of the movable handle 20R or 20L is output from one of the right handle position detection unit 34R and the left handle position detection unit 34L, and "0=without arm swing" otherwise.

In the case where one of the conditions C1 to C6 is met, the drive control unit 40 changes the operation mode to an operation mode corresponding to the condition. Determination of a transition from the determination mode JDM to the various operation modes will be described in detail below.

In the case where the manual mode switching unit 76*a* selects the "assist mode", the moving handle grasping state is "0=not grasped", the arm swing state is "0=without arm swing", and the fixed handle grasping state is "1=grasped", the condition C1 is met, and the drive control unit 40 causes the operation mode to transition from the determination mode JDM to the assist mode 1 (AM1).

In the case where the manual mode switching unit 76*a* selects the "assist mode", the moving handle grasping state is "1=grasped", the arm swing state is "0=without arm swing", and the fixed handle grasping state is "0=grasped", the condition C2 is met, and the drive control unit 40 causes the operation mode to transition from the determination mode JDM to the assist mode 2 (AM2).

In the case where the manual mode switching unit 76*a* selects the "training mode 1", the moving handle grasping state is "1=grasped", the arm swing state is "1=with arm swing", and the fixed handle grasping state is "0=not grasped", the condition C3 is met, and the drive control unit 40 causes the operation mode to transition from the determination mode JDM to the training mode 1 (TR1).

In the case where the manual mode switching unit 76a selects the "training mode 2", the moving handle grasping state is "1=grasped", the arm swing state is "1=with arm swing", and the fixed handle grasping state is "0=not grasped", the condition C4 is met, and the drive control unit 40 causes the operation mode to transition from the determination mode JDM to the training mode 2 (TR2).

In the case where the manual mode switching unit 76a selects the "training mode 3", the moving handle grasping state is "1=grasped", the arm swing state is "0=without arm swing", and the fixed handle grasping state is "0=not grasped", the condition C5 is met, and the drive control unit 40 causes the operation mode to transition from the determination mode JDM to the training mode 3 (TR3).

In the case where the manual mode switching unit 76a selects the "training mode 3", the moving handle grasping state is "0=not grasped", the arm swing state is "0=without arm swing", and the fixed handle grasping state is "1=grasped", the condition C6 is met, and the drive control unit 40 causes the operation mode to transition from the determination mode JDM to the training mode 4 (TR4).

In the case where one of the conditions CR1 to CR6 is met, the drive control unit 40 finishes the current operation mode (see FIG. 8), and causes the operation mode to transition to the determination mode JDM. Determination of a transition from the various operation modes to the determination mode JDM will be described in detail below.

In the case where the current mode is the "assist mode 1 (AM1)" and the fixed handle grasping state is "0=not grasped", the condition CR1 is met irrespective of the other states, and the drive control unit 40 causes the operation mode to transition from the assist mode 1 (AM1) to the determination mode JDM.

In the case where the current mode is the "assist mode 2 (AM2)" and the movable handle grasping state is "0=not grasped", the condition CR2 is met irrespective of the other states, and the drive control unit 40 causes the operation mode to transition from the assist mode 2 (AM2) to the determination mode JDM.

In the case where the current mode is the "training mode 1 (TR1)" and the movable handle grasping state is "0=not grasped", the condition CR3 is met irrespective of the other states, and the drive control unit 40 causes the operation mode to transition from the training mode 1 (TR1) to the determination mode JDM.

In the case where the current mode is the "training mode 2 (TR2)" and the movable handle grasping state is "0=not grasped", the condition CR4 is met irrespective of the other states, and the drive control unit 40 causes the operation mode to transition from the training mode 2 (TR2) to the determination mode JDM.

In the case where the current mode is the "training mode 3 (TR3)" and the movable handle grasping state is "0=not grasped", the condition CR5 is met irrespective of the other states, and the drive control unit 40 causes the operation mode to transition from the training mode 3 (TR3) to the determination mode JDM.

In the case where the current mode is the "training mode 4 (TR4)" and the fixed handle grasping state is "0=not grasped", the condition CR6 is met irrespective of the other states, and the drive control unit 40 causes the operation mode to transition from the training mode 4 (TR4) to the determination mode JDM.

FIG. 10A and FIG. 10B are flowcharts illustrating the procedure of the overall process for the drive control unit 40 (see FIG. 7) of the walking assist device 10 (see FIG. 1). The process procedure for the drive control unit 40 of the walking assist device 10 will be described with reference to the flowchart in FIG. 10A and FIG. 10B. The operation mode in each process is not given the symbol in FIG. 8 except where it is necessary for convenience of description.

The overall process for the drive control unit 40 is composed of processes of: acquiring each state through the state detection unit 80 (step S100); determining the operation mode on the basis of each acquired state (step S200); calculating a target travel speed at which the walking assist device 10 is caused to travel (steps S170 and S300 to S800); and driving the rear wheels 60RR and 60RL (see FIG. 1), which serve as drive wheels, so as to achieve the target travel speed (step S180). The drive control unit 40 executes the overall process at intervals of a predetermined time (e.g. at intervals of several milliseconds) when started.

Step S100 (acquisition of each state through the state detection unit 80) will be described in detail below.

In step S100, the drive control unit 40 acquires information (detection signal) from the state detection unit 80 (grasp portion state detection unit 81, body state detection unit 82, vehicle body state detection unit 83, and atmospheric state detection unit 84), and stores a variety of detected states (input states) in the storage unit 44. The drive control unit 40 calculates forward-direction evaluation speeds VRhf and VLhf and rearward-direction evaluation speeds VRhb and VLhb on the basis of the information which is acquired through the state detection unit 80, and stores such evaluation speeds in the storage unit 44. The drive control unit 40 finishes the acquisition of each state through the state detection unit (step S100), and returns to the overall process.

For example, the drive control unit 40 detects and stores the following input states in the storage unit 44 in step S100.

Grasp Portion State (State of Fixed Handles 20FR and 20FL and Movable Handles 20R and 20L)

Fixed handle grasping state: whether or not the user is grasping any of the fixed handles 20FR and 20FL.

Fixed handle acting force: a force to push forward and pull rearward the fixed handles 20FR and 20FL which are grasped by the user.

Movable handle grasping state: whether or not the user is grasping any of the movable handles 20R and 20L.

Movable handle acting force: a force to push forward and pull rearward the movable handles 20R and 20L which are grasped by the user.

State of arm swing: whether or not the user is swinging his/her arms in the front-rear direction while grasping any of the movable handles 20R and 20L.

Movement widths (DR and DL): widths (corresponding to the arm swing width) by which the movable handles 20R and 20L are moved in the front-rear direction with respect to the rails 30R and 30L as the user walks while grasping the movable handles 20R and 20L and swinging his/her arms.

Forward-direction evaluation speeds (VRhf and VLhf): the speeds of movement in the forward direction of the movable handles 20R and 20L with respect to the frame 50.

Rearward-direction evaluation speeds (VRhb and VLhb): the speeds of movement in the rearward direction of the movable handles 20R and 20L with respect to the frame 50.

Body State of User

Heart rate and body temperature: the heart rate and the body temperature of the user during use of the walking assist device 10.

Vehicle Body State of Walking Assist Device 10

Travel speeds (VdR and VdL): the travel speeds of the rear wheels 60RR and 60RL to travel forward or rearward.

Acceleration: acceleration applied to the walking assist device 10 for each of the axes in the three directions, namely the X axis, the Y axis, and the Z axis.

Angular speeds: angular speeds for rotation about each of the axes in the three directions, namely the X axis, the Y axis, and the Z axis.

Accumulated walking time: accumulated time of walk of the user with the walking assist device 10 stored in the storage unit 44.

Accumulated walking distance: accumulated distance of walk of the user with the walking assist device 10 stored in the storage unit 44.

Surrounding Atmospheric State

Outside temperature: the temperature of outside air around the walking assist device 10.

Information Output from Control Panel 70

State of main switch 72: whether the main switch of the walking assist device 10 is on (operation enabled) or off (operation disabled).

State of manual mode switching unit 76a: operation mode of the walking assist device 10 selected by the user.

State of automatic mode switching unit switch 76b: whether the switch is on (automatic operation mode switching enabled) or off (automatic operation mode switching disabled).

Assist adjustment amount: the adjustment amount for adjusting the magnitude of an assist force in the assist mode.

Load adjustment amount: the adjustment amount for adjusting the magnitude of a load in the training mode.

In step S200 (determination of operation mode based on each acquired state), the drive control unit 40 reads each state acquired through the state detection unit and stored in the storage unit 44, determines the operation mode (see FIG. 8), the condition for which is met in accordance with FIG. 9, on the basis of such information, and proceeds to step S110 (see FIG. 10A).

In step S110, the drive control unit 40 proceeds to step S300 in the case where the determined operation mode is the assist mode 1 (AM1) (Yes), and proceeds to step S120 in the case where the determined operation mode is not the assist mode 1 (AM1) (No).

In step S120, the drive control unit 40 proceeds to step S400 in the case where the determined operation mode is the training mode 4 (TR4) (Yes), and proceeds to step S130 in the case where the determined operation mode is not the training mode 4 (TR4) (No).

In step S130, the drive control unit 40 proceeds to step S500 in the case where the determined operation mode is the assist mode 2 (AM2) (Yes), and proceeds to step S140 in the case where the determined operation mode is not the assist mode 2 (AM2) (No).

In step S140, the drive control unit 40 proceeds to step S600 in the case where the determined operation mode is the training mode 3 (TR3) (Yes), and proceeds to step S150 in the case where the determined operation mode is not the training mode 3 (TR3) (No).

In step S150, the drive control unit 40 proceeds to step S700 in the case where the determined operation mode is the training mode 1 (TR1) (Yes), and proceeds to step S160 in the case where the determined operation mode is not the training mode 1 (TR1) (No).

In step S160, the drive control unit 40 proceeds to step S800 in the case where the determined operation mode is the training mode 2 (TR2) (Yes), and proceeds to step S170 in the case where the determined operation mode is not the training mode 2 (TR2) (No).

In step S170, the drive control unit 40 sets the target travel speed for the walking assist device 10 to 0 (determination mode), and proceeds to step S180.

In step S180, the drive control unit 40 drives the rear wheels 60RR and 60RL by controlling the drive units 64R and 64L with the target travel speeds (VR and VL) for the walking assist device 10 set to target forward travel speeds (VfdR and VfdL), which are the target travel speeds for forward travel, in the case of forward travel, to target reverse travel speeds (VbdR and VbdL), which are the target travel speeds for reverse travel, in the case of reverse travel, and to "0" otherwise, and finishes the overall process.

FIG. 11 is a flowchart illustrating the procedure of processes in the assist mode 1 (AM1) in the drive control unit 40 of the walking assist device 10 (see FIGS. 1, 7, and 8). Step S300 (processes in the assist mode 1) will be described with reference to the flowchart in FIG. 11.

In step S310, the drive control unit 40 proceeds to step S320 in the case where the acting force of the user applied to the fixed handles 20FR and 20FL is in the forward direction (Yes) on the basis of information from the fixed handle acting force detection unit 81c, and proceeds to step S330 in the case where the acting force of the user applied to the fixed handles 20FR and 20FL is not in the forward direction (No).

In step S320, the drive control unit 40 calculates the target forward travel speeds (VfdR and VfdL) which match the acting force applied to the fixed handles 20FR and 20FL and the assist amount which is derived by the load amount/assist amount change unit 74, finishes the processes in the assist mode 1 (step S300), and returns to the overall process.

In step S330, the drive control unit 40 calculates the target rearward travel speeds (VbdR and VbdL) which match the acting force applied to the fixed handles 20FR and 20FL and the assist amount which is derived by the load amount/assist amount change unit 74, finishes the processes in the assist mode 1 (step S300), and returns to the overall process.

In the assist mode 1 (AM1) (see FIG. 8), the walking assist device 10 can be caused to travel with an assist force that is larger by a predetermined amount than an assist force with which operation (walk) of the body of the user performed as the user walks is equivalent to operation in a no-load state. Consequently, the load on operation (walk) of the body of the user performed as the user walks can be alleviated.

FIG. 11 is a flowchart illustrating the procedure of processes in the training mode 4 (TR4) in the drive control unit 40 of the walking assist device 10 (see FIGS. 1, 7, and 8). Step S400 (processes in the training mode 4) will be described with reference to the flowchart in FIG. 11. With the regenerated power collecting unit 65 operating, the walking assist device 10 is not caused to generate an assist force in accordance with the acting force of the user.

In step S410, the drive control unit 40 proceeds to step S420 in the case where the acting force of the user applied to the fixed handles 20FR and 20FL is in the forward direction (Yes) on the basis of information from the fixed handle acting force detection unit 81c, and proceeds to step S430 in the case where the acting force of the user applied to the fixed handles 20FR and 20FL is not in the forward direction (No).

In step S420, the drive control unit 40 calculates the target forward travel speeds (VfdR and VfdL) which match the acting force applied to the fixed handles 20FR and 20FL, finishes the processes in the training mode 4 (step S400), and returns to the overall process.

In step S430, the drive control unit 40 calculates the target rearward travel speeds (VbdR and VbdL) which match the acting force applied to the fixed handles 20FR and 20FL, finishes the processes in the training mode 4 (step S400), and returns to the overall process.

In the training mode 4 (TR4) (see FIG. 8), in order to cause the walking assist device 10 to travel with the regenerated power collecting unit 65 operating, it is necessary for the user to push or pull the walking assist device 10 with a stronger force in order to cause the walking assist device 10 to travel than in the assist mode 1 (AM1). Consequently, a load can be applied to operation (walk) of the body of the user performed as the user walks.

Figure 12:
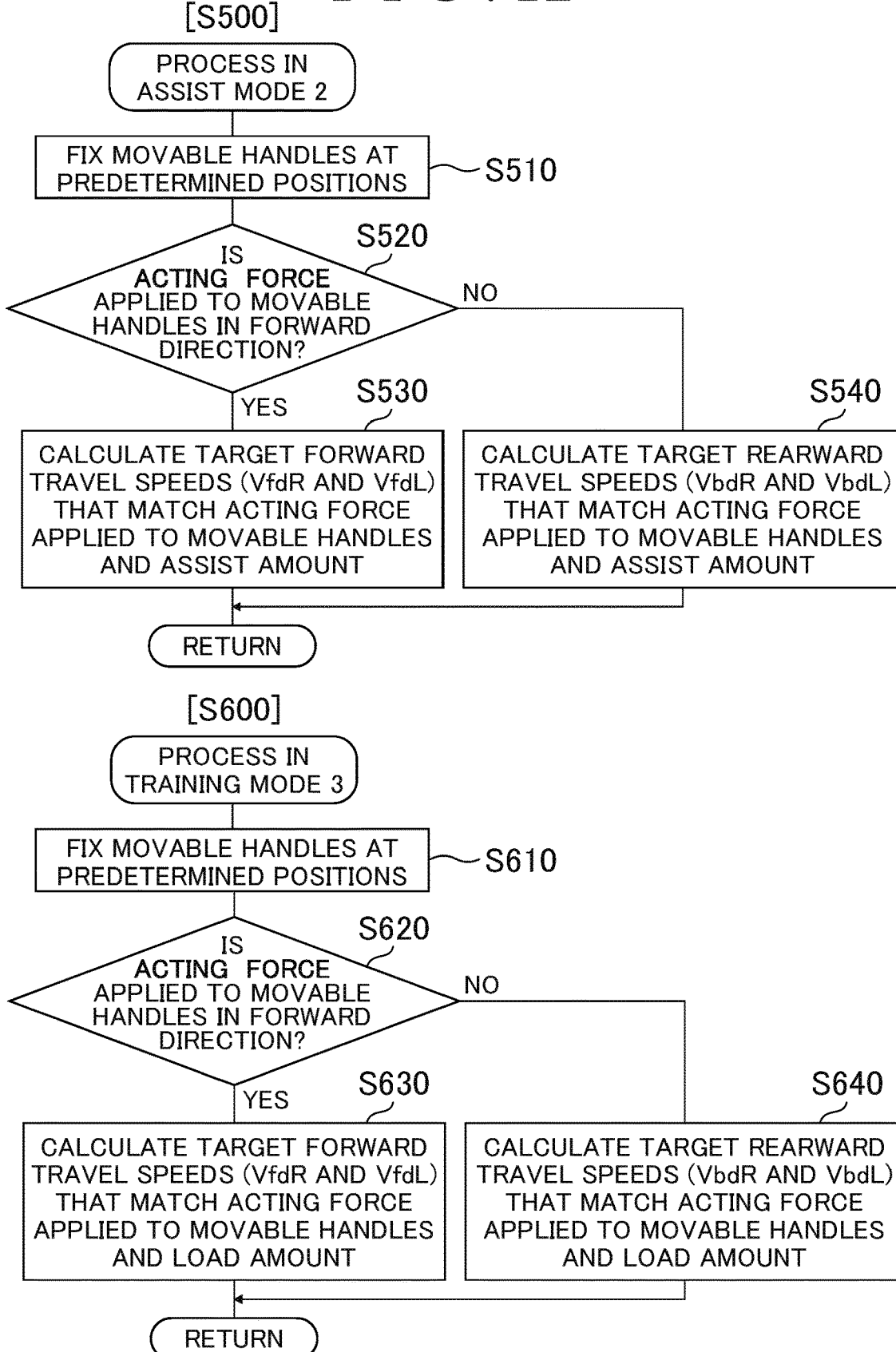
FIG. 12 is a flowchart illustrating the procedure of processes in an assist mode 2 and a training mode 3 in the drive control unit of the walking assist device.

FIG. 12 is a flowchart illustrating the procedure of processes in the assist mode 2 (AM2) in the drive control unit 40 of the walking assist device 10 (see FIGS. 1, 7, and 8). Step S500 (processes in the assist mode 2) will be described with reference to the flowchart in FIG. 12.

In step S510, the drive control unit 40 fixes the movable handles 20R and 20L at predetermined positions by limiting movement thereof on the rails 30R and 30L using the handle movement limiting units 35R and 35L by driving the motors 32R and 32L, and proceeds to step S520.

In step S520, the drive control unit 40 proceeds to step S530 in the case where the acting force of the user applied to the movable handles 20R and 20L is in the forward direction (Yes) on the basis of information from the movable handle acting force detection unit 81a, and proceeds to step S540 in the case where the acting force of the user applied to the movable handles 20R and 20L is not in the forward direction (No).

In step S530, the drive control unit 40 calculates the target forward travel speeds (VfdR and VfdL) which match the acting force applied to the movable handles 20R and 20L and the assist amount which is derived by the load amount/assist amount change unit 74, finishes the processes in the assist mode 2 (step S500), and returns to the overall process.

In step S540, the drive control unit 40 calculates the target rearward travel speeds (VbdR and VbdL) which match the acting force applied to the movable handles 20R and 20L and the assist amount which is derived by the load amount/assist amount change unit 74, finishes the processes in the assist mode 2 (step S500), and returns to the overall process.

In the assist mode 2 (AM2), the walking assist device 10 can be caused to travel with an assist force that is larger by a predetermined amount than an assist force with which operation (walk) of the body of the user performed as the user walks is equivalent to operation in a no-load state. Consequently, the load on operation (walk) of the body of the user performed as the user walks can be alleviated.

FIG. 12 is a flowchart illustrating the procedure of processes in the training mode 3 (TR3) in the drive control unit 40 of the walking assist device 10 (see FIGS. 1, 7, and 8). Step S600 (processes in the training mode 3) will be described with reference to the flowchart in FIG. 12. With the regenerated power collecting unit 65 operating, the walking assist device 10 is not caused to generate an assist force in accordance with the acting force of the user.

In step S610, the drive control unit 40 fixes the movable handles 20R and 20L at predetermined positions by limiting movement thereof on the rails 30R and 30L using the handle movement limiting units 35R and 35L by driving the motors 32R and 32L, and proceeds to step S620.

In step S620, the drive control unit 40 proceeds to step S630 in the case where the acting force of the user applied to the movable handles 20R and 20L is in the forward direction (Yes) on the basis of information from the movable handle acting force detection unit 81a, and proceeds to step S640 in the case where the acting force of the user applied to the movable handles 20R and 20L is not in the forward direction (No).

In step S630, the drive control unit 40 calculates the target forward travel speeds (VfdR and VfdL) which match the acting force applied to the movable handles 20R and 20L, finishes the processes in the training mode 3 (step S600), and returns to the overall process.

In step S640, the drive control unit 40 calculates the target rearward travel speeds (VbdR and VbdL) which match the acting force applied to the movable handles 20R and 20L, finishes the processes in the training mode 3 (step S600), and returns to the overall process.

In the training mode 3 (TR3) (see FIG. 8), in order to cause the walking assist device 10 to travel with the regenerated power collecting unit 65 operating, it is necessary for the user to push or pull the walking assist device 10 with a stronger force in order to cause the walking assist device 10 to travel than in the assist mode 2 (AM2). Consequently, a load can be applied to operation (walk) of the body of the user performed as the user walks.

Figure 13A:
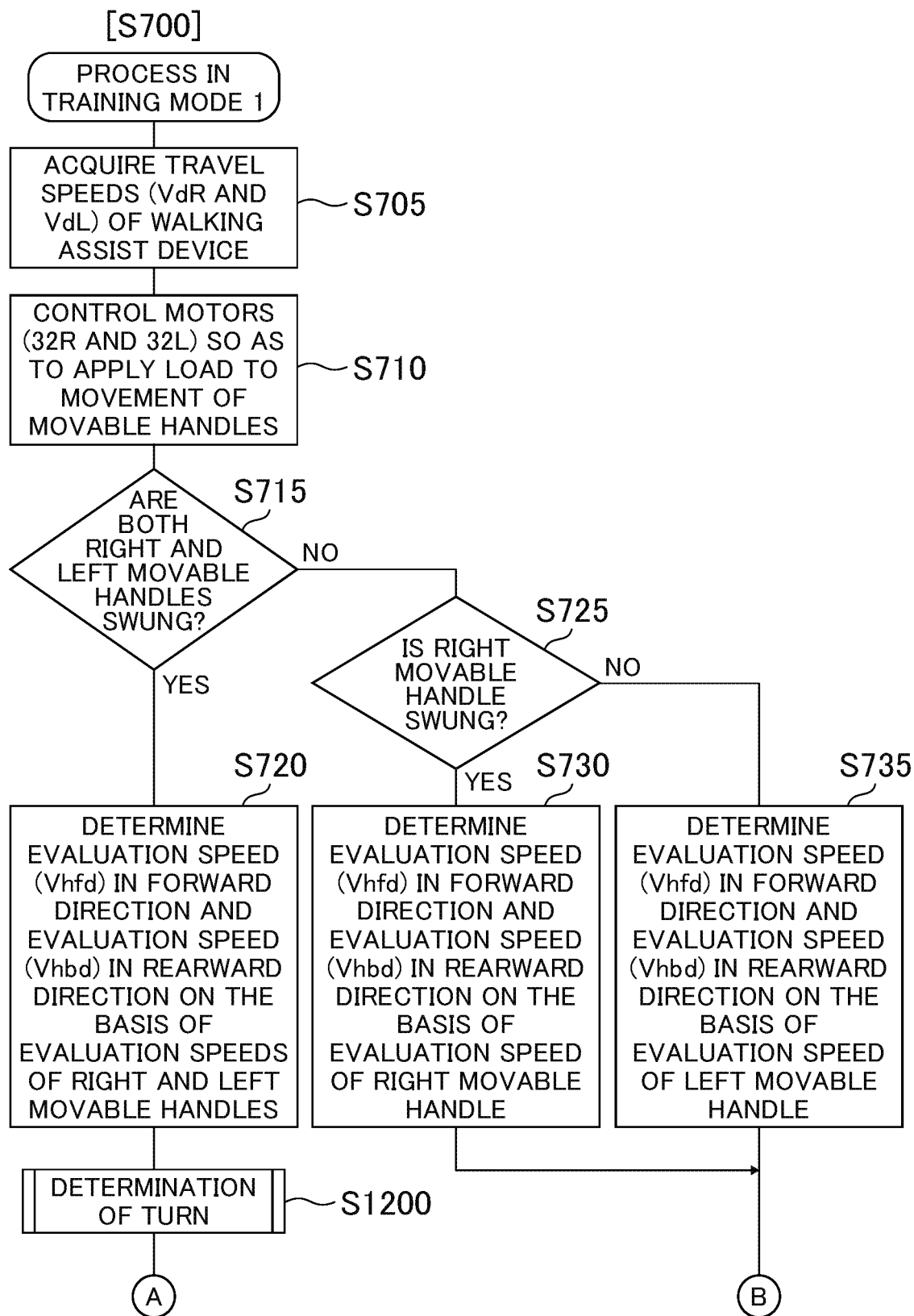
FIG. 13A is a flowchart illustrating the procedure of processes in a training mode 1 in the drive control unit of the walking assist device.
Figure 13B:
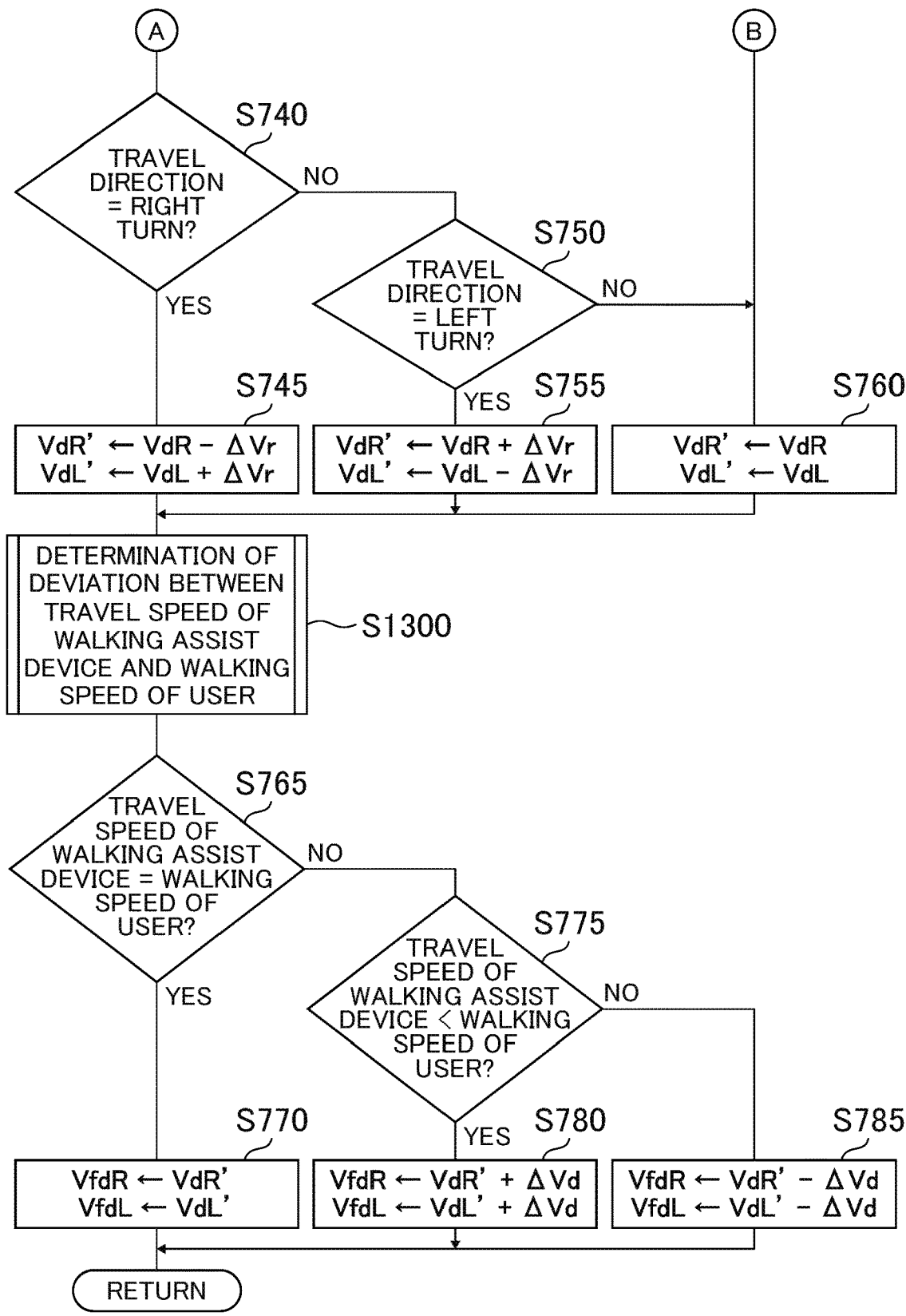
FIG. 13B is a flowchart illustrating the procedure of processes in a training mode 1 in the drive control unit of the walking assist device.

FIG. 13A and FIG. 13B are flowcharts illustrating the procedure of processes in the training mode 1 (TR1) in the drive control unit 40 of the walking assist device 10 (see FIGS. 1, 7, and 8). Step S700 (processes in the training mode 1) will be described with reference to the flowchart in FIG. 13A and FIG. 13B. With the regenerated power collecting unit 65 operating, an assist force is not generated in accordance with the acting force of the user.

In step S705, the drive control unit 40 acquires the travel speeds (VdR and VdL) of the walking assist device 10 from the storage unit 44, and proceeds to step S710.

In step S710, the drive control unit 40 controls the motors 32R and 32L so as to apply a load with a load amount derived by the load amount/assist amount change unit 74 to movement of the movable handles 20R and 20L, and proceeds to step S715.

In step S715, the drive control unit 40 proceeds to step S720 in the case where both the right movable handle 20R and the left movable handle 20L are moved, that is, both the right and left arms are swung (Yes), on the basis of information from the movable handle movement amount detection unit 81b, and proceeds to step S725 in the case where both the right and left arms are not swung (No).

In step S720, the drive control unit 40 determines an evaluation speed Vhfd in the forward direction and an evaluation speed Vhbd in the rearward direction on the basis of the evaluation speeds (VRhf, VRhb, VLhf, and VLhb) of the right and left movable handles 20R and 20L, and proceeds to step S1200 (determination of a turn). In the case where the amount of movement of the right movable handle 20R is "positive" and the amount of movement of the left movable handle 20L is "negative" (in the case where the right arm of the user is swung in the forward direction and the left arm of the user is swung in the rearward direction), the evaluation speed Vhfd in the forward direction is determined as the forward-direction evaluation speed VRhf, and the evaluation speed Vhbd in the rearward direction is determined as the rearward-direction evaluation speed VLhb. In the case where the amount of movement of the right movable handle 20R is "negative" and the amount of movement of the left movable handle 20L is "positive" (in the case where the left arm of the user is swung in the forward direction and the right arm of the user is swung in the rearward direction), the evaluation speed Vhfd in the forward direction is determined as the forward-direction evaluation speed VLhf, and the evaluation speed Vhbd in the rearward direction is determined as the rearward-direction evaluation speed VRhb.

In step S725, the drive control unit 40 proceeds to step S730 in the case where only the right movable handle 20R is moved, that is, the right arm is swung (Yes), on the basis of information from the movable handle movement amount detection unit 81b, and proceeds to step S735 in the case where the right arm is not swung (No).

In step S730, the drive control unit 40 determines an evaluation speed (Vhfd=VRhf) in the forward direction and an evaluation speed (Vhbd=VRhb) in the rearward direction on the basis of the evaluation speeds (forward-direction evaluation speed VRhf and rearward-direction evaluation speed VRhb) of the right movable handle 20R, and proceeds to step S760.

In step S735, the drive control unit 40 determines an evaluation speed (Vhfd=VLhf) in the forward direction and an evaluation speed (Vhbd=VLhb) in the rearward direction on the basis of the evaluation speeds (forward-direction evaluation speed VLhf and rearward-direction evaluation speed VLhb) of the left movable handle 20L, and proceeds to step S760.

In step S740, the drive control unit 40 proceeds to step S745 in the case where the travel direction of the walking assist device 10 is a right turn (Yes), and proceeds to step S750 in the case where the travel direction is not a right turn (No).

In step S745, the drive control unit 40 sets a target travel speed VdR' for the rear wheel 60RR, which serves as the right drive wheel of the walking assist device 10, to VdR−ΔVr (predetermined speed), sets a target travel speed VdL' for the rear wheel 60RL, which serves as the left drive wheel, to VdL+ΔVr (predetermined speed), and proceeds to step S1300 (determination of the deviation between the travel speed of the walking assist device and the walking speed of the user). ΔVr is a predetermined speed corresponding to the travel speeds (VdR and VdL), and is stored in the storage unit 44 in advance.

In step S750, the drive control unit 40 proceeds to step S755 in the case where the travel direction of the walking assist device 10 is a left turn (Yes), and proceeds to step S760 in the case where the travel direction is not a left turn (No).

In step S755, the drive control unit 40 sets the target travel speed VdR' for the rear wheel 60RR, which serves as the right drive wheel of the walking assist device 10, to VdR+ΔVr (predetermined speed), sets the target travel speed VdL' for the rear wheel 60RL, which serves as the left drive wheel, to VdL−ΔVr (predetermined speed), and proceeds to step S1300 (determination of the deviation between the travel speed of the walking assist device and the walking speed of the user).

In step S760, the drive control unit 40 sets the target travel speed VdR' for the rear wheel 60RR, which serves as the right drive wheel of the walking assist device 10, to VdR, sets the target travel speed VdL' for the rear wheel 60RL, which serves as the left drive wheel, to VdL, and proceeds to step S1300 (determination of the deviation between the travel speed of the walking assist device and the walking speed of the user).

In step S765, the drive control unit 40 proceeds to step S770 in the case where the travel speed of the walking assist device 10 is the same as the walking speed of the user (Yes), and proceeds to step S775 in the case where the travel speed of the walking assist device 10 is not the same as the walking speed of the user (No).

In step S770, the drive control unit 40 sets the target forward travel speed VfdR for the rear wheel 60RR, which serves as the right drive wheel of the walking assist device 10, to VdR', sets the target forward travel speed VfdL for the rear wheel 60RL, which serves as the left drive wheel, to VdL', finishes the processes in the training mode 1 (step S700), and returns to the overall process.

In step S775, the drive control unit 40 proceeds to step S780 in the case where the travel speed of the walking assist device 10 is lower than the walking speed of the user (Yes), and proceeds to step S785 in the case where the travel speed of the walking assist device 10 is not lower than the walking speed of the user (No).

In step S780, the drive control unit 40 sets the target forward travel speed VfdR for the rear wheel 60RR, which serves as the right drive wheel of the walking assist device 10, to VdR'+ΔVd (predetermined speed), sets the target forward travel speed VfdL for the rear wheel 60RL, which serves as the left drive wheel, to VdL'+ΔVd (predetermined speed), finishes the processes in the training mode 1 (step S700), and returns to the overall process. ΔVd is a predetermined speed corresponding to the target travel speeds (VdR' and VdL'), and is stored in the storage unit 44 in advance.

In step S785, the drive control unit 40 sets the target forward travel speed VfdR for the rear wheel 60RR, which serves as the right drive wheel of the walking assist device 10, to VdR'−ΔVd, sets the target forward travel speed VfdL for the rear wheel 60RL, which serves as the left drive wheel, to VdL'−ΔVd, finishes the processes in the training mode 1 (step S700), and returns to the overall process.

In the training mode 1 (TR1) (see FIG. 8), the walking assist device 10 can be caused to travel by applying a load to movement of the movable handles 20R and 20L in the front-rear direction through the motors 32R and 32L. Consequently, a load can be applied to operation (arm swing) of the body of the user performed as the user walks.

Even in the case where a failure is caused in one of the movable handle 20R and the movable handle 20L according to the movable handle acting force detection unit 81a and the movable handle movement amount detection unit 81b, the drive control unit 40 can cause the walking assist device 10 to travel using the other movable handle through the control discussed above.

In the case where the user desires to cause the walking assist device 10 to make a right turn, he/she swings the left movable handle 20L back and forth more greatly than the right movable handle 20R. Therefore, the drive control unit 40 determines a right turn, controls the drive unit 64L such that the rear wheel 60RL, which serves as the left drive wheel, is faster than the target travel speed by the predetermined speed (ΔVr), and controls the drive unit 64R such that the rear wheel 60RR, which serves as the right drive wheel, is slower than the target travel speed by the predetermined speed (ΔVr).

In the case where the user desires to cause the walking assist device 10 to make a left turn, he/she swings the right movable handle 20R back and forth more greatly than the left movable handle 20L. Therefore, the drive control unit 40 determines a left turn, controls the drive unit 64R such that the rear wheel 60RR, which serves as the right drive wheel, is faster than the target travel speed by the predetermined speed ($\Delta Vr$), and controls the drive unit 64L such that the rear wheel 60RL, which serves as the left drive wheel, is slower than the target travel speed by the predetermined speed ($\Delta Vr$).

Even in the case where a failure is caused in one of the movable handle 20R and the movable handle 20L according to the movable handle acting force detection unit 81a and the movable handle movement amount detection unit 81b, the drive control unit 40 can correct the deviation between the travel speed of the walking assist device 10 and the walking speed of the user using the other movable handle through the control discussed above.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. Thus, in order to correct the deviation between the travel speed of the walking assist device 10 and the walking speed of the user, in the case where the walking speed of the user is higher than the travel speed of the walking assist device 10, the drive control unit 40 sets the target travel speed VdR' for the rear wheel 60RR, which serves as the right drive wheel of the walking assist device 10, to VdR'+$\Delta$Vd (predetermined speed), and sets the target travel speed VdL' for the rear wheel 60RL, which serves as the left drive wheel, to VdL'+$\Delta$Vd (predetermined speed). Consequently, the deviation between the travel speed of the walking assist device and the walking speed of the user can be corrected.

Figure 14A:
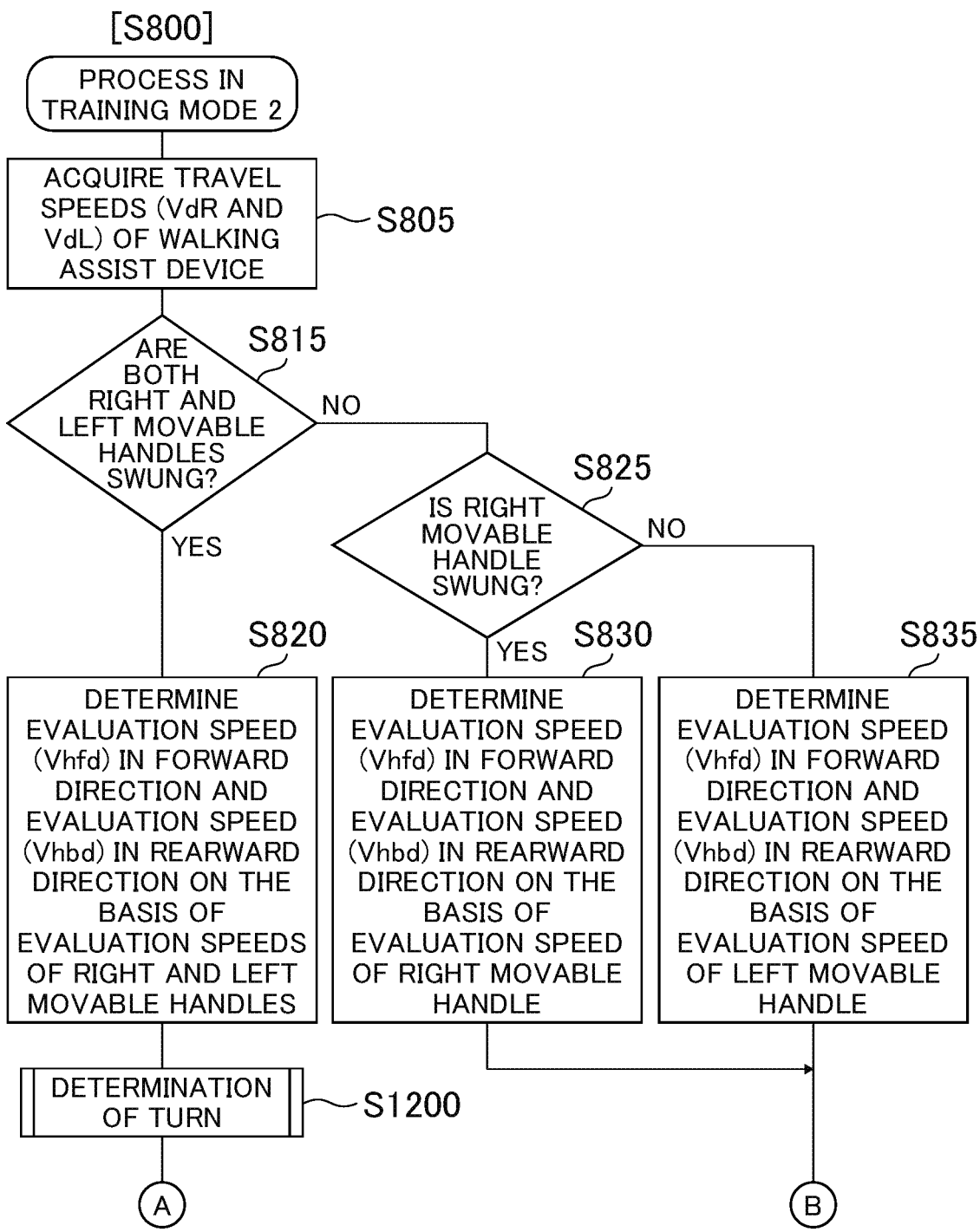
FIG. 14A is a flowchart illustrating the procedure of processes in a training mode 2 in the drive control unit of the walking assist device.
Figure 14B:
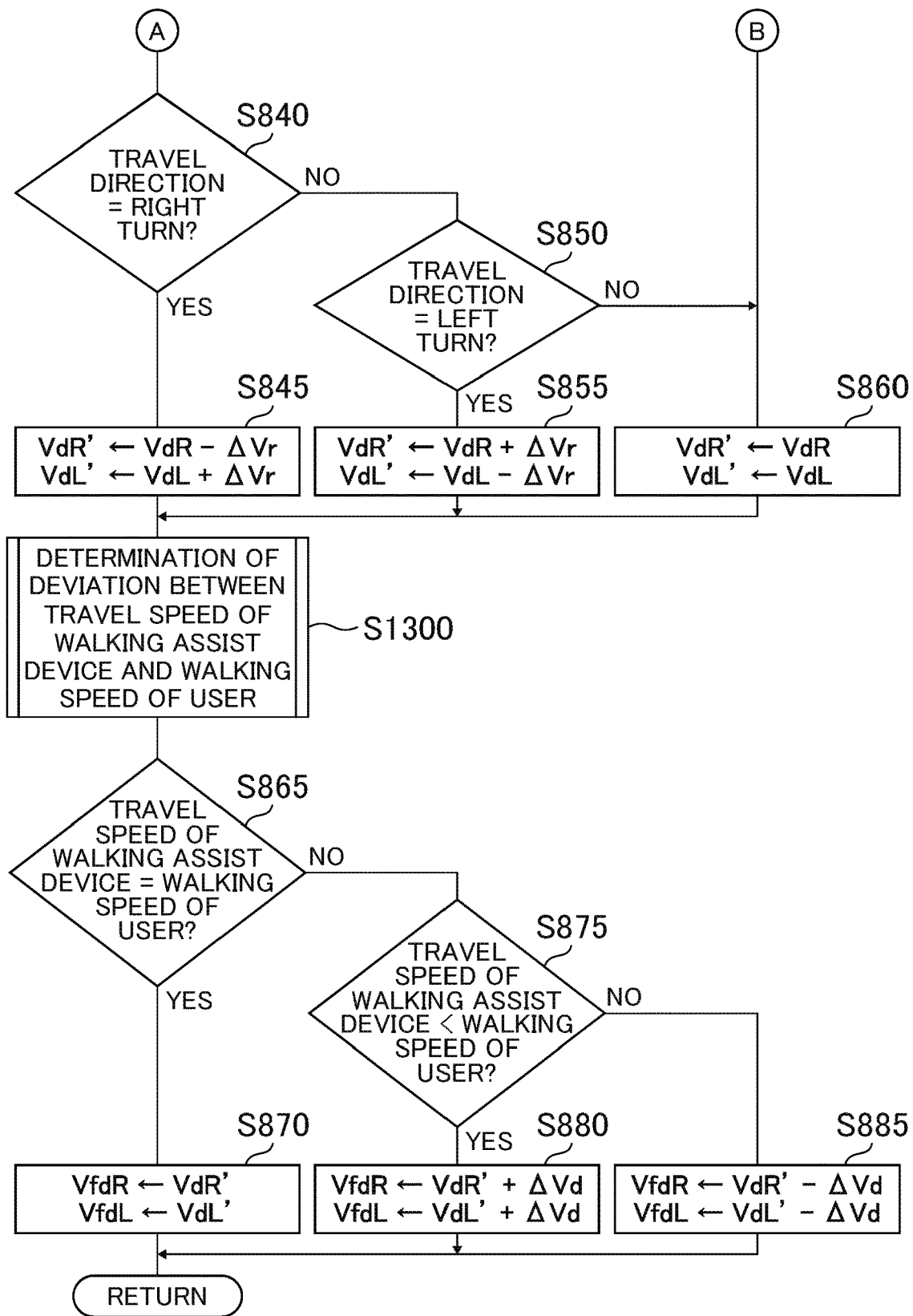
FIG. 14B is a flowchart illustrating the procedure of processes in a training mode 2 in the drive control unit of the walking assist device.

FIG. 14A and FIG. 14B are flowcharts illustrating the procedure of processes in the training mode 2 (TR2) in the drive control unit 40 of the walking assist device 10 (see FIGS. 1, 7, and 8). Step S800 (processes in the training mode 2) will be described with reference to the flowchart in FIG. 14A. The processes in the training mode 2 are the same as those in step S700 (processes in the training mode 1) except for the control (step S710) for the motors (32R and 32L) for applying a load to movement of the movable handles.

In step S805, the drive control unit 40 acquires the travel speeds (VdR and VdL) of the walking assist device 10 from the storage unit 44, and proceeds to step S815.

In step S815, the drive control unit 40 proceeds to step S820 in the case where both the right movable handle 20R and the left movable handle 20L are moved, that is, both the right and left arms are swung (Yes), on the basis of information from the movable handle movement amount detection unit 81b, and proceeds to step S825 in the case where both the right and left arms are not swung (No).

In step S820, the drive control unit 40 determines an evaluation speed Vhfd in the forward direction and an evaluation speed Vhbd in the rearward direction on the basis of the evaluation speeds (VRhf, VRhb, VLhf, and VLhb) of the right and left movable handles 20R and 20L, and proceeds to step S1200 (determination of a turn). In the case where the amount of movement of the right movable handle 20R is "positive" and the amount of movement of the left movable handle 20L is "negative" (in the case where the right arm of the user is swung in the forward direction and the left arm of the user is swung in the rearward direction), the evaluation speed Vhfd in the forward direction is determined as the forward-direction evaluation speed VRhf, and the evaluation speed Vhbd in the rearward direction is determined as the rearward-direction evaluation speed VLhb. In the case where the amount of movement of the right movable handle 20R is "negative" and the amount of movement of the left movable handle 20L is "positive" (in the case where the left arm of the user is swung in the forward direction and the right arm of the user is swung in the rearward direction), the evaluation speed Vhfd in the forward direction is determined as the forward-direction evaluation speed VLhf, and the evaluation speed Vhbd in the rearward direction is determined as the rearward-direction evaluation speed VRhb.

In step S825, the drive control unit 40 proceeds to step S830 in the case where only the right movable handle 20R is moved, that is, the right arm is swung (Yes), on the basis of information from the movable handle movement amount detection unit 81b, and proceeds to step S835 in the case where the right arm is not swung (No).

In step S830, the drive control unit 40 determines an evaluation speed (Vhfd=VRhf) in the forward direction and an evaluation speed (Vhbd=VRhb) in the rearward direction on the basis of the evaluation speeds (forward-direction evaluation speed VRhf and rearward-direction evaluation speed VRhb) of the right movable handle 20R, and proceeds to step S860.

In step S835, the drive control unit 40 determines an evaluation speed (Vhfd=VLhf) in the forward direction and an evaluation speed (Vhbd=VLhb) in the rearward direction on the basis of the evaluation speeds (forward-direction evaluation speed VLhf and rearward-direction evaluation speed VLhb) of the left movable handle 20L, and proceeds to step S860.

In step S840, the drive control unit 40 proceeds to step S845 in the case where the travel direction of the walking assist device 10 is a right turn (Yes), and proceeds to step S850 in the case where the travel direction is not a right turn (No).

In step S845, the drive control unit 40 sets a target travel speed VdR' for the rear wheel 60RR, which serves as the right drive wheel of the walking assist device 10, to VdR−$\Delta$Vr (predetermined speed), sets a target travel speed VdL' for the rear wheel 60RL, which serves as the left drive wheel, to VdL+$\Delta$Vr (predetermined speed), and proceeds to step S1300 (determination of the deviation between the travel speed of the walking assist device and the walking speed of the user). $\Delta$Vr is a predetermined speed corresponding to the travel speeds (VdR and VdL), and is stored in the storage unit 44 in advance.

In step S850, the drive control unit 40 proceeds to step S855 in the case where the travel direction of the walking assist device 10 is a left turn (Yes), and proceeds to step S860 in the case where the travel direction is not a left turn (No).

In step S855, the drive control unit 40 sets the target travel speed VdR' for the rear wheel 60RR, which serves as the right drive wheel of the walking assist device 10, to VdR+$\Delta$Vr (predetermined speed), sets the target travel speed VdL' for the rear wheel 60RL, which serves as the left drive wheel, to VdL−$\Delta$Vr (predetermined speed), and proceeds to step S1300 (determination of the deviation between the travel speed of the walking assist device 10 and the walking speed of the user).

In step S860, the drive control unit 40 sets the target travel speed VdR' for the rear wheel 60RR, which serves as the right drive wheel of the walking assist device 10, to VdR, sets the target travel speed VdL' for the rear wheel 60RL, which serves as the left drive wheel, to VdL, and proceeds to step S1300 (determination of the deviation between the travel speed of the walking assist device and the walking speed of the user).

In step S865, the drive control unit 40 proceeds to step S870 in the case where the travel speed of the walking assist device 10 is the same as the walking speed of the user (Yes), and proceeds to step S875 in the case where the travel speed of the walking assist device 10 is not the same as the walking speed of the user (No).

In step S870, the drive control unit 40 sets the target forward travel speed VfdR for the rear wheel 60RR, which serves as the right drive wheel of the walking assist device 10, to VdR', sets the target forward travel speed VfdL for the rear wheel 60RL, which serves as the left drive wheel, to VdL', finishes the processes in the training mode 2 (step S800), and returns to the overall process.

In step S875, the drive control unit 40 proceeds to step S880 in the case where the travel speed of the walking assist device 10 is lower than the walking speed of the user (Yes), and proceeds to step S885 in the case where the travel speed of the walking assist device 10 is not lower than the walking speed of the user (No).

In step S880, the drive control unit 40 sets the target forward travel speed VfdR for the rear wheel 60RR, which serves as the right drive wheel of the walking assist device 10, to VdR'+ΔVd (predetermined speed), sets the target forward travel speed VfdL for the rear wheel 60RL, which serves as the left drive wheel, to VdL'+ΔVd (predetermined speed), finishes the processes in the training mode 2 (step S800), and returns to the overall process. ΔVd is a predetermined speed corresponding to the target travel speeds (VdR' and VdL'), and is stored in the storage unit 44 in advance.

In step S885, the drive control unit 40 sets the target forward travel speed VfdR for the rear wheel 60RR, which serves as the right drive wheel of the walking assist device 10, to VdR'−ΔVd, sets the target forward travel speed VfdL for the rear wheel 60RL, which serves as the left drive wheel, to VdL'−ΔVd, finishes the processes in the training mode 2 (step S800), and returns to the overall process.

In the training mode 2 (TR2) (see FIG. 8), no load is applied to the movable handles 20R and 20L, and the walking assist device 10 can be caused to travel with an assist force with which operation (walk) of the body of the user performed as the user walks is equivalent to operation in a no-load state.

Even in the case where a failure is caused in one of the movable handle 20R and the movable handle 20L according to the movable handle acting force detection unit 81a and the movable handle movement amount detection unit 81b, the drive control unit 40 can cause the walking assist device 10 to travel using the other movable handle through the control discussed above.

In the case where the user desires to cause the walking assist device 10 to make a right turn, he/she swings the left movable handle 20L back and forth more greatly than the right movable handle 20R. Therefore, the drive control unit 40 determines a right turn, controls the drive unit 64L such that the left rear wheel 60RL is faster than the target travel speed by the predetermined speed (ΔVr), and controls the drive unit 64R such that the right rear wheel 60RR is slower than the target travel speed by the predetermined speed (ΔVr).

Even in the case where a failure is caused in information on one of the movable handle 20R and the movable handle 20L according to the movable handle acting force detection unit 81a and the movable handle movement amount detection unit 81b, the drive control unit 40 can correct the deviation between the travel speed of the walking assist device 10 and the walking speed of the user on the basis of information on the other movable handle through the control discussed above.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. Thus, in order to correct the deviation between the travel speed of the walking assist device 10 and the walking speed of the user, in the case where the walking speed of the user is higher than the travel speed of the walking assist device 10, the drive control unit 40 sets the target travel speed VdR' for the rear wheel 60RR, which serves as the right drive wheel of the walking assist device 10, to VdR'+ΔVd (predetermined speed), and sets the target travel speed VdL' for the rear wheel 60RL, which serves as the left drive wheel, to VdL'+ΔVd (predetermined speed). Consequently, the deviation between the travel speed of the walking assist device 10 and the walking speed of the user can be corrected.

Figure 15A:
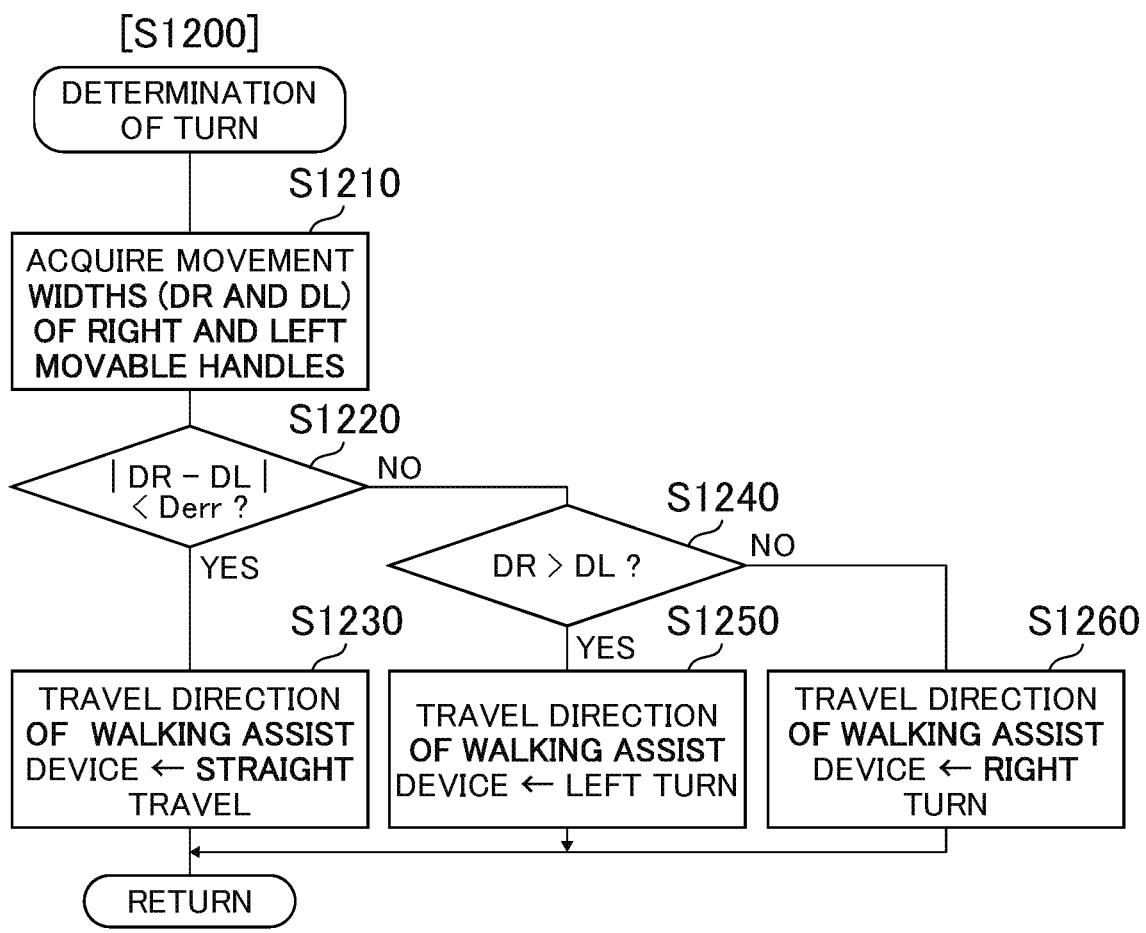
FIG. 15A is a flowchart illustrating the procedure of processes for determination of a turn and determination of the deviation between the travel speed of the walking assist device and the walking speed of a user in the drive control unit of the walking assist device.

FIG. 15A and FIG. 15B are flowcharts illustrating the procedure of processes for determination of a turn in the drive control unit 40 of the walking assist device 10 (see FIGS. 1 and 7). Step S1200 (determination of a turn) will be described with reference to the flowchart in FIG. 15A.

In step S1210, the drive control unit 40 acquires the width of movement DR of the right movable handle 20R and the width of movement DL of the left movable handle 20L from the storage unit 44, and proceeds to step S1220.

In step S1220, the drive control unit 40 proceeds to step S1230 in the case where the absolute value |DR−DL| of the difference between the width of movement DR of the right movable handle 20R and the width of movement DL of the left movable handle 20L is less than Derr set in advance (Yes; determined as straight travel), and proceeds to step S1240 in the case where |DR−DL| is not less than Derr (No). Derr is a predetermined value determined in advance, and is stored in the storage unit 44.

In step S1230, the drive control unit 40 sets the travel direction of the walking assist device 10 to "straight travel", and finishes the determination of a turn (step S1200). The drive control unit 40 proceeds to step S740 in the case where step S1200 is called in step S700, and proceeds to step S840 in the case where step S1200 is called in step S800.

In step S1240, the drive control unit 40 proceeds to step S1250 in the case where the width of movement DR is larger than the width of movement DL (Yes; determined as a left turn), and proceeds to step S1260 in the case where the width of movement DR is not larger than the width of movement DL (No; determined as a right turn).

In step S1250, the drive control unit 40 sets the travel direction of the walking assist device 10 to a left turn, and finishes the determination of a turn (step S1200). The drive control unit 40 proceeds to step S740 in the case where step S1200 is called in step S700, and proceeds to step S840 in the case where step S1200 is called in step S800.

In step S1260, the drive control unit 40 sets the travel direction of the walking assist device 10 to a right turn, and finishes the determination of a turn (step S1200). The drive control unit 40 proceeds to step S740 in the case where step S1200 is called in step S700, and proceeds to step S840 in the case where step S1200 is called in step S800.

In the case where the user desires to cause the walking assist device 10 to make a right turn, he/she swings the left movable handle 20L back and forth more greatly than the right movable handle 20R, and therefore the drive control unit 40 determines a right turn. In the case where the user desires to cause the walking assist device 10 to make a left turn, he/she swings the right movable handle 20R back and forth more greatly than the left movable handle 20L, and therefore the drive control unit 40 determines a left turn.

FIG. 15A and FIG. 15B are flowcharts illustrating the procedure of processes for determination of the deviation between the travel speed of the walking assist device 10 and the walking speed of the user in the drive control unit 40 of the walking assist device 10 (see FIGS. 1 and 7). Step S1300 (determination of the deviation between the travel speed of the walking assist device 10 and the walking speed of the user) will be described with reference to the flowchart in FIG. 15B.

In step S1320, the drive control unit 40 determines whether or not the absolute value |Vhfd+Vhbd| of the difference between the evaluation speed Vhfd in the forward direction and the evaluation speed Vhbd in the rearward direction is less than ΔVerr which is set in advance as a first determination condition. The drive control unit 40 determines that the first determination condition is "Yes" in the case where the absolute value |Vhfd+Vhbd| is less than ΔVerr, and determines that the first determination condition is "No" otherwise. The drive control unit 40 also determines, on the basis of information from the grasp portion state detection unit 81, whether or not the movable handles 20R and 20L are moved to the vicinity of the front end, or the vicinity of the rear end, of the rail slit portions 38 of the rails (30R and 30L) as a second determination condition. The drive control unit 40 determines that the second determination condition is "Yes" in the case where both the movable handles 20R and 20L are not moved to the vicinity of the front end, or the vicinity of the rear end, of the rail slit portions 38, and determines that the second determination condition is "No" otherwise. The drive control unit 40 proceeds to step S1330 in the case where the first determination condition is "Yes" and the second determination condition is "Yes" (Yes), and proceeds to step S1340 otherwise (No). The evaluation speed Vhfd in the forward direction is defined as "positive", and the evaluation speed Vhbd in the rearward direction is defined as "negative". Therefore, the difference between such speeds is the sum thereof (Vhfd+Vhbd).

In step S1330, the drive control unit 40 sets the travel speed of the walking assist device to be "the same as the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

In step S1340, the drive control unit 40 determines whether or not the absolute value |Vhfd| of the evaluation speed in the forward direction is larger than the absolute value |Vhbd| of the evaluation speed in the rearward direction as a first determination condition. The drive control unit 40 determines that the first determination condition is "Yes" in the case where the absolute value |Vhfd| is larger than the absolute value |Vhbd|, and determines that the first determination condition is "No" otherwise. The drive control unit 40 also determines, on the basis of information from the grasp portion state detection unit 81, whether or not the movable handle 20R or the movable handle 20L is moved to the vicinity of the front end of the rail slit portion 38 of the rail (30R or 30L) as a second determination condition. The drive control unit 40 determines that the second determination condition is "Yes" in the case where the movable handle 20R or the movable handle 20L is moved to the vicinity of the front end of the rail slit portion 38, and determines that the second determination condition is "No" otherwise.

In step S1350, the drive control unit 40 sets the travel speed of the walking assist device 10 to be "lower than the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

In step S1360, the drive control unit 40 sets the travel speed of the walking assist device 10 to be "higher than the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

The determinations in step S1320 and step S1340 may be made using only the first determination condition or the second determination condition.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. In the case where the travel speed of the walking assist device 10 is higher than the walking speed of the user, the magnitude of the evaluation speed Vhfd in the forward direction is smaller than the magnitude of the evaluation speed Vhbd in the rearward direction because of the difference between the walking speed of the user and the travel speed of the walking assist device 10. The drive control unit 40 increases the travel speeds (VdR and VdL) of the walking assist device 10 in the case where the travel speeds (VdR and VdL) of the walking assist device 10 are lower than the walking speed of the user, and decreases the travel speeds of the walking assist device 10 in the case where the travel speeds of the walking assist device 10 are higher than the walking speed of the user. Consequently, travel of the walking assist device 10 of the walker can be controlled appropriately in accordance with the speed of front-rear arm swing by the user by correcting the deviation between the travel speed of the walking assist device 10 and the walking speed of the user.

FIG. 16 illustrates mode transition conditions for transitioning among the operation modes on the basis of the body state, the atmospheric state, and the vehicle body state. FIG. 17 illustrates conditions for transitioning to the various operation modes in the case where the operation mode is automatically switched. In the case where the automatic mode switching unit switch 76b is on, the drive control unit 40 determines the operation mode in accordance with the conditions indicated in FIGS. 9, 16, and 17 in step S200 (determination of the operation mode based on each acquired state) in FIG. 10A on the basis of information selected using the manual mode switching unit 76a.

In the case where one of conditions S1 to S6 is met, the drive control unit 40 changes the operation mode to an operation mode corresponding to the condition. In FIGS. 16 and 17, the symbol "–" indicates that the state may be either "0" or "1".

In FIG. 16, the mode transition conditions are determined on the basis of the body state, the atmospheric state, and the vehicle body state. The drive control unit 40 determines the mode transition condition as "1=without abnormality" only in the case where all the states are "1", and as "0=with abnormality" in the case where any of the conditions is "0".

Examples of the body state include the heart rate and the body temperature of the user. The drive control unit 40 compares the heart rate and the body temperature which are acquired by the heart rate/body temperature sensors 27a and 27b with predetermined values stored in advance in the storage unit 44, and determines the body state as "abnormal=0" in the case where such predetermined values are exceeded, and as "normal=1" otherwise.

Examples of the atmospheric state include the outside temperature. The drive control unit 40 compares the outside temperature which is acquired by the outside temperature sensor 54 with a predetermined value stored in advance in the storage unit 44, and determines the atmospheric state as "uncomfortable=0" in the case where such a predetermined value is exceeded, and as "comfortable=1" otherwise.

Examples of the vehicle body state include the inclination of the vehicle body, an impact on the vehicle body (variations in the acceleration applied to the body), the walking distance, and the walking time. The drive control unit 40 compares information acquired by the three-axis acceleration/angular speed sensor 52 with a predetermined value stored in advance in the storage unit 44, and determines the inclination of the vehicle body as "yes=0" in the case where the inclination of the vehicle body exceeds such a predetermined value, and as "no=1" otherwise. The drive control unit 40 compares information acquired by the three-axis acceleration/angular speed sensor 52 with a predetermined condition stored in advance in the storage unit 44, and determines an impact on the vehicle body as "yes=0" in the case where such a condition is met, and as "no=1" otherwise.

The drive control unit 40 determines the walking distance as "long=0" on the basis of a history of the walking distance stored in the storage unit 44 in the case where the walking distance is longer than a predetermined distance, and as "short=1" otherwise. The drive control unit 40 determines the walking time as "long=0" on the basis of a history of the walking time stored in the storage unit 44 in the case where the walking time is longer than a predetermined time, and as "short=1" otherwise.

In FIG. 17, the drive control unit 40 switches between the assist mode 1 (AM1) and the training mode 4 (TR4), between the assist mode 2 (AM2) and the training mode 3 (TR3), or between the training mode 1 (TR1) and the training mode 2 (TR2) in FIG. 8 on the basis of the conditions S1 to S6.

The condition S1 and the condition S2 are conditions for switching determination of the operation mode between the training mode 1 (TR1) and the training mode 2 (TR2). In the case where the manual mode switching unit 76a selects the "training mode 1", the moving handle grasping state is "1=grasped", the arm swing state is "1=with arm swing", the fixed handle grasping state is "0=not grasped", and the mode transition condition is "1=without abnormality", the condition S1 is met, and the drive control unit 40 causes the operation mode to transition from the training mode 2 (TR2) to the training mode 1 (TR1). In the case where the manual mode switching unit 76a selects the "training mode 1", the moving handle grasping state is "1=grasped", the arm swing state is "1=with arm swing", the fixed handle grasping state is "0=not grasped", and the mode transition condition is "0=with abnormality", the condition S2 is met, and the drive control unit 40 causes the operation mode to transition from the training mode 1 (TR1) to the training mode 2 (TR2).

The condition S3 and the condition S4 are conditions for switching determination of the operation mode between the assist mode 2 (AM2) and the training mode 3 (TR3). In the case where the manual mode switching unit 76a selects the "training mode 3", the moving handle grasping state is "1=grasped", the arm swing state is "0=without arm swing", the fixed handle grasping state is "0=not grasped", and the mode transition condition is "1=without abnormality", the condition S3 is met, and the drive control unit 40 causes the operation mode to transition from the assist mode 2 (AM2) to the training mode 3 (TR3). In the case where the manual mode switching unit 76a selects the "training mode 3", the moving handle grasping state is "1=grasped", the arm swing state is "0=without arm swing", the fixed handle grasping state is "0=not grasped", and the mode transition condition is "0=with abnormality", the condition S4 is met, and the drive control unit 40 causes the operation mode to transition from the training mode 3 (TR3) to the assist mode 2 (AM2).

The condition S5 and the condition S6 are conditions for switching determination of the operation mode between the assist mode 1 (AM1) and the training mode 4 (TR4). In the case where the manual mode switching unit 76a selects the "training mode 3", the moving handle grasping state is "0=not grasped", the arm swing state is "0=without arm swing", the fixed handle grasping state is "1=grasped", and the mode transition condition is "1=without abnormality", the condition S5 is met, and the drive control unit 40 causes the operation mode to transition from the assist mode 1 (AM1) to the training mode 4 (TR4). In the case where the manual mode switching unit 76a selects the "training mode 3", the moving handle grasping state is "0=not grasped", the arm swing state is "0=without arm swing", the fixed handle grasping state is "1=grasped", and the mode transition condition is "0=with abnormality", the condition S6 is met, and the drive control unit 40 causes the operation mode to transition from the training mode 4 (TR4) to the assist mode 1 (AM1).

Next, the second embodiment which embodies the walking assist device according to the present invention will be described with reference to FIGS. 18 to 31. In the following description, the same symbols as those of the components etc. of the walking assist device 10 according to the first embodiment in FIGS. 1 to 17 denote components that are the same as or corresponding to the components etc. of the walking assist device 10 according to the first embodiment.

Figure 18:
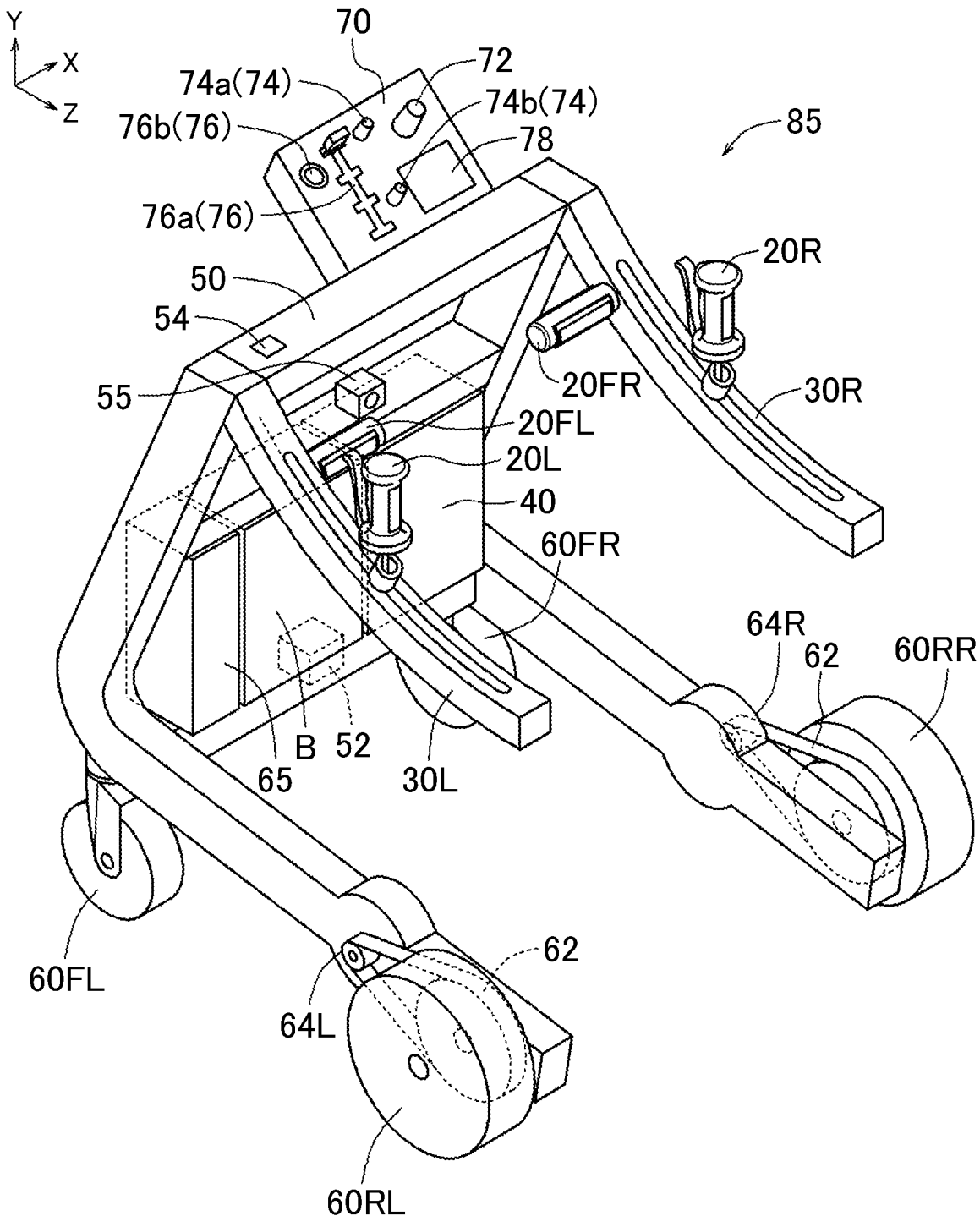
FIG. 18 is a perspective view illustrating the overall configuration of a walking assist device according to a second embodiment.

A schematic configuration of a walking assist device 85 according to the second embodiment which implements the present invention will be described with reference to FIG. 18. FIG. 18 illustrates the walking assist device 85 according to the second embodiment. As illustrated in FIG. 18, the configuration, control process, etc. of the walking assist device 85 according to the second embodiment are substantially the same as the configuration, control process, etc. of the walking assist device 10 according to the first embodiment. It should be noted, however, that in the walking assist device 85 according to the second embodiment, a camera 55 that functions as an example of an imaging device that captures an image of motion of legs of the user is disposed at the upper end of a housing that houses the drive control unit 40. As discussed later, the camera 55 is electrically connected to the drive control unit 40 (see FIG. 20).

The camera 55 may be a depth camera that captures a normal image and that measures the depth from the camera 55 to the legs of the user in real time. Specifically, the camera 55 may include a camera for RGB color video and an infrared camera and an infrared light emitting portion for depth measurement, for example. In this manner, use of a depth camera as the camera 55 enables capturing an image of motion of the legs of the user, that is, an RGB image of the user in the walking state, and measuring the depth from the camera 55 to the legs of the user in real time at the same time.

As a result, as discussed later, a walking state determination section 86 (see FIG. 20) provided in the drive control unit 40 determines the time rate (see FIG. 21) of the walking state in one gait cycle of one of the legs, e.g. the right leg, of the user on the basis of the image processing result of an image in which the user is walking and which is input from the camera 55 and the depth from the camera 55 to the legs of the user.

The "time rate" of the walking state in one gait cycle is index information that indicates what phase in one gait cycle the operation state of the legs of the walker corresponds to. For example, as illustrated in FIG. 21, the time rate is used as a numerical index determined when one gait cycle of the right leg from the start point at which the right heel contacts the ground to the end point at which the right heel contacts the ground again is defined as "0%" to "100%". The walking state determination section 86 (see FIG. 20) which is provided in the drive control unit 40 determines the time rate of the walking state in one gait cycle by determining what percentage of numerical data (phase) in one gait cycle the acquired operation state of the right leg corresponds to on the basis of the image processing result of an image in which the user is walking and the depth from the camera 55 to the legs of the user.

The numerical data corresponding to the operation state of the leg may be obtained by filtering an image captured by the camera 55. The time rate which represents the phase in one gait cycle is not limited to numerical representation from "0%" to "100%", and may be represented using any other numerical representation that can indicate what phase in one gait cycle the operation state of the legs corresponds to. The time rate of the walking state in one gait cycle is not limited to a numerical index, and may be represented using a symbolic index such as characters, matching of non-numerical or non-symbolic data such as images, or the like.

Figure 19:
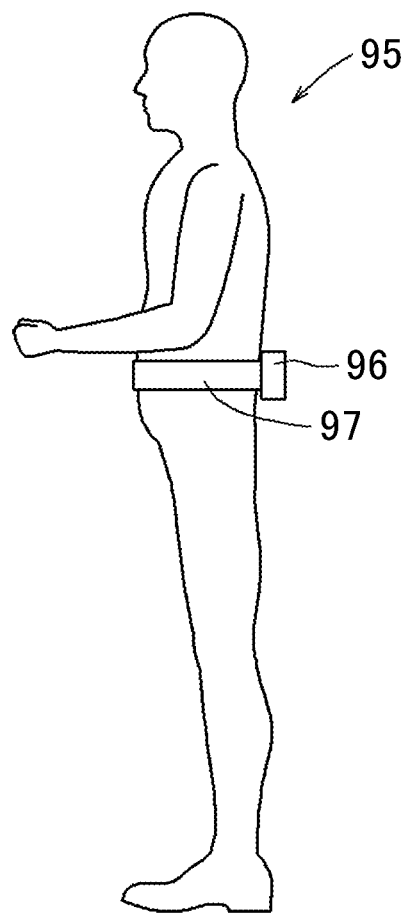
FIG. 19 is a left side view illustrating an example in which the user wears a three-axis acceleration sensor.

As illustrated in FIG. 19, a three-axis acceleration sensor 96 may be mounted to the waist portion of a user 95 of the walking assist device 85 using a belt 97 or the like in place of or in addition to the camera 55. The three-axis acceleration sensor 96 is configured to be able to measure the acceleration of the waist portion in each of the front-rear direction, the right-left direction, and the vertical direction during walk of the user 95. The three-axis acceleration sensor 96 may be configured to transmit the result of measuring the acceleration of the waist portion in each of the front-rear direction, the right-left direction, and the vertical direction during walk of the user 95 to the drive control unit 40 in real time wirelessly, for example.

Figure 20:
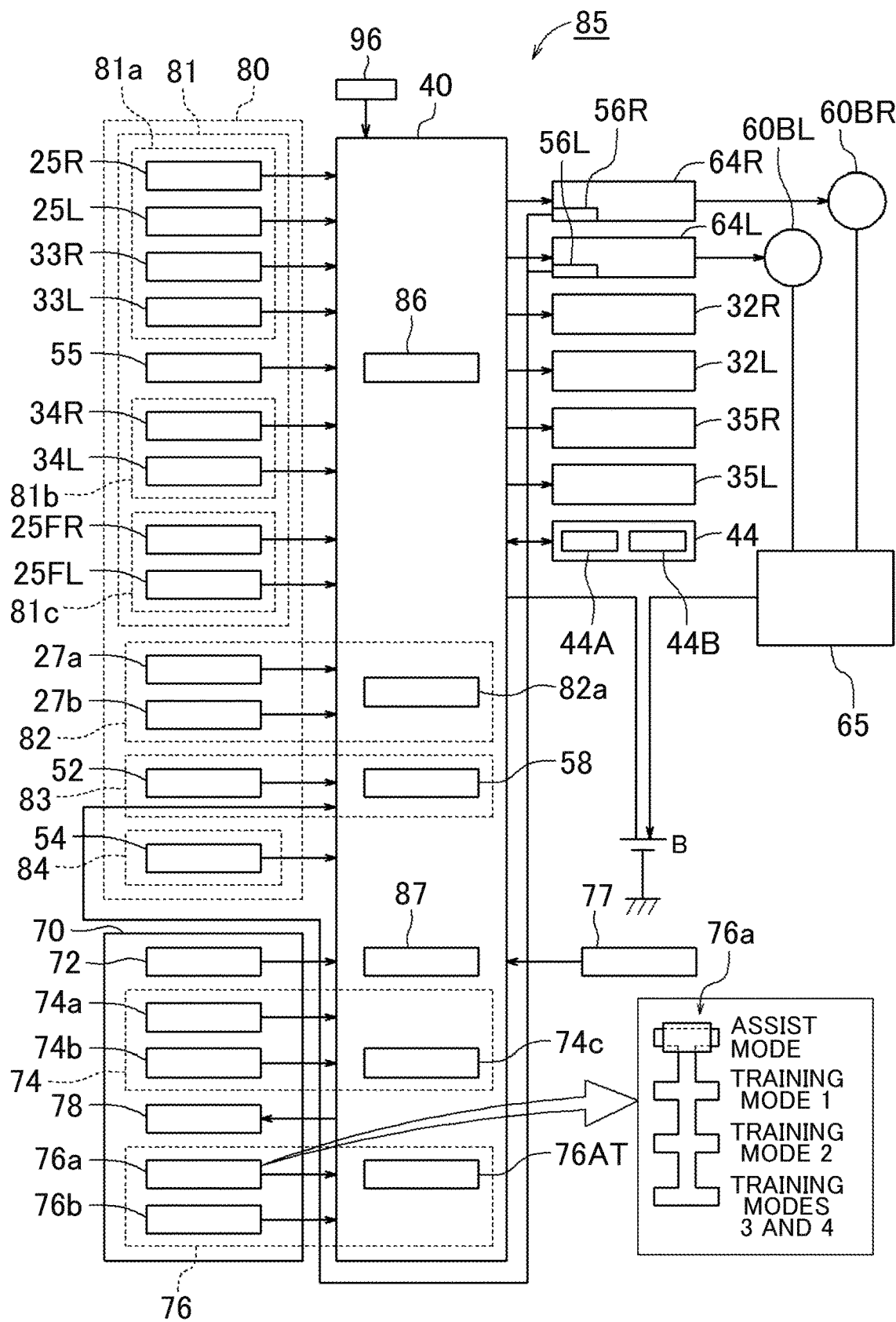
FIG. 20 is a block diagram illustrating inputs and outputs of a drive control unit of the walking assist device according to the second embodiment.
Figure 21:
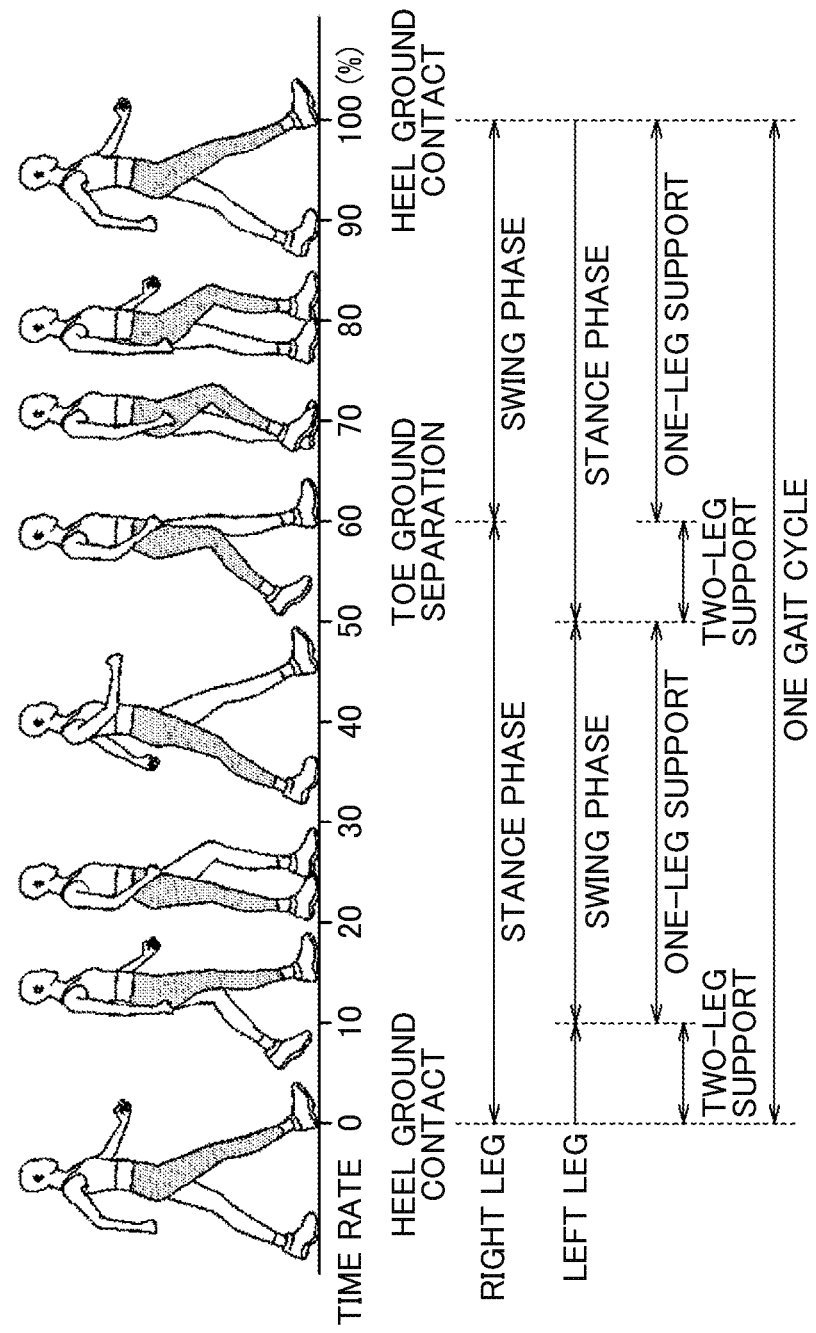
FIG. 21 illustrates one gait cycle from a right heel ground contact to the next right heel ground contact.

The drive control unit 40 may be configured to be able to receive the result of measuring the acceleration of the waist portion in each of the front-rear direction, the right-left direction, and the vertical direction during walk of the user 95 from the three-axis acceleration sensor 96 (see FIG. 20). The walking state determination section 86 (see FIG. 20) which is provided in the drive control unit 40 acquires the operation state of one of the legs, e.g. the right leg, of the user 95 on the basis of the acceleration of the waist portion in each of the front-rear direction, the right-left direction, and the vertical direction during walk of the user 95.

The walking state determination section 86 which is provided in the drive control unit 40 may determine the time rate (see FIG. 21) of the walking state in one gait cycle by determining what percentage of numerical data (phase) in one gait cycle the acquired operation state of the right leg corresponds to. The drive control unit 40 may determine the time rate of the walking state in one gait cycle by performing a computation process on numerical data on the acceleration of the waist portion in each of the front-rear direction, the right-left direction, and the vertical direction during walk of the user 95 which is received from the three-axis acceleration sensor 96.

FIG. 20 is a block diagram illustrating inputs and outputs of the drive control unit 40 of the walking assist device 85 (see FIG. 18). As illustrated in FIG. 20, the input/output configuration of the drive control unit 40 of the walking assist device 85 is substantially the same as that of the drive control unit 40 of the walking assist device 10 according to the first embodiment. It should be noted, however, that the drive control unit 40 of the walking assist device 85 is different from the drive control unit 40 of the walking assist device 10 according to the first embodiment in the following points.

In the walking assist device 85, the grasp portion state detection unit 81 which constitutes the state detection unit 80 is composed of a movable handle acting force detection unit 81*a*, a movable handle movement amount detection unit 81*b*, a fixed handle acting force detection unit 81*c*, and the camera 55. The camera 55 is electrically connected to the drive control unit 40. As discussed above, the camera 55 outputs the image processing result of an image in which the user is walking and the depth from the camera 55 to the legs of the user to the drive control unit 40. The right handle position detection unit 34R and the left handle position detection unit 34L which constitute the movable handle movement amount detection unit 81*b* output the positions of movement, the amounts of movement, and the speeds of movement of the movable handles 20R and 20L with respect to the rails 30R and 30L to the drive control unit 40 every predetermined time.

As illustrated in FIG. 20, the three-axis acceleration sensor 96 (see FIG. 19) which is mounted to the waist portion of the user 95 using the belt 97 or the like may be included in the grasp portion state detection unit 81. The three-axis acceleration sensor 96 may be connected to the drive control unit 40 wirelessly, for example. As discussed above, the three-axis acceleration sensor 96 may output the result of measuring the acceleration of the waist portion in the front-rear direction, the right-left direction, and the vertical direction during walk of the user 95 to the drive control unit 40 wirelessly, for example.

The drive control unit 40 has the walking state determination section 86 which determines the time rate (see FIG. 21) of the walking state in one gait cycle with one gait cycle of one of the legs, e.g. the right leg, of the user defined as "100%". The walking state determination section 86 determines the time rate (see FIG. 21) of the walking state in one gait cycle with one gait cycle of one of the legs, e.g. the right leg, during walk in which the user swings his/her arms while grasping the movable handles 20R and 20L defined as "100%" from the positions of movement, the amounts of movement, and the speeds of movement of the movable handles 20R and 20L with respect to the rails 30R and 30L which are input from the movable handle movement amount detection unit 81*b*.

For example, as illustrated in FIG. 21, when the left movable handle 20L is moved forward and the speed of movement is first brought to "0", the walking state determination section 86 determines that the right heel of the user has contacted the ground, that is, the time rate is at its initial value of one gait cycle which is defined as "100%", and that the time rate of the walking state in one gait cycle is "0%". When the right movable handle 20R is moved forward and the speed of movement is brought to "0", the walking state determination section 86 determines that the left heel of the user has contacted the ground, that is, the time rate is at its median value of one gait cycle which is defined as "100%", and that the time rate of the walking state in one gait cycle is "50%".

After that, when the left movable handle 20L is moved forward and the speed of movement is brought to "0", the walking state determination section 86 determines that the right heel of the user has contacted the ground, that is, the time rate is at its maximum value of one gait cycle which is defined as "100%", and that the time rate of the walking state in one gait cycle is "100%". The walking state determination section 86 repeats the above processes, and determines the time rate (%) of the walking state in one gait cycle with one gait cycle of one of the legs, e.g. the right leg, defined as "100%" from the positions of movement (corresponding to the arm position), the amounts of movement (corresponding to the arm swing width), and the speeds of movement (corresponding to the arm swing speed) of the movable handles 20R and 20L with respect to the rails 30R and 30L. Thus, the time rate (%) is determined with one gait cycle defined as "100%".

The time rate of the walking state in one gait cycle of one of the legs, e.g. the right leg, of the user will be described with reference to FIG. 21. The gait cycle of the left leg is the same as, and half a cycle behind, the gait cycle of the right leg. Thus, one gait cycle of the right leg will be described below. As illustrated in FIG. 21, one gait cycle of the right leg starts when the right heel contacts the ground, and finishes when the right heel contacts the ground again. The period with a time rate of "0%" to "60%" with one gait cycle defined as "100%" (hereinafter referred to simply as "time rate") is defined as a stance phase, in which the right foot portion contacts the ground. The period with a time rate of "60%" to "100%" is defined as a swing phase, in which the left foot portion contacts the ground with the right foot portion off the ground.

Thus, as illustrated in FIG. 21, when the time rate of the walking state in one gait cycle of the right leg is "0%" to "10%", the user is in a walking state with two-leg support in which both the right and left foot portions contact the ground. When the time rate of the walking state in one gait cycle of the right leg is "10%" to "50%", the user is in a walking state with one-leg support in which only the right foot portion contacts the ground with the left foot portion off the ground. When the time rate of the walking state in one gait cycle of the right leg is "50%" to "60%", the user is again in a walking state with two-leg support in which both the right and left foot portions contact the ground. When the time rate of the walking state in one gait cycle of the right leg is "60%" to "100%", the user is in a walking state with one-leg support in which only the left foot portion contacts the ground with the right foot portion off the ground.

As illustrated in FIG. 20, the walking state determination section 86 determines the time rate (see FIG. 21) of the walking state in one gait cycle of one of the legs, e.g. the right leg, with the user walking while grasping the fixed handles 20FR and 20FL, or with movement of the movable handles 20R and 20L locked, from the image processing result of an image in which the user is walking and which is input from the camera 55 and the depth from the camera 55 to the legs of the user.

For example, when the right leg of the user is moved forward and the right heel first contacts the ground, the walking state determination section 86 determines the time rate of the walking state in one gait cycle as "0%". When the left leg of the user is moved forward and the left heel contacts the ground, the walking state determination section 86 determines the time rate of the walking state in one gait cycle as "50%". Subsequently, when the right leg of the user is moved rearward and the toe leaves the ground, the walking state determination section 86 determines the time rate of the walking state in one gait cycle as "60%". After that, when the right leg of the user is moved forward and the right heel contacts the ground, the walking state determination section 86 determines the time rate of the walking state in one gait cycle as "100%". The walking state determination section 86 repeats the above processes, and determines the time rate (%) of the walking state in one gait cycle of one of the legs, e.g. the right leg.

The walking state determination section 86 may determine the time rate (see FIG. 21) of the walking state in one gait cycle of one of the legs, e.g. the right leg, with the user walking while grasping the fixed handles 20FR and 20FL, or with movement of the movable handles 20R and 20L locked, from the acceleration of the waist portion in each of the front-rear direction, the right-left direction, and the vertical direction during walk of the user 95 which is input from the three-axis acceleration sensor 96 wirelessly, for example. A method of determining the time rate (see FIG. 21) of the walking state in one gait cycle of one of the legs, e.g. the right leg, using the three-axis acceleration sensor 96 which is mounted to the waist portion of the user is known (see Japanese Patent Application Publication No. 2017-148287 (JP 2017-148287 A), for example), and thus is not described.

The walking state determination section 86 may determine the time rate of the walking state in one gait cycle with one gait cycle of each of the right leg and the left leg during walk of the user defined as "100%" from the positions of movement, the amounts of movement, and the speeds of movement of the movable handles 20R and 20L with respect to the rails 30R and 30L which are input from the movable handle movement amount detection unit 81*b*. The walking state determination section 86 may determine the time rate of the walking state in one gait cycle with one gait cycle of each of the right leg and the left leg during walk of the user defined as "100%" from the image processing result of an image in which the user is walking and which is input from the camera 55 and the depth from the camera 55 to each of the right leg and the left leg of the user.

The walking state determination section 86 may determine the time rate of the walking state in one gait cycle with one gait cycle of each of the right leg and the left leg during walk of the user defined as "100%" from the acceleration of the waist portion in each of the front-rear direction, the right-left direction, and the vertical direction during walk of the user 95 which is input from the three-axis acceleration sensor 96 wirelessly, for example. Consequently, the walking state determination section 86 can determine the time rate of the walking state in one gait cycle of each of the right leg and the left leg during walk of the user, which enables the drive control unit 40 to grasp the walking state and the body state of the user with high precision.

As illustrated in FIG. 20, a touch panel 77 is disposed on the display screen of the monitor 78, and electrically connected to the drive control unit 40. The touch panel 77 is disposed on the display screen of the monitor 78, and uses a pressure detection scheme, a resistive scheme, a capacitive scheme, an inductive scheme, etc. Thus, upon detecting that a finger or the like of the user contacts the touch panel 77, the touch panel 77 detects the coordinate position of the contact by the finger or the like on the display screen of the monitor 78 in accordance with variations in the pressure, electrical resistance, capacitance, energy of elastic waves, etc., and outputs the detected position to the drive control unit 40.

The drive control unit 40 has a training type determination section 87 that determines a training type selected by the user, among a plurality of training types displayed on the monitor 78. For example, as discussed later, the user depresses a desired training type, among the plurality of training types which are displayed on the monitor 78, and thereafter depresses an enter button 90A (see FIG. 29). Consequently, the training type determination section 87 determines that the user has selected the training type which is displayed at the position at which the touch panel 77 is depressed, and stores the selected training type in a RAM (not illustrated) as the training type to be executed (see FIG. 25).

Figure 22:
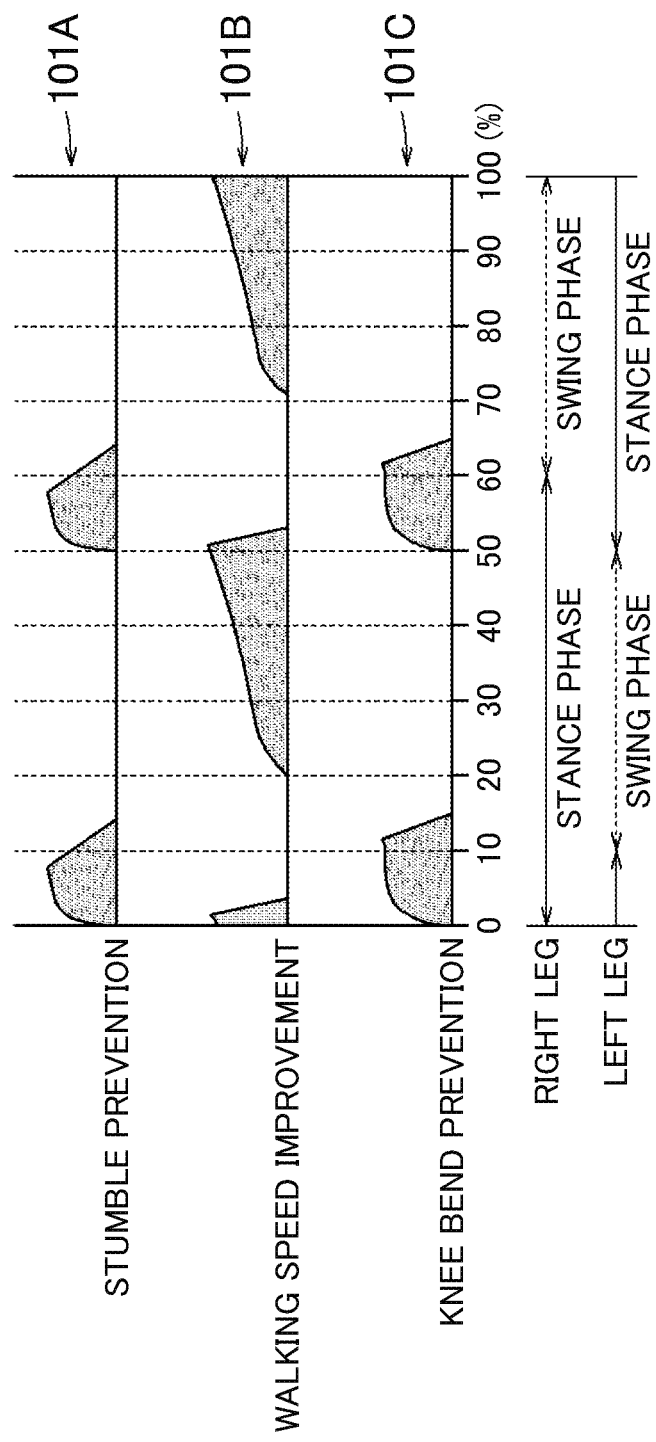
FIG. 22 illustrates an example of purpose-specific load patterns.

The storage unit 44 has a purpose-specific load pattern storage section 44A and a muscle-specific load pattern storage section 44B. The purpose-specific load pattern storage section 44A stores a plurality of purpose-specific load patterns corresponding to one gait cycle set in advance for each type of purposes of training. For example, as illustrated in FIG. 22, the purpose-specific load pattern storage section 44A stores a plurality of purpose-specific load patterns set for each of a plurality of types of purposes intended for walking state improvement.

Specifically, the purpose-specific load pattern storage section 44A stores a purpose-specific load pattern 101A intended for "stumble prevention", a purpose-specific load pattern 101B intended for "walking speed improvement", a purpose-specific load pattern 101C intended for "knee bend prevention", etc. Specifically, in the purpose-specific load pattern 101A which is intended for "stumble prevention", for example, the load is abruptly increased when the time rate of the walking state in one gait cycle of the right leg is 0% to about 3% and 50% to about 53%, thereafter gradually increased when the time rate is about 3% to about 8% and about 53% to about 58%, and thereafter abruptly decreased when the time rate is about 8% to about 15% and about 58% to about 65%.

Thus, the purpose-specific load pattern 101A intended for "stumble prevention" is set such that a load is applied during two-leg support as illustrated in FIG. 21. As a result, the walking assist device 85 can be stabilized during two-leg support, and falling or the like can be suppressed when a transition is made from two-leg support to one-leg support, which allows safe gait training.

In the purpose-specific load pattern 101B which is intended for "walking speed improvement", the load is sequentially increased when the time rate of the walking state in one gait cycle of the right leg is 20% to about 50% and 70% to about 100%, and thereafter abruptly decreased when the time rate is about 50% to about 53% and about 0% to about 3%. Thus, the purpose-specific load pattern 101B intended for "walking speed improvement" is set such that the load during one-leg support, in which only the right leg or the left leg contacts the ground, is larger than the load during two-leg support, in which the two legs contact the ground.

As a result, although the user is more likely to lose body balance during one-leg support, in which only one leg contacts the ground, compared to during two-leg support, in which the two legs contact the ground, the walking assist device 85 can be stabilized during one-leg support by making the load (first load) during one-leg support larger than the load (second load) during two-leg support. Consequently, falling can be suppressed during gait training for increasing the walking speed of the user, which enhances the safety of the gait training.

Figure 23:
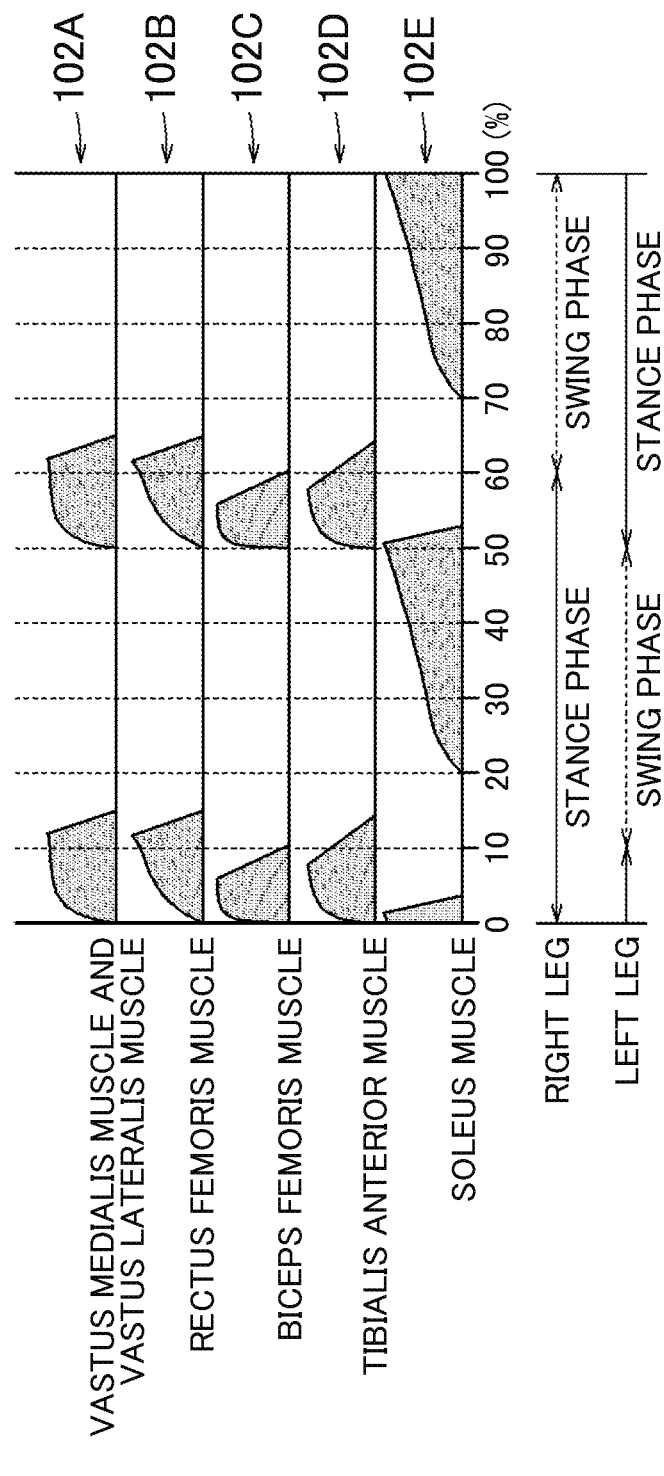
FIG. 23 illustrates an example of muscle-specific load patterns.

The muscle-specific load pattern storage section 44B stores a plurality of load patterns corresponding to one gait cycle set in advance for each type of muscles of the legs. For example, as illustrated in FIG. 23, the muscle-specific load pattern storage section 44B stores muscle-specific load patterns 102A to 102E etc. set for each of a plurality of types of muscles of the legs and intended to individually train the muscles of the right leg and the left leg. For example, the muscle-specific load pattern 102A is intended to train the "vastus medialis muscle and vastus lateralis muscle" of the right leg and the left leg, the muscle-specific load pattern 102B is intended to train the "rectus femoris muscle" of the right leg and the left leg, and the muscle-specific load pattern 102C is intended to train the "biceps femoris muscle" of the right leg and the left leg. The muscle-specific load pattern 102D is intended to train the "tibialis anterior muscle" of the right leg and the left leg, and the muscle-specific load pattern 102E is intended to train the "soleus muscle" of the right leg and the left leg.

Specifically, in the muscle-specific load pattern 102A, for example, the load is abruptly increased when the time rate of the walking state in one gait cycle of the right leg is 0% to about 3% and 50% to about 53%, thereafter gradually increased when the time rate is about 3% to about 12% and about 53% to about 62%, and thereafter abruptly decreased when the time rate is about 12% to about 15% and about 62% to about 65%. Thus, the muscle-specific load pattern 102A is set such that a load is applied during two-leg support and during a transition to one-leg support as illustrated in FIG. 21.

Figure 24A:
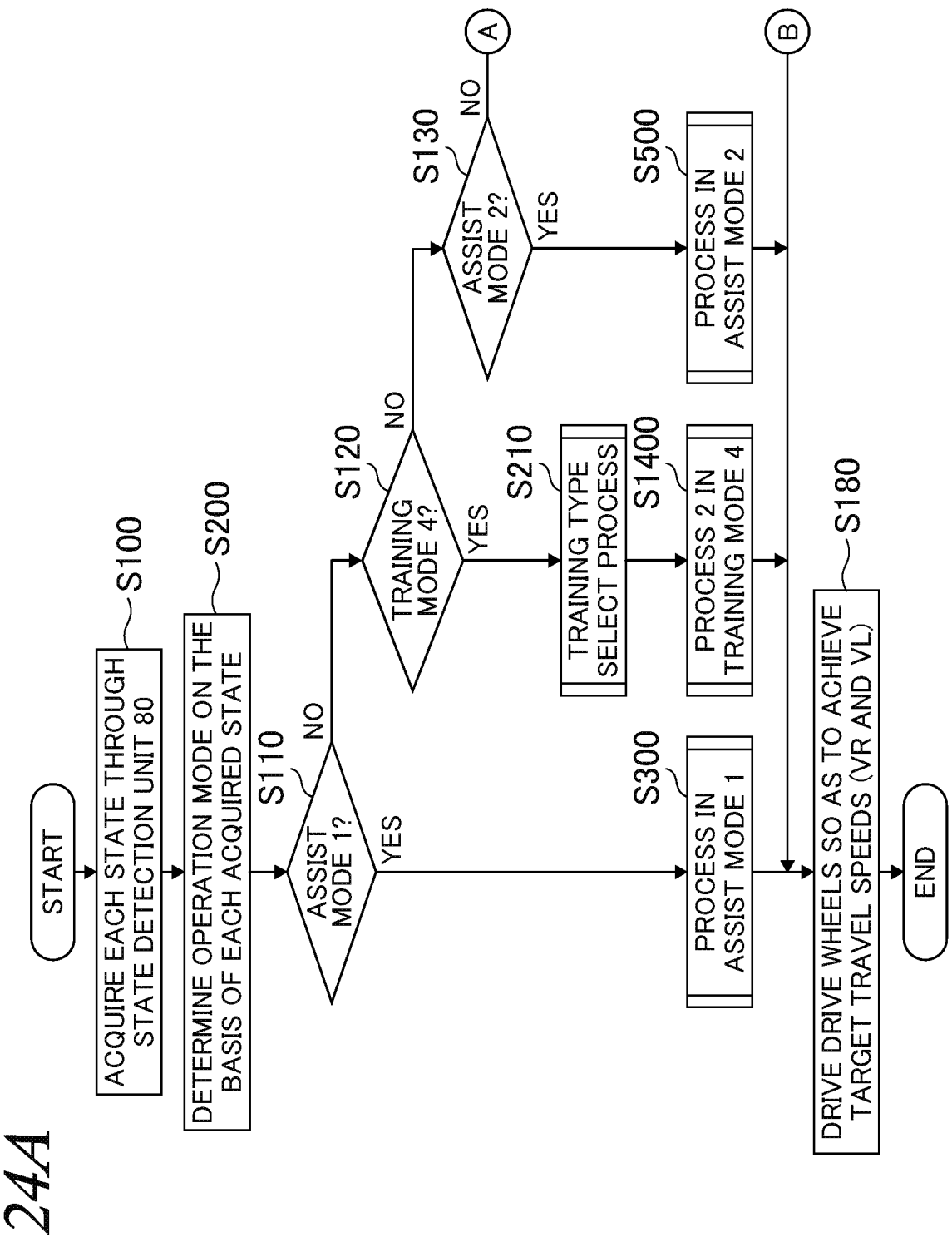
FIG. 24A is a flowchart illustrating the procedure of the overall process for the drive control unit of the walking assist device according to the second embodiment.
Figure 24B:
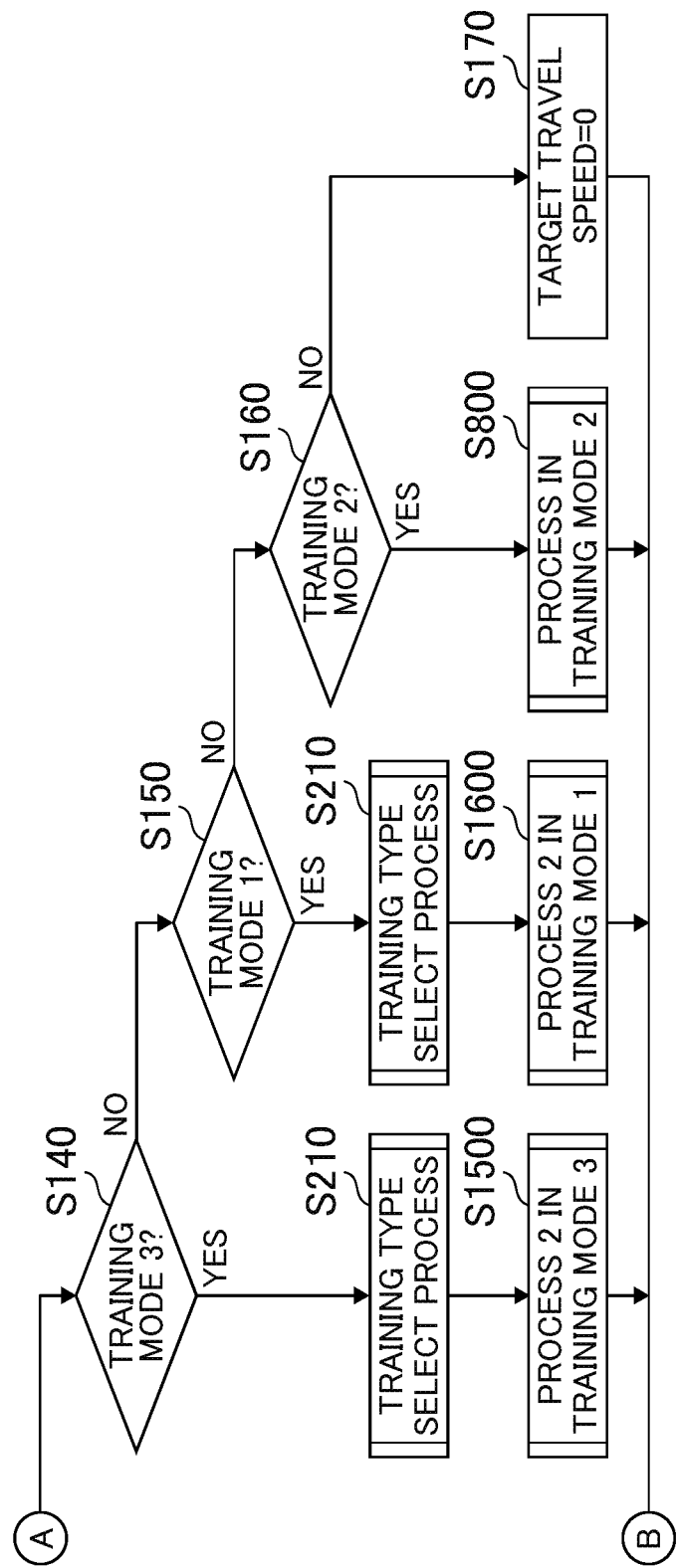
FIG. 24B is a flowchart illustrating the procedure of the overall process for the drive control unit of the walking assist device according to the second embodiment.

Next, the process procedure for the drive control unit 40 of the walking assist device 85 configured as described above will be described with reference to the flowcharts in FIGS. 24 to 28. FIG. 24A and FIG. 24B illustrates the overall process for the drive control unit 40 of the walking assist device 85. As illustrated in FIG. 24A and FIG. 24B, the overall process executed by the drive control unit 40 of the walking assist device 85 is substantially the same as the overall process (see FIG. 10A and FIG. 10B) executed by the drive control unit 40 of the walking assist device 10 according to the first embodiment.

It should be noted, however, that in step S120, the drive control unit 40 proceeds to step S210, instead of step S400, in the case where the determined operation mode is the training mode 4 (TR4) (S120: YES). In step S210, the drive control unit 40 executes a sub process "training type select process" to be discussed later, and thereafter proceeds to step S1400. The process procedure is different from that in the first embodiment in that the drive control unit 40 proceeds to step S180 after executing a sub process "process 2 in training mode 4" to be discussed later in step S1400.

In step S140, the drive control unit 40 proceeds to step S210, instead of step S600, in the case where the determined operation mode is the training mode 3 (TR3) (S140: YES). In step S210, the drive control unit 40 executes a sub process "training type select process" to be discussed later, and thereafter proceeds to step S1500. The process procedure is different from that in the first embodiment in that the drive control unit 40 proceeds to step S180 after executing a sub process "process 2 in training mode 3" to be discussed later in step S1500.

In step S150, the drive control unit 40 proceeds to step S210, instead of step S700, in the case where the determined operation mode is the training mode 1 (TR1) (S150: YES). In step S210, the drive control unit 40 executes a sub process "training type select process" to be discussed later, and thereafter proceeds to step S1600. The process procedure is different from that in the first embodiment in that the drive control unit 40 proceeds to step S180 after executing a sub process "process 2 in training mode 1" to be discussed later in step S1600.

Figure 25:
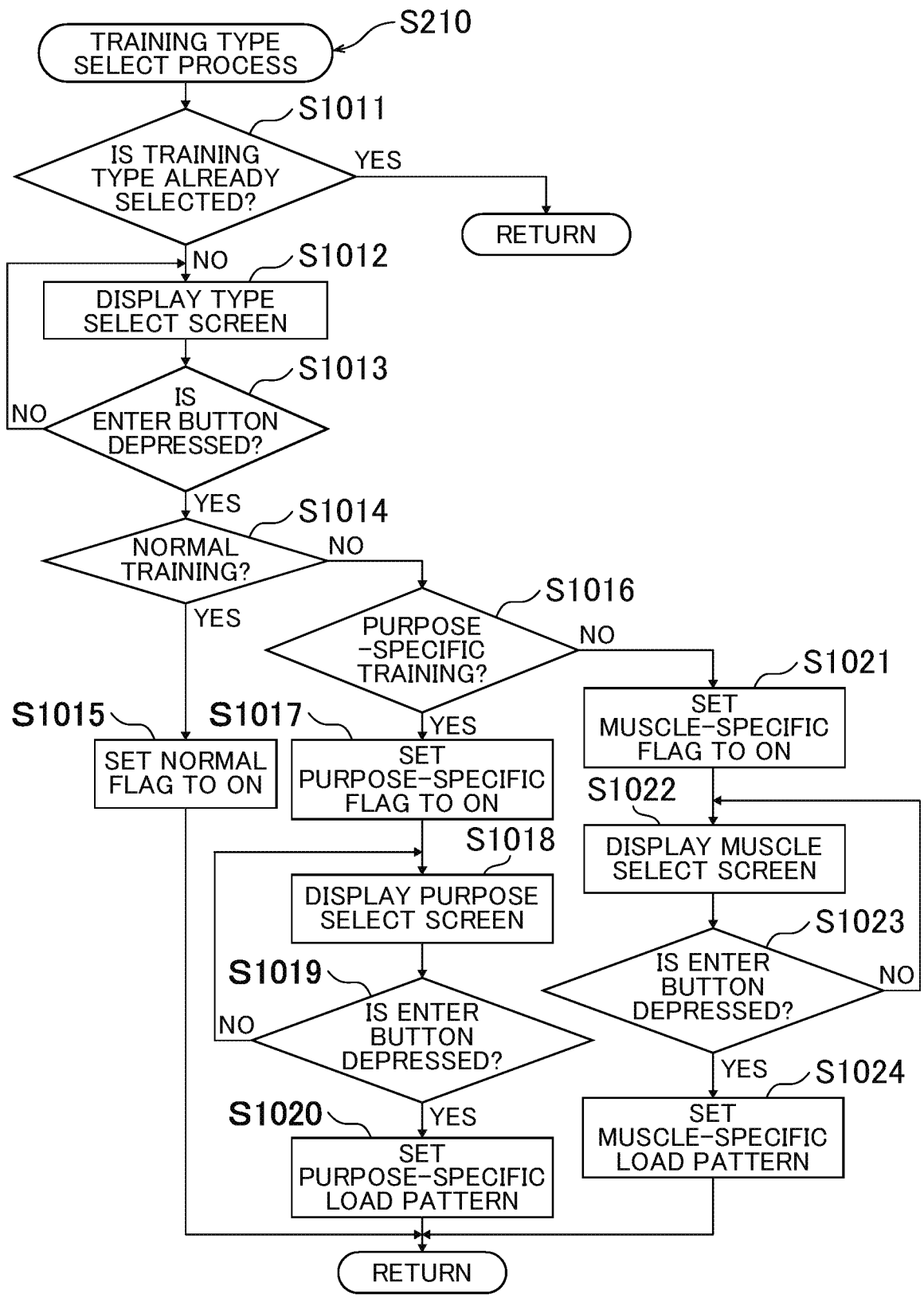
FIG. 25 is a sub flowchart illustrating the procedure of a sub process "training type select process"

Next, the sub process "training type select process" which is executed by the drive control unit 40 in step S210 will be described with reference to FIG. 25. As illustrated in FIG. 25, in step S1011, the drive control unit 40 determines whether or not the training type is already selected. Specifically, the drive control unit 40 reads a normal flag that indicates selection of a normal training, a purpose-specific flag that indicates selection of a purpose-specific training, and a muscle-specific flag that indicates selection of a muscle-specific training from a RAM (not illustrated), and determines whether or not any of the flags is set to "ON".

The drive control unit 40 of the walking assist device 85 sets the normal flag, the purpose-specific flag, and the muscle-specific flag to "OFF" when started, and stores such flags in the RAM (not illustrated). The drive control unit 40 of the walking assist device 85 sets the normal flag, the purpose-specific flag, and the muscle-specific flag to "OFF" when the operation mode of the walking assist device 85 is switched by a manual operation on the manual mode switching unit 76a by the user, and stores such flags in the RAM (not illustrated) again.

In the case where it is determined that the training type is already selected, that is, in the case where it is determined that any of the normal flag, the purpose-specific flag, and the muscle-specific flag is set to ON (S1011: YES), the drive control unit 40 finishes the sub process.

In the case where it is determined that the training type has not been selected yet, that is, in the case where it is determined that all of the normal flag, the purpose-specific flag, and the muscle-specific flag are set to OFF (S1011: NO), on the other hand, the drive control unit 40 proceeds to step S1012. In step S1012, the drive control unit 40 displays a training type select screen 88A (see FIG. 29) on the monitor 78.

Figure 29:
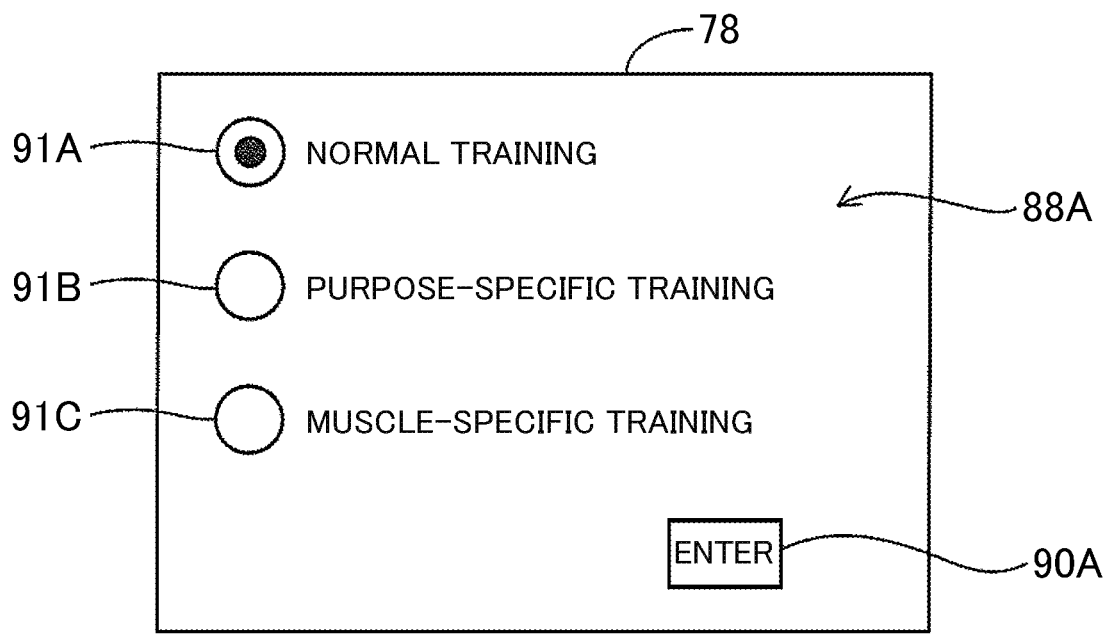
FIG. 29 illustrates an example of a training type select screen.

An example of the training type select screen 88A will be described with reference to FIG. 29. As illustrated in FIG. 29, characters "normal training", "purpose-specific training", and "muscle-specific training" that represent training types are displayed on the display screen of the monitor 78 as disposed in the up-down direction. Select buttons 91A to 91C are disposed on the left side of the characters "normal training", "purpose-specific training", and "muscle-specific training", and displayed as white circles. An enter button 90A is displayed as disposed at the lower right of the characters "muscle-specific training".

For example, the "normal training" is a training executed by the walking assist device 10 according to the first embodiment, in which a constant load is applied during walk of the user. The "purpose-specific training" is a training set for each of a plurality of types of purposes intended for walking state improvement. The "muscle-specific training" is a training set for each of a plurality of types of muscles of the legs and intended to individually train the muscles of the legs.

In the case where any of the select buttons 91A to 91C is depressed via the touch panel 77 (see FIG. 20), the drive control unit 40 displays a black dot in the depressed select button, and notifies the user that the training which is displayed on the right side of the black dot has been selected.

Subsequently, as illustrated in FIG. 25, in step S1013, the drive control unit 40 determines whether or not the enter button 90A is depressed via the touch panel 77 (see FIG. 20). In the case where it is determined that the enter button 90A is not depressed (S1013: NO), the drive control unit 40 executes the processes in and after step S1012 again.

In the case where it is determined that the enter button 90A is depressed via the touch panel 77 (S1013: YES), on the other hand, the drive control unit 40 stores the training which is displayed on the right side of the select button in which the black dot is displayed, among the select buttons 91A to 91C, in the RANI (not illustrated) as the selected training, and thereafter proceeds to step S1014. For example, as illustrated in FIG. 29, in the case where the enter button 90A is depressed with a black dot displayed by depressing the select button 91A, the drive control unit 40 stores the "normal training" in the RAM (not illustrated) as the selected training, and thereafter proceeds to step S1014. Thus, the processes in steps S1012 to S1013 function as an example of the training type determination section 87 (see FIG. 20).

In step S1014, the drive control unit 40 determines whether or not the selected training which is read from the RAM (not illustrated) is the "normal training". In the case where it is determined that the selected training is the "normal training" (S1014: YES), the drive control unit 40 proceeds to step S1015. In step S1015, the drive control unit 40 reads the normal flag from the RAM (not illustrated), sets the normal flag to ON, stores the normal flag in the RAM (not illustrated) again, and thereafter finishes the sub process.

In the case where it is determined that the selected training is not the "normal training" (S1014: NO), on the other hand, the drive control unit 40 proceeds to step S1016. In step S1016, the drive control unit 40 determines whether or not the selected training is the "purpose-specific training". In the case where it is determined that the selected training is the "purpose-specific training" (S1016: YES), the drive control unit 40 proceeds to step S1017. In step S1017, the drive control unit 40 reads the purpose-specific flag from the RAM (not illustrated), sets the purpose-specific flag to ON, stores the purpose-specific flag in the RAM (not illustrated) again, and thereafter proceeds to step S1018.

Figure 30:
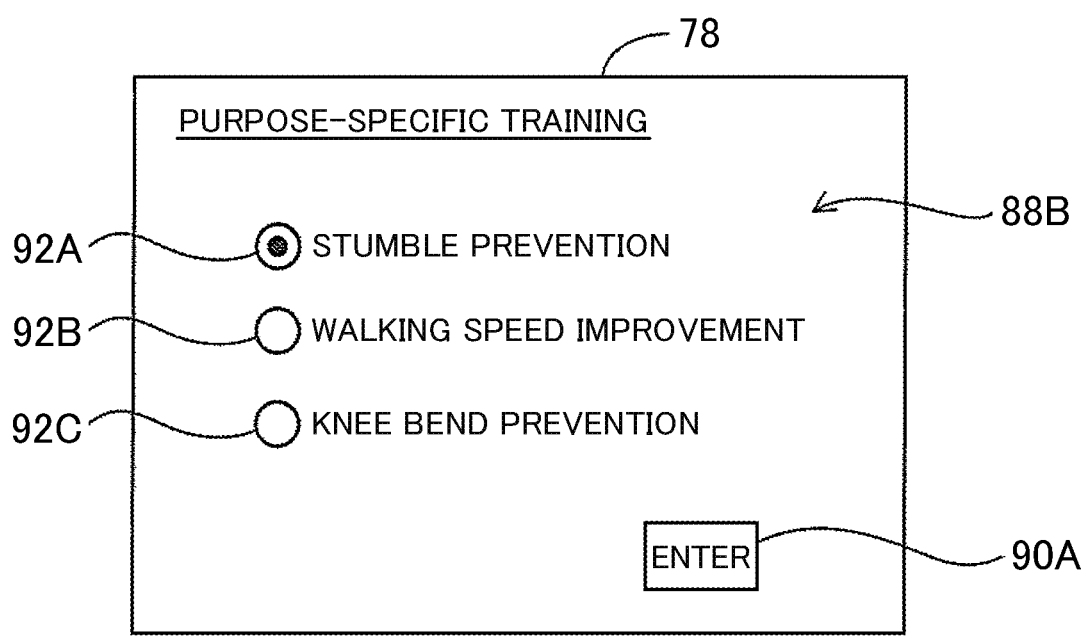
FIG. 30 illustrates an example of a purpose-specific training select screen.

In step S1018, the drive control unit 40 displays a purpose-specific training select screen 88B (see FIG. 30) on the monitor 78. An example of the purpose-specific training select screen 88B will be described with reference to FIG. 30. As illustrated in FIG. 30, the display screen of the monitor 78 displays a plurality of types of purposes of training intended for walking state improvement as disposed in the up-down direction.

For example, characters "stumble prevention", "walking speed improvement", and "knee bend prevention", which represent the purposes of training, are displayed as disposed in the up-down direction. Select buttons 92A to 92C are disposed on the left side of the characters "stumble prevention", "walking speed improvement", and "knee bend prevention", and displayed as white circles. An enter button 90A is displayed as disposed at the lower right of the characters "knee bend prevention".

In the case where any of the select buttons 92A to 92C is depressed via the touch panel 77 (see FIG. 20), the drive control unit 40 displays a black dot in the depressed select button, and notifies the user that the purpose of the training which is displayed on the right side of the black dot has been selected.

Subsequently, as illustrated in FIG. 25, in step S1019, the drive control unit 40 determines whether or not the enter button 90A is depressed via the touch panel 77 (see FIG. 20). In the case where it is determined that the enter button 90A is not depressed (S1019: NO), the drive control unit 40 executes the processes in and after step S1018 again.

In the case where it is determined that the enter button 90A is depressed via the touch panel 77 (S1019: YES), on the other hand, the drive control unit 40 stores the purpose of the training which is displayed on the right side of the select button in which the black dot is displayed, among the select buttons 92A to 92C, in the RAM (not illustrated) as the selected purpose of the training, and thereafter proceeds to step S1020. For example, as illustrated in FIG. 30, in the case where the enter button 90A is depressed with a black dot displayed by depressing the select button 92A, the drive control unit 40 stores "stumble prevention" in the RAM (not illustrated) as the selected purpose of the training, and thereafter proceeds to step S1020.

In step S1020, the drive control unit 40 reads the purpose of the selected training from the RAM again, reads the purpose-specific load pattern which is set in advance in correspondence with the purpose of the training from the purpose-specific load pattern storage section 44A (see FIG. 20) which is provided in the storage unit 44, stores the read purpose-specific load pattern in the RAM (not illustrated) as the purpose-specific load pattern to be executed, and thereafter finishes the sub process. For example, as illustrated in FIG. 30, in the case where the purpose of the selected training is "stumble prevention", the drive control unit 40 reads the purpose-specific load pattern 101A corresponding to "stumble prevention" illustrated in FIG. 22 from the purpose-specific load pattern storage section 44A (see FIG. 20), stores the read purpose-specific load pattern 101A in the RAM (not illustrated) as the purpose-specific load pattern to be executed, and thereafter finishes the sub process.

In the case where it is determined in step S1016 that the selected training is not the "purpose-specific training" (S1016: NO), on the other hand, the drive control unit 40 proceeds to step S1021. In step S1021, the drive control unit 40 reads the muscle-specific flag from the RAM (not illustrated), sets the muscle-specific flag to ON, stores the muscle-specific flag in the RAM (not illustrated) again, and thereafter proceeds to step S1022.

Figure 31:
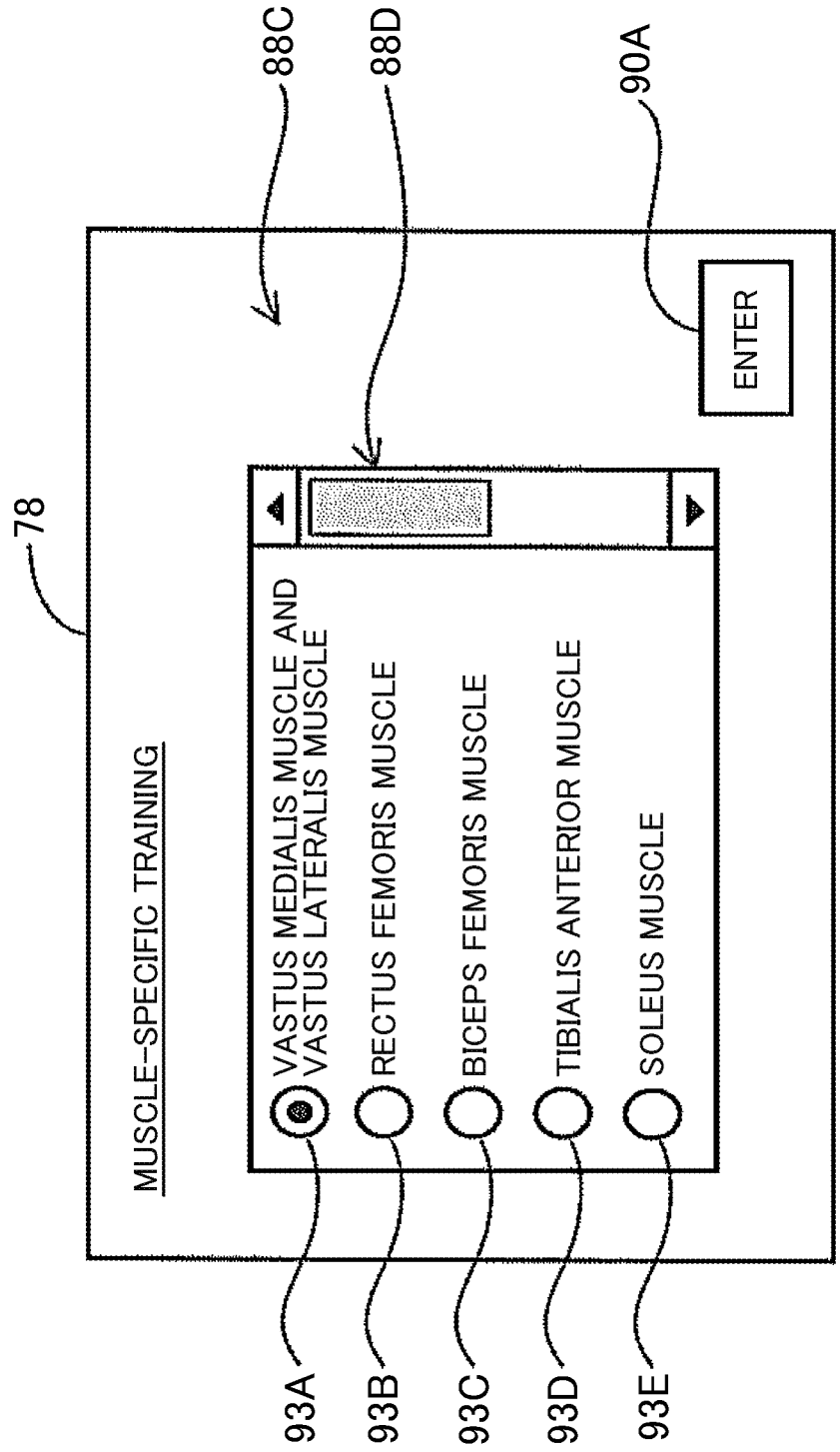
FIG. 31 illustrates an example of a muscle-specific training select screen.

In step S1022, the drive control unit 40 displays a muscle-specific training select screen 88C (see FIG. 31) on the monitor 78. An example of the muscle-specific training select screen 88C will be described with reference to FIG. 31. As illustrated in FIG. 31, a select window 88D, in which the names of muscles as the target to be trained in a plurality of types of training intended to individually train the muscles of the legs are displayed as disposed in the up-down direction so as to be selectable, is displayed at the center portion of the display screen of the monitor 78.

For example, muscle names such as "vastus medialis muscle and vastus lateralis muscle", "rectus femoris muscle", "biceps femoris muscle", "tibialis anterior muscle", and "soleus muscle" which represent the target muscles to be trained, are displayed in the select window 88D as disposed in the up-down direction so as to be selectable. Select buttons 93A to 93E etc. are disposed on the left side of the muscle names such as "vastus medialis muscle and vastus lateralis muscle", "rectus femoris muscle", "biceps femoris muscle", "tibialis anterior muscle", and "soleus muscle", and displayed as white circles. The enter button 90A is displayed as disposed at the lower right of the select window 88D.

In the case where any of the select buttons 93A to 93E etc. is depressed via the touch panel 77 (see FIG. 20), the drive control unit 40 displays a black dot in the depressed select button, and notifies the user that the muscle of the legs with the name of the muscle displayed on the right side of the black dot has been selected as the target to be trained.

Subsequently, as illustrated in FIG. 25, in step S1023, the drive control unit 40 determines whether or not the enter button 90A is depressed via the touch panel 77 (see FIG. 20). In the case where it is determined that the enter button 90A is not depressed (S1023: NO), the drive control unit 40 executes the processes in and after step S1022 again.

In the case where it is determined that the enter button 90A is depressed via the touch panel 77 (S1023: YES), on the other hand, the drive control unit 40 stores the muscle of the legs with the name of the muscle displayed on the right side of the select button in which the black dot is displayed, among the select buttons 93A to 93E etc., in the RAM (not illustrated) as the selected target muscle to be trained, and thereafter proceeds to step S1024. For example, as illustrated in FIG. 31, in the case where the enter button 90A is depressed with a black dot displayed by depressing the select button 93A, the drive control unit 40 stores the "vastus medialis muscle and vastus lateralis muscle" in the RAM (not illustrated) as the selected target muscle to be trained, and thereafter proceeds to step S1024.

In step S1024, the drive control unit 40 reads the selected target muscle to be trained from the RAM again, reads the muscle-specific load pattern which is intended to train the target muscle to be trained from the muscle-specific load pattern storage section 44B (see FIG. 20) which is provided in the storage unit 44, stores the read muscle-specific load pattern in the RAM (not illustrated) as the muscle-specific load pattern to be executed, and thereafter finishes the sub process. For example, as illustrated in FIG. 31, in the case where the selected target muscle to be trained is "vastus medialis muscle and vastus lateralis muscle", the drive control unit 40 reads the muscle-specific load pattern 102A corresponding to "vastus medialis muscle and vastus lateralis muscle" illustrated in FIG. 23 from the muscle-specific load pattern storage section 44B (see FIG. 20), stores the read muscle-specific load pattern 102A in the RAM (not illustrated) as the muscle-specific load pattern to be executed, and thereafter finishes the sub process.

Next, the sub process "process 2 in training mode 4" which is executed by the drive control unit 40 in step S1400 will be described with reference to FIG. 26A and FIG. 26B. With the regenerated power collecting unit 65 operating, the walking assist device 85 is not caused to generate an assist force in accordance with the acting force of the user.

Figure 26A:
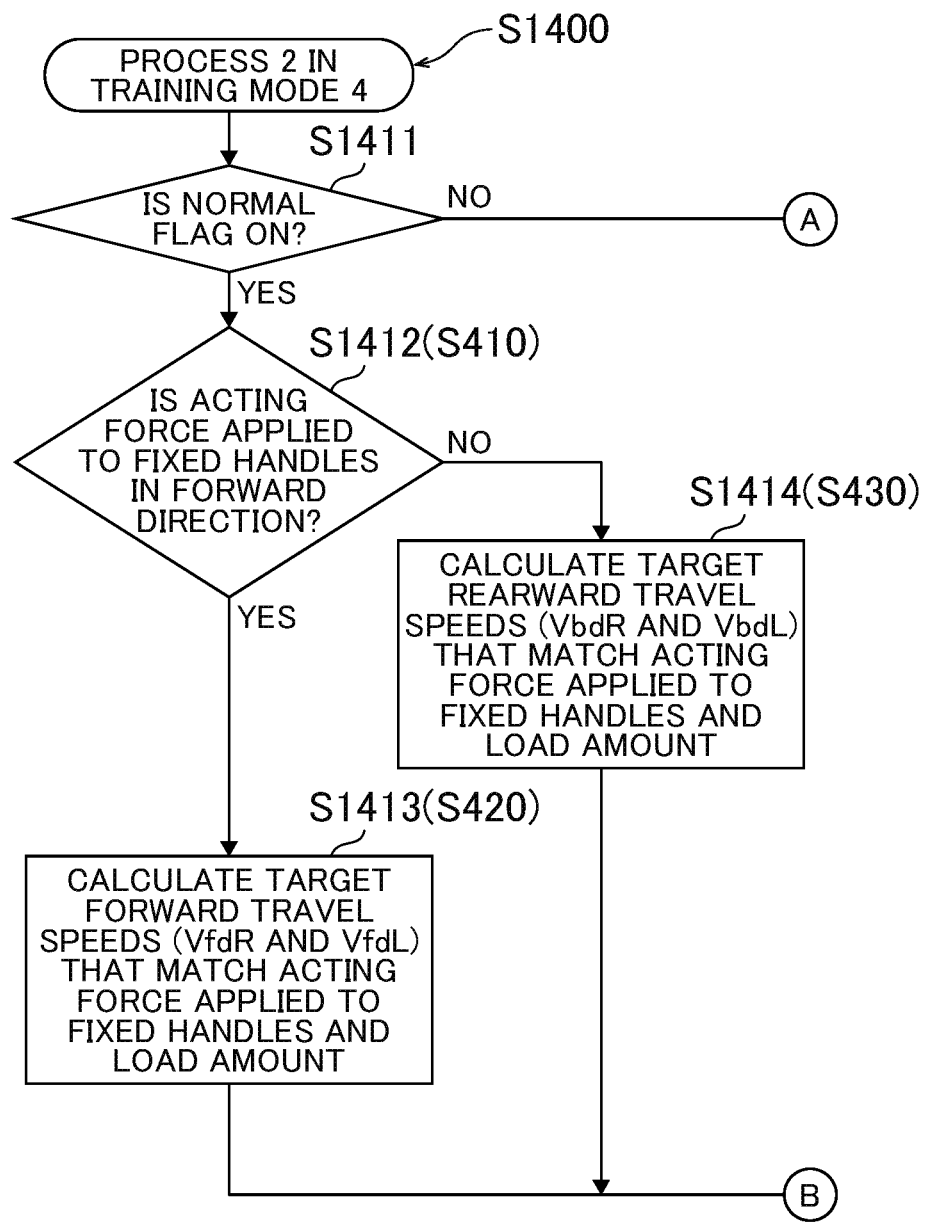
FIG. 26A is a sub flowchart illustrating the procedure of a sub process "process 2 in training mode 4"
Figure 26B:
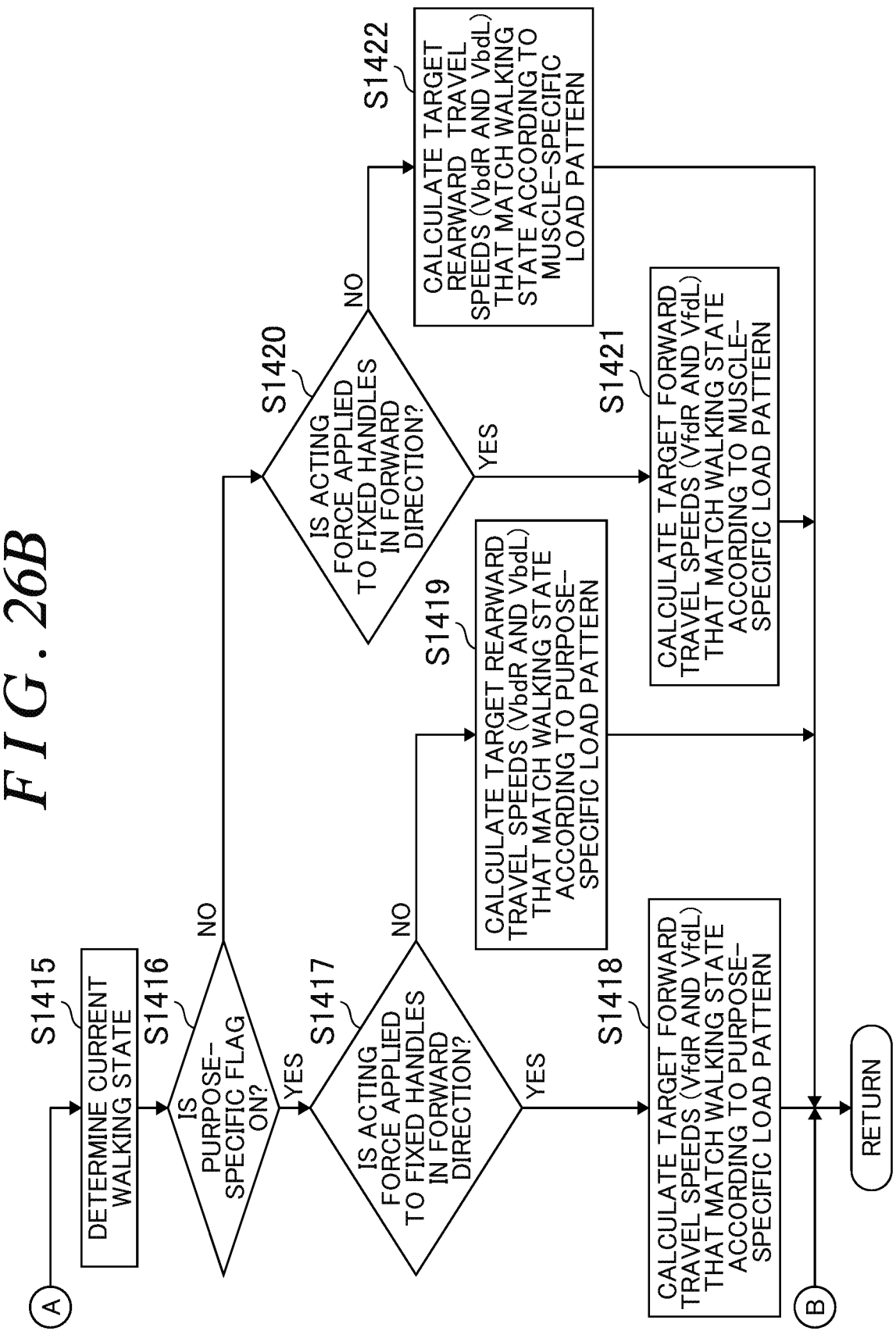
FIG. 26B is a sub flowchart illustrating the procedure of a sub process "process 2 in training mode 4"

As illustrated in FIG. 26A, in step S1411, the drive control unit 40 determines whether or not the normal flag, which indicates selection of the normal training and which is read from the RAM (not illustrated), is set to "ON". In the case where it is determined that the normal flag is set to "ON" (S1411: YES), the drive control unit 40 proceeds to step S1412.

After executing the processes in steps S410 to S430 (see FIG. 11) in steps S1412 to S1414, the drive control unit 40 finishes the sub process, and returns to the overall process (see FIG. 24A and FIG. 24B).

Thus, in the case where the user selects the "normal training" in step S210, the drive control unit 40 causes the walking assist device 85 to travel with a constant load while causing the regenerated power collecting unit 65 (see FIG. 20) to operate in the training mode 4 (TR4) (see FIG. 8). As a result, it is necessary for the user to walk by pushing or pulling the walking assist device 85 with a stronger force in order to cause the walking assist device 85 to travel than in the assist mode 1 (AM1) (see FIG. 8). Consequently, a load can be applied to operation (walk) of the body of the user performed as the user walks.

In the case where it is determined in step S1411 that the normal flag is set to "OFF" (S1411: NO), on the other hand, the drive control unit 40 proceeds to step S1415. In step S1415, the drive control unit 40 (walking state determination section 86 (see FIG. 20)) determines the time rate (see FIG. 21) of the walking state in one gait cycle of one of the legs, e.g. the right leg, with the user walking while grasping the fixed handles 20FR and 20FL from the image processing result of an image in which the user is walking and which is input from the camera 55 (see FIG. 20) and the depth from the camera 55 to the legs of the user, stores the determined time rate in the RAM (not illustrated) as the time rate of the current walking state, and thereafter proceeds to step S1416.

The drive control unit 40 (walking state determination section 86 (see FIG. 20)) may determine the time rate (see FIG. 21) of the walking state in one gait cycle of one of the legs, e.g. the right leg, with the user walking while grasping the fixed handles 20FR and 20FL from the acceleration of the waist portion in each of the front-rear direction, the right-left direction, and the vertical direction during walk of the user 95 which is input from the three-axis acceleration sensor 96 (see FIG. 20) wirelessly, for example, store the determined time rate in the RAM (not illustrated), and thereafter proceed to step S1416.

In step S1416, the drive control unit 40 determines whether or not the purpose-specific flag, which indicates selection of the purpose-specific training and which is read from the RAM (not illustrated), is set to "ON". In the case where it is determined that the purpose-specific flag is set to "ON" (S1416: YES), the drive control unit 40 proceeds to step S1417. In step S1417, the drive control unit 40 determines on the basis of information from the fixed handle acting force detection unit 81c whether or not the acting force of the user applied to the fixed handles 20FR and 20FL is in the forward direction.

In the case where it is determined, on the basis of information from the fixed handle acting force detection unit 81c, that the acting force of the user applied to the fixed handles 20FR and 20FL is in the forward direction (S1417: YES), the drive control unit 40 proceeds to step S1418. In step S1418, the drive control unit 40 reads the time rate of the current walking state which is stored in the RAM (not illustrated) in step S1415. After reading a load corresponding to the time rate of the current walking state from the purpose-specific load pattern which is stored in the RANI (not illustrated) in step S1020, calculating target forward travel speeds (VfdR and VfdL) corresponding to the load, and storing the calculated target forward travel speeds in the RAM (not illustrated), the drive control unit 40 finishes the sub process, and returns to the overall process (see FIG. 24A and FIG. 24B).

In the case where it is determined, on the basis of information from the fixed handle acting force detection unit 81c, that the acting force of the user applied to the fixed handles 20FR and 20FL is not in the forward direction, i.e. is in the rearward direction (S1417: NO), the drive control unit 40 proceeds to step S1419. In step S1419, the drive control unit 40 reads the time rate of the current walking state which is stored in the RAM (not illustrated) in step S1415. After reading a load corresponding to the time rate of the current walking state from the purpose-specific load pattern which is stored in the RAM (not illustrated) in step S1020, calculating target rearward travel speeds (VbdR and VbdL) corresponding to the load, and storing the calculated target rearward travel speeds in the RAM (not illustrated), the drive control unit 40 finishes the sub process, and returns to the overall process (see FIG. 24A and FIG. 24B).

Thus, in the case where the user selects the purpose of the training in step S1018 to step S1019, the drive control unit 40 causes the walking assist device 85 to travel with a load corresponding to the time rate of the current walking state while causing the regenerated power collecting unit 65 (see FIG. 20) to operate on the basis of a purpose-specific load pattern corresponding to the selected training purpose.

As a result, it is necessary for the user to walk by pushing or pulling the walking assist device 85 while grasping the fixed handles 20FR and 20FL in correspondence with a load that matches the training purpose in order to cause the walking assist device 85 to travel. Consequently, by the user selecting a training purpose such as "stumble prevention", it is possible to apply a load to the muscles of the legs corresponding to the desired training purpose at an optimum timing, which allows effective training of the muscles of the legs corresponding to the training purpose.

In the case where it is determined in step S1416 that the purpose-specific flag is set to "OFF" (S1416: NO), on the other hand, the drive control unit 40 determines that the muscle-specific flag is set to "ON", and proceeds to step S1420. In step S1420, the drive control unit 40 determines on the basis of information from the fixed handle acting force detection unit 81c whether or not the acting force of the user applied to the fixed handles 20FR and 20FL is in the forward direction.

In the case where it is determined on the basis of information from the fixed handle acting force detection unit 81c that the acting force of the user applied to the fixed handles 20FR and 20FL is in the forward direction (S1420: YES), the drive control unit 40 proceeds to step S1421. In step S1421, the drive control unit 40 reads the time rate of the current walking state which is stored in the RANI (not illustrated) in step S1415. After reading a load corresponding to the time rate of the current walking state from the muscle-specific load pattern which is stored in the RAM (not illustrated) in step S1024, calculating target forward travel speeds (VfdR and VfdL) corresponding to the load, and storing the calculated target forward travel speeds in the RAM (not illustrated), the drive control unit 40 finishes the sub process, and returns to the overall process (see FIG. 24A and FIG. 24B).

In the case where it is determined on the basis of information from the fixed handle acting force detection unit 81c that the acting force of the user applied to the fixed handles 20FR and 20FL is not in the forward direction, i.e. is in the rearward direction (S1420: NO), the drive control unit 40 proceeds to step S1422. In step S1422, the drive control unit 40 reads the time rate of the current walking state which is stored in the RAM (not illustrated) in step S1415. After reading a load corresponding to the time rate of the current walking state from the muscle-specific load pattern which is stored in the RAM (not illustrated) in step S1024, calculating target rearward travel speeds (VbdR and VbdL) corresponding to the load, and storing the calculated target rearward travel speeds in the RAM (not illustrated), the drive control unit 40 finishes the sub process, and returns to the overall process (see FIG. 24A and FIG. 24B).

Thus, in the case where the user selects a target muscle to be trained in step S1022 to step S1023, the drive control unit 40 causes the walking assist device 85 to travel with a load corresponding to the time rate of the current walking state while causing the regenerated power collecting unit 65 (see FIG. 20) to operate on the basis of a muscle-specific load pattern corresponding to the selected target muscle to be trained.

As a result, it is necessary for the user to walk by pushing or pulling the walking assist device 85 while grasping the fixed handles 20FR and 20FL in correspondence with a load that matches the target muscle to be trained in order to cause the walking assist device 85 to travel. Consequently, by the user selecting a muscle of the legs desired to be trained such as "vastus medialis muscle and vastus lateralis muscle", it is possible to apply a load to the muscle of the legs desired to be trained at an optimum timing, which allows effective training of the muscle of the legs desired to be trained.

Next, the sub process "process 2 in training mode 3" which is executed by the drive control unit 40 in step S1500 will be described with reference to FIG. 27A and FIG. 27B. With the regenerated power collecting unit 65 operating, the walking assist device 85 is not caused to generate an assist force in accordance with the acting force of the user.

Figure 27A:
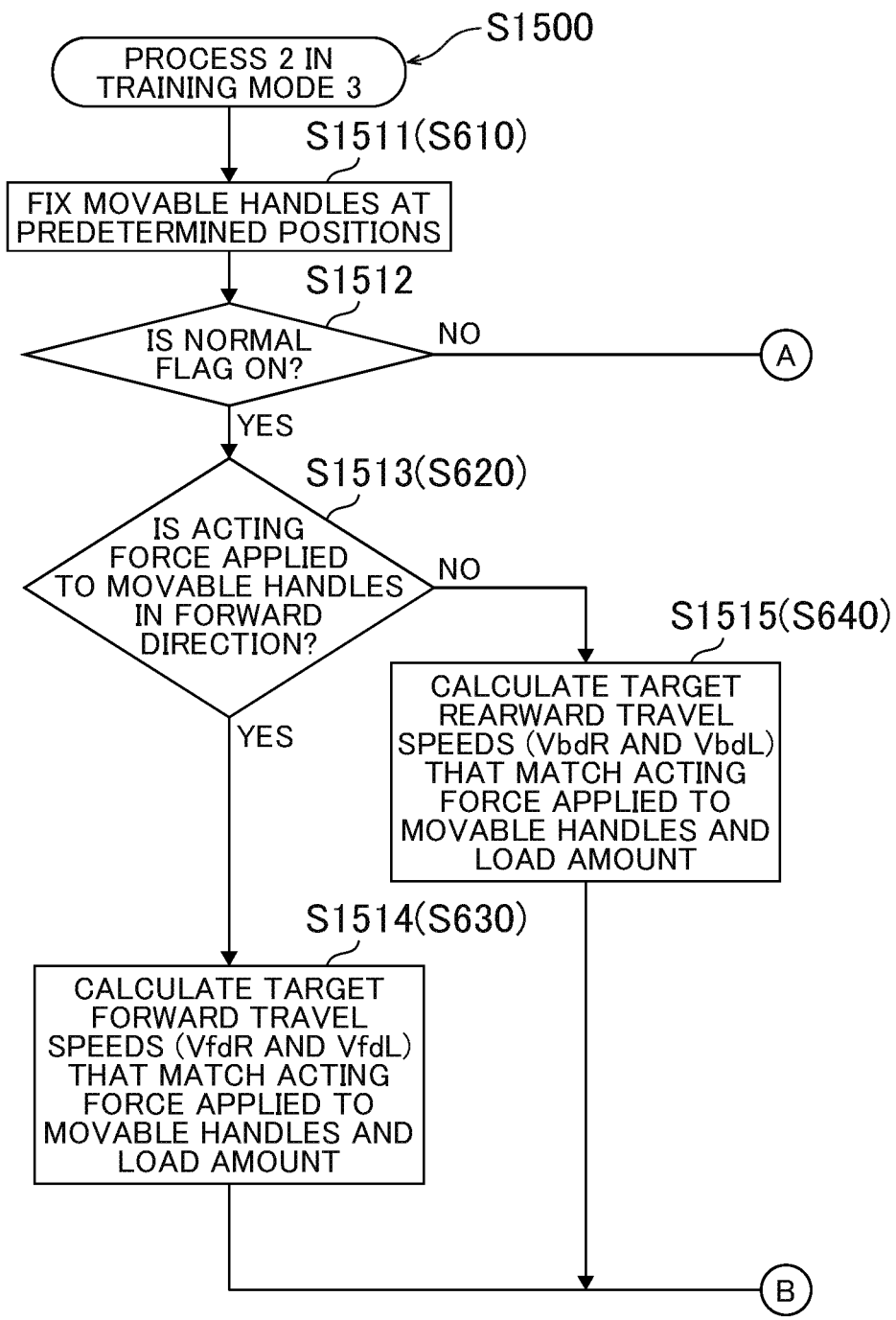
FIG. 27A is a sub flowchart illustrating the procedure of a sub process "process 2 in training mode 3"
Figure 27B:
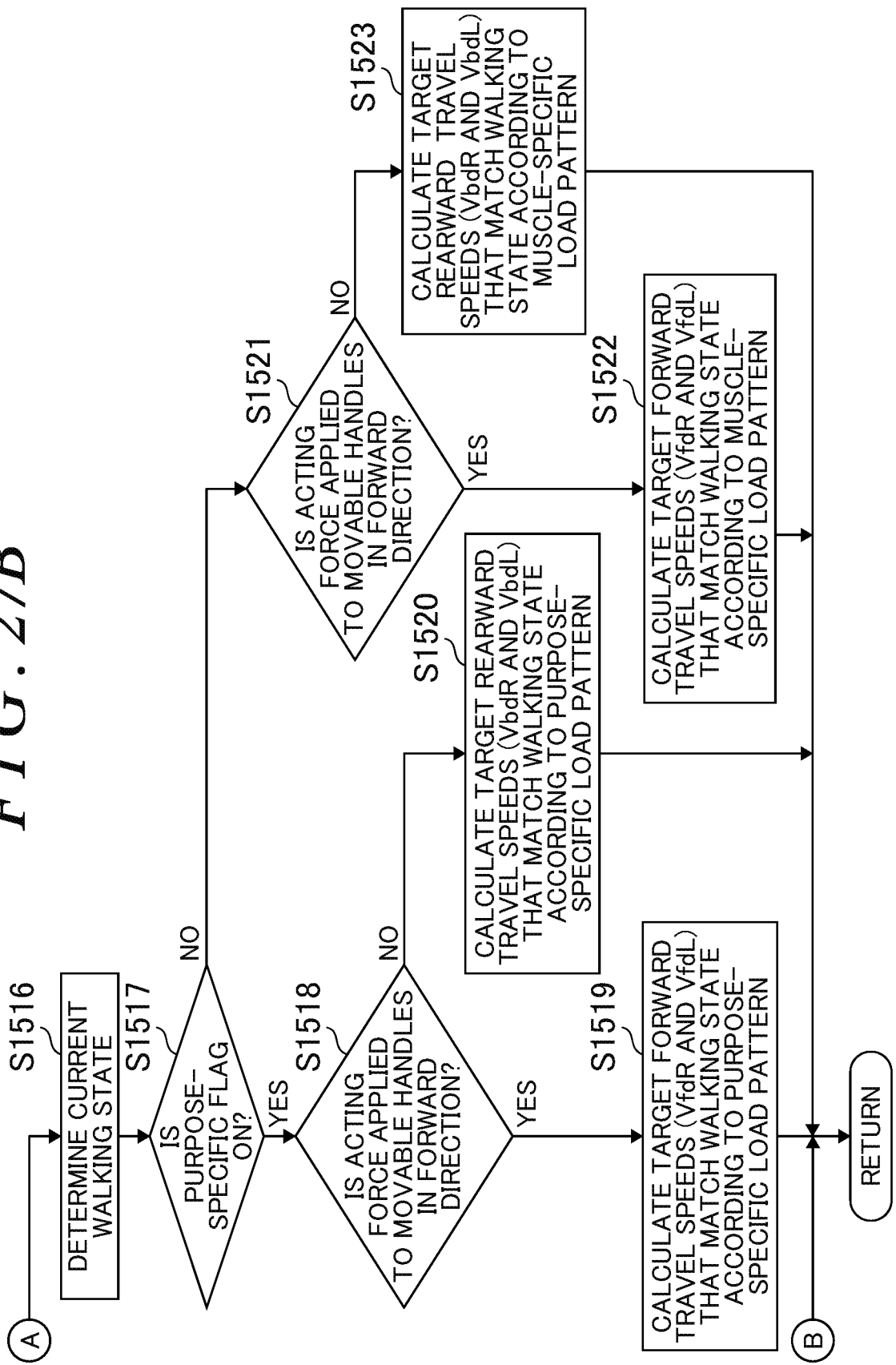
FIG. 27B is a sub flowchart illustrating the procedure of a sub process "process 2 in training mode 3"

As illustrated in FIG. 27A, in step S1511, the drive control unit 40 executes the process in step S610, and proceeds to step S1512. Specifically, the drive control unit 40 fixes the movable handles 20R and 20L at predetermined positions by limiting movement of (locking) the movable handles 20R and 20L with respect to the rails 30R and 30L, that is, the frame 50, by driving the handle movement limiting units 35R and 35L, and proceeds to step S1512.

In step S1512, the drive control unit 40 determines whether or not the normal flag, which indicates selection of the normal training and which is read from the RAM (not illustrated), is set to "ON". In the case where it is determined that the normal flag is set to "ON" (S1512: YES), the drive control unit 40 proceeds to step S1513. After executing the processes in steps S620 to S640 (see FIG. 11) in steps S1513 to S1515, the drive control unit 40 finishes the sub process, and returns to the overall process (see FIG. 24A and FIG. 24B).

Thus, in the case where the user selects the "normal training" in step S210, the drive control unit 40 causes the walking assist device 85 to travel with a constant load while causing the regenerated power collecting unit 65 (see FIG. 20) to operate in the training mode 3 (TR3) (see FIG. 8). As a result, it is necessary for the user to walk by pushing or pulling the walking assist device 85 with a stronger force in order to cause the walking assist device 85 to travel than in the assist mode 2 (AM2) (see FIG. 8). Consequently, a load can be applied to operation (walk) of the body of the user performed as the user walks.

In the case where it is determined in step S1512 that the normal flag is set to "OFF" (S1512: NO), on the other hand, the drive control unit 40 proceeds to step S1516. In step S1516, the drive control unit 40 (walking state determination section 86 (see FIG. 20)) determines the time rate (see FIG. 21) of the walking state in one gait cycle of one of the legs, e.g. the right leg, with the user walking while grasping the movable handles 20R and 20L from the image processing result of an image in which the user is walking and which is input from the camera 55 (see FIG. 20) and the depth from the camera 55 to the legs of the user, stores the determined time rate in the RAM (not illustrated) as the time rate of the current walking state, and thereafter proceeds to step S1517.

The drive control unit 40 (walking state determination section 86 (see FIG. 20)) may determine the time rate (see FIG. 21) of the walking state in one gait cycle of one of the legs, e.g. the right leg, with the user walking while grasping the movable handles 20R and 20L from the acceleration of the waist portion in each of the front-rear direction, the right-left direction, and the vertical direction during walk of the user 95 which is input from the three-axis acceleration sensor 96 (see FIG. 20) wirelessly, for example, store the determined time rate in the RAM (not illustrated), and thereafter proceed to step S1517.

In step S1517, the drive control unit 40 determines whether or not the purpose-specific flag, which indicates selection of the purpose-specific training and which is read from the RANI (not illustrated), is set to "ON". In the case where it is determined that the purpose-specific flag is set to "ON" (S1517: YES), the drive control unit 40 proceeds to step S1518. In step S1518, the drive control unit 40 determines on the basis of information from the movable handle acting force detection unit 81a whether or not the acting force of the user applied to the movable handles 20R and 20L is in the forward direction.

In the case where it is determined, on the basis of information from the movable handle acting force detection unit 81a, that the acting force of the user applied to the movable handles 20R and 20L is in the forward direction (S1518: YES), the drive control unit 40 proceeds to step S1519. In step S1519, the drive control unit 40 reads the time rate of the current walking state which is stored in the RANI (not illustrated) in step S1516. After reading a load corresponding to the time rate of the current walking state from the purpose-specific load pattern which is stored in the RANI (not illustrated) in step S1020, calculating target forward travel speeds (VfdR and VfdL) corresponding to the load, and storing the calculated target forward travel speeds in the RAM (not illustrated), the drive control unit 40 finishes the sub process, and returns to the overall process (see FIG. 24A and FIG. 24B).

In the case where it is determined on the basis of information from the movable handle acting force detection unit 81a that the acting force of the user applied to the movable handles 20R and 20L is not in the forward direction, i.e. is in the rearward direction (S1518: NO), the drive control unit 40 proceeds to step S1520. In step S1520, the drive control unit 40 reads the time rate of the current walking state which is stored in the RAM (not illustrated) in step S1516. After reading a load corresponding to the time rate of the current walking state from the purpose-specific load pattern which is stored in the RAM (not illustrated) in step S1020, calculating target rearward travel speeds (VbdR and VbdL) corresponding to the load, and storing the calculated target rearward travel speeds in the RAM (not illustrated), the drive control unit 40 finishes the sub process, and returns to the overall process (see FIG. 24A and FIG. 24B).

Thus, in the case where the user selects the purpose of the training in step S1018 to step S1019, the drive control unit 40 causes the walking assist device 85 to travel with a load corresponding to the time rate of the current walking state while causing the regenerated power collecting unit 65 (see FIG. 20) to operate on the basis of a purpose-specific load pattern corresponding to the selected training purpose.

As a result, it is necessary for the user to walk by pushing or pulling the walking assist device 85 while grasping the movable handles 20R and 20L which have been fixed in correspondence with a load that matches the training purpose in order to cause the walking assist device 85 to travel. Consequently, by the user selecting a training purpose such as "stumble prevention", it is possible to apply a load to the muscles of the legs corresponding to the desired training purpose at an optimum timing, which allows effective training of the muscles of the legs corresponding to the training purpose.

In the case where it is determined in step S1517 that the purpose-specific flag is set to "OFF" (S1517: NO), on the other hand, the drive control unit 40 determines that the muscle-specific flag is set to "ON", and proceeds to step S1521. In step S1521, the drive control unit 40 determines, on the basis of information from the movable handle acting force detection unit 81a, whether or not the acting force of the user applied to the movable handles 20R and 20L is in the forward direction.

In the case where it is determined, on the basis of information from the movable handle acting force detection unit 81a, that the acting force of the user applied to the movable handles 20R and 20L is in the forward direction (S1521: YES), the drive control unit 40 proceeds to step S1522. In step S1522, the drive control unit 40 reads the time rate of the current walking state which is stored in the RANI (not illustrated) in step S1516. After reading a load corresponding to the time rate of the current walking state from the muscle-specific load pattern which is stored in the RAM (not illustrated) in step S1024, calculating target forward travel speeds (VfdR and VfdL) corresponding to the load, and storing the calculated target forward travel speeds in the RAM (not illustrated), the drive control unit 40 finishes the sub process, and returns to the overall process (see FIG. 24A and FIG. 24B).

In the case where it is determined, on the basis of information from the movable handle acting force detection unit 81a, that the acting force of the user applied to the movable handles 20R and 20L is not in the forward direction, i.e. is in the rearward direction (S1521: NO), the drive control unit 40 proceeds to step S1523. In step S1523, the drive control unit 40 reads the time rate of the current walking state which is stored in the RAM (not illustrated) in step S1516. After reading a load corresponding to the time rate of the current walking state from the muscle-specific load pattern which is stored in the RAM (not illustrated) in step S1024, calculating target rearward travel speeds (VbdR and VbdL) corresponding to the load, and storing the calculated target rearward travel speeds in the RAM (not illustrated), the drive control unit 40 finishes the sub process, and returns to the overall process (see FIG. 24A and FIG. 24B).

Thus, in the case where the user selects a target muscle to be trained in step S1022 to step S1023, the drive control unit 40 causes the walking assist device 85 to travel with a load corresponding to the time rate of the current walking state while causing the regenerated power collecting unit 65 (see FIG. 20) to operate on the basis of a muscle-specific load pattern corresponding to the selected target muscle to be trained.

As a result, it is necessary for the user to walk by pushing or pulling the walking assist device 85 while grasping the movable handles 20R and 20L which have been fixed in correspondence with a load that matches the target muscle to be trained in order to cause the walking assist device 85 to travel. Consequently, by the user selecting a muscle of the legs desired to be trained such as "vastus medialis muscle and vastus lateralis muscle", it is possible to apply a load to the muscle of the legs desired to be trained at an optimum timing, which allows effective training of the muscle of the legs desired to be trained.

Figure 28A:
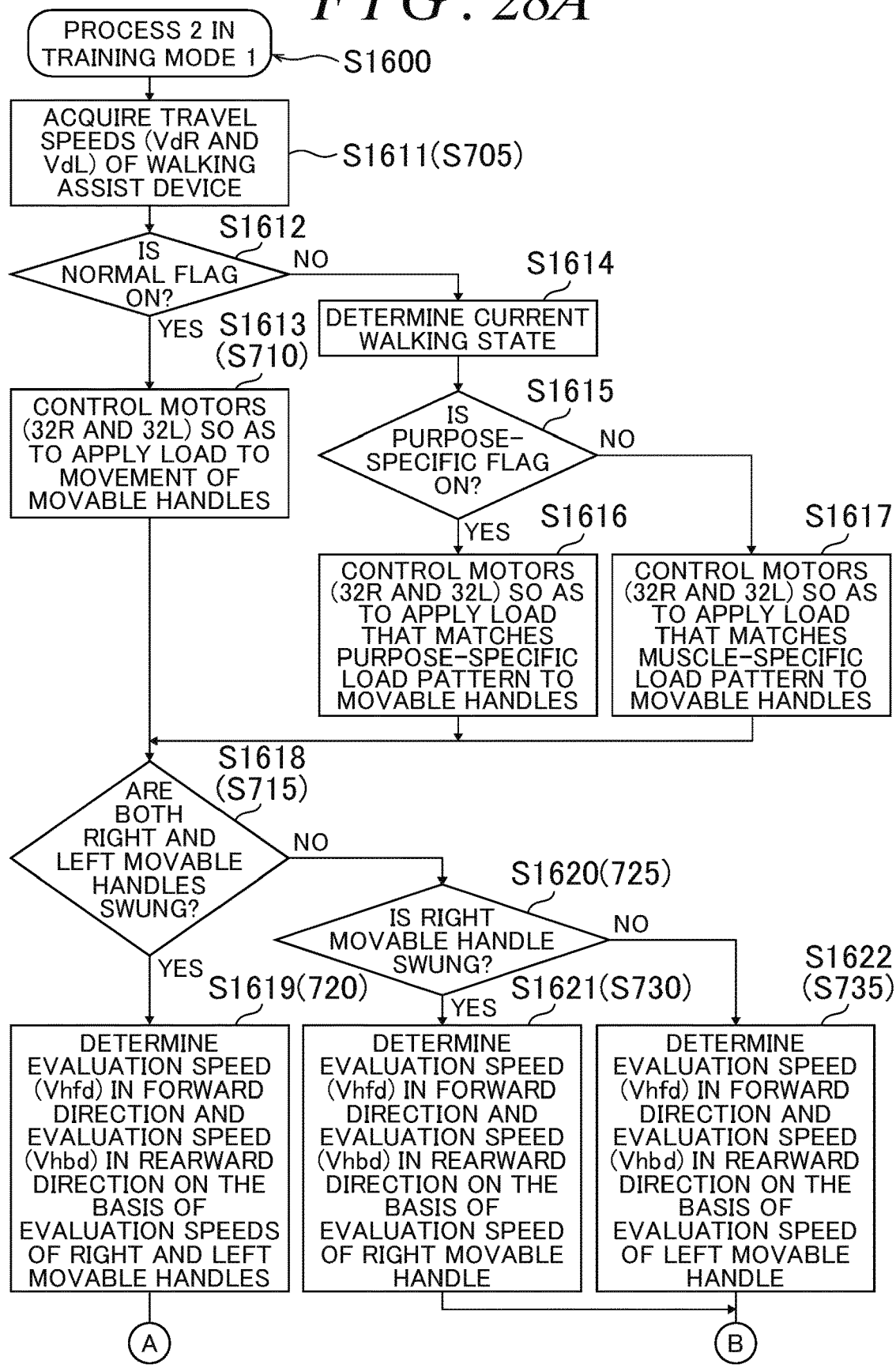
FIG. 28A is a sub flowchart illustrating the procedure of a sub process "process 2 in training mode 1"
Figure 28B:
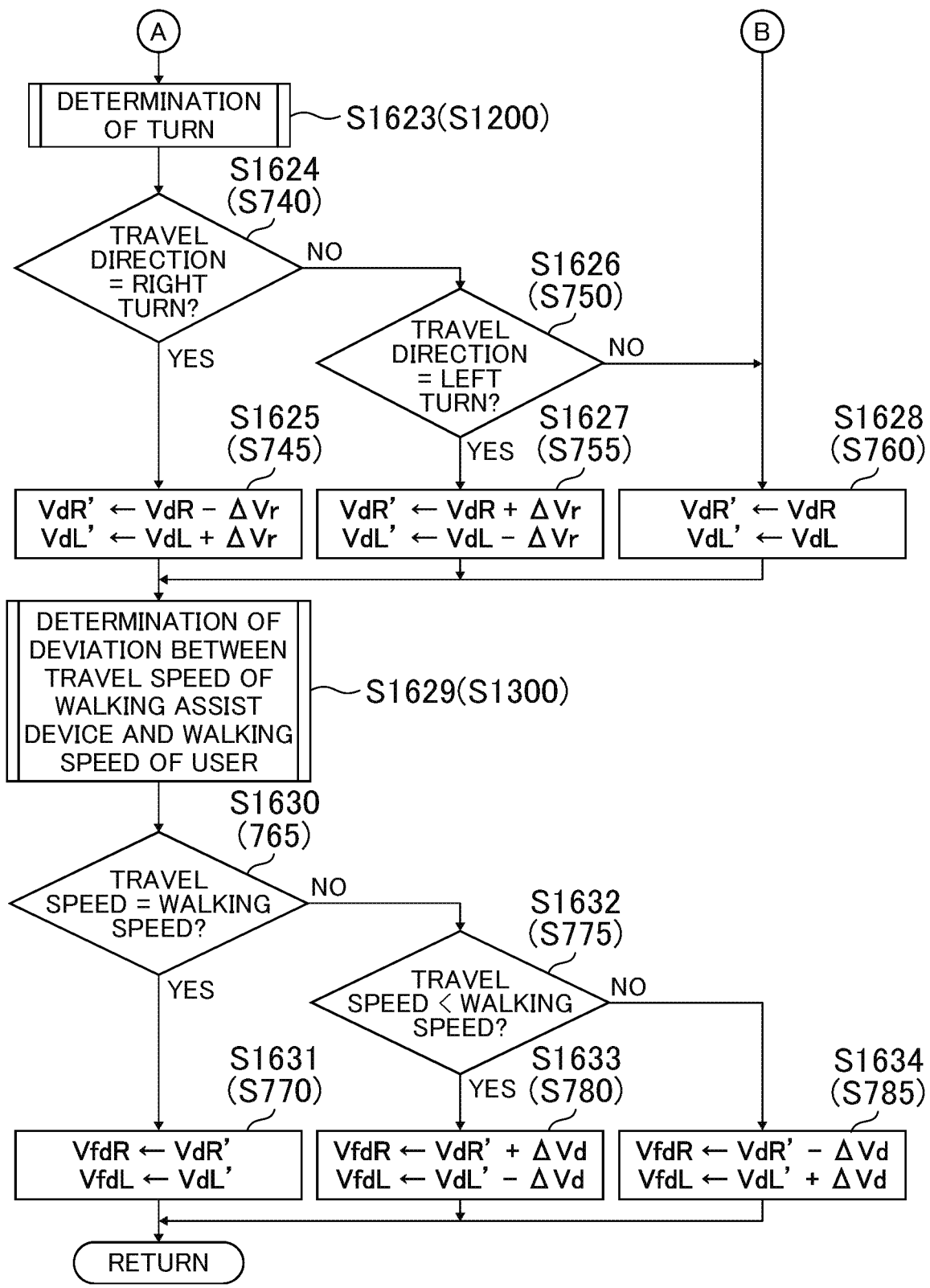
FIG. 28B is a sub flowchart illustrating the procedure of a sub process "process 2 in training mode 1"

Next, the sub process "process 2 in training mode 1" which is executed by the drive control unit 40 in step S1600 will be described with reference to FIG. 28A and FIG. 28B. With the regenerated power collecting unit 65 operating, an assist force is not generated in accordance with the acting force of the user. As illustrated in FIG. 28A, in step S1611, the drive control unit 40 executes the process in step S705, and proceeds to step S1612. Specifically, the drive control unit 40 acquires the travel speeds (VdR and VdL) of the walking assist device 85 from the storage unit 44, stores the acquired travel speeds in the RANI (not illustrated), and thereafter proceeds to step S1612.

In step S1612, the drive control unit 40 determines whether or not the normal flag, which indicates selection of the normal training and which is read from the RANI (not illustrated), is set to "ON". In the case where it is determined that the normal flag is set to "ON" (S1612: YES), the drive control unit 40 proceeds to step S1613. After executing the process in step S710 in step S1613, the drive control unit 40 proceeds to step S1618 to be discussed later. Specifically, the drive control unit 40 controls the motors 32R and 32L so as to apply a load with a load amount derived by the load amount/assist amount change unit 74 (see FIG. 20) to movement of the movable handles 20R and 20L, and proceeds to step S1618 to be discussed later.

Thus, in the case where the user selects the "normal training" in step S210, the drive control unit 40 causes the walking assist device 85 to travel by applying a constant load through the motors 32R and 32L to movement of the movable handles 20R and 20L in the front-rear direction while causing the regenerated power collecting unit 65 (see FIG. 20) to operate in the training mode 1 (TR1) (see FIG. 8).

As a result, it is necessary for the user to move the movable handles 20R and 20L with a stronger force in order to cause the walking assist device 85 to travel than in the training mode 2 (TR2) (see FIG. 8). Consequently, a load can be applied to operation (walking with arm swing) of the body of the user performed as the user walks. It is also possible to simulate walking with poles such as nordic walking, which allows training the muscles of the legs through high-quality natural walk in which the arms are swung correctly in synchronization with the legs.

In the case where it is determined in step S1612 that the normal flag is set to "OFF" (S1612: NO), on the other hand, the drive control unit 40 proceeds to step S1614. In step S1614, the drive control unit 40 (walking state determination section 86 (see FIG. 20)) determines the time rate (see FIG. 21) of the walking state in one gait cycle of one of the legs, e.g. the right leg, during walk in which the user swings his/her arms while grasping the movable handles 20R and 20L from the positions of movement, the amounts of movement, and the speeds of movement of the movable handles 20R and 20L with respect to the rails 30R and 30L which are input from the movable handle movement amount detection unit 81b, stores the determined time rate in the RAM (not illustrated) as the time rate of the current walking state, and proceeds to step S1615.

In step S1615, the drive control unit 40 determines whether or not the purpose-specific flag, which indicates selection of the purpose-specific training and which is read from the RAM (not illustrated), is set to "ON". In the case where it is determined that the purpose-specific flag is set to "ON" (S1615: YES), the drive control unit 40 proceeds to step S1616.

In step S1616, the drive control unit 40 reads the time rate of the current walking state which is stored in the RAM (not illustrated) in step S1614. The drive control unit 40 reads a load corresponding to the time rate of the current walking state from the purpose-specific load pattern which is stored in the RAM (not illustrated) in step S1020. Subsequently, the drive control unit 40 controls the motors 32R and 32L so as to apply a load corresponding to the time rate of the current walking state to movement of the movable handles 20R and 20L while causing the regenerated power collecting unit 65 (see FIG. 20) to operate, and proceeds to step S1618 to be discussed later.

Thus, in the case where the user selects the purpose of the training in step S1018 to step S1019, the drive control unit 40 causes the walking assist device 85 to travel by applying a load corresponding to the time rate of the current walking state through the motors 32R and 32L to movement of the movable handles 20R and 20L in the front-rear direction while causing the regenerated power collecting unit 65 (see FIG. 20) to operate on the basis of a purpose-specific load pattern corresponding to the selected training purpose.

As a result, it is necessary for the user to push the walking assist device 85 forward by walking while moving the movable handles 20R and 20L back and forth in correspondence with a load that matches the training purpose in order to cause the walking assist device 85 to travel. Consequently, by the user selecting a training purpose such as "stumble prevention", it is possible to apply a load to the muscles of the legs corresponding to the desired training purpose at an optimum timing, which allows effective training of the muscles of the legs corresponding to the training purpose. It is also possible to simulate walking with poles such as nordic walking, which allows effective training of the muscles of the legs corresponding to the training purpose through high-quality natural walk in which the arms are swung correctly in synchronization with the legs.

In the case where it is determined in step S1615 that the purpose-specific flag is set to "OFF" (S1615: NO), on the other hand, the drive control unit 40 determines that the muscle-specific flag is set to "ON", and proceeds to step S1617. In step S1617, the drive control unit 40 reads the time rate of the current walking state which is stored in the RAM (not illustrated) in step S1614.

The drive control unit 40 reads a load corresponding to the time rate of the current walking state from the muscle-specific load pattern which is stored in the RAM (not illustrated) in step S1024. Subsequently, the drive control unit 40 controls the motors 32R and 32L so as to apply a load corresponding to the time rate of the current walking state to movement of the movable handles 20R and 20L while causing the regenerated power collecting unit 65 (see FIG. 20) to operate, and proceeds to step S1618 to be discussed later.

Thus, in the case where the user selects a target muscle to be trained in step S1022 to step S1023, the drive control unit 40 causes the walking assist device 85 to travel by applying a load corresponding to the time rate of the current walking state through the motors 32R and 32L to movement of the movable handles 20R and 20L in the front-rear direction while causing the regenerated power collecting unit 65 (see FIG. 20) to operate on the basis of a muscle-specific load pattern corresponding to the selected target muscle to be trained.

As a result, it is necessary for the user to push the walking assist device 85 forward by walking while moving the movable handles 20R and 20L back and forth in correspondence with a load that matches the target muscle to be trained in order to cause the walking assist device 85 to travel. Consequently, by the user selecting a muscle of the legs desired to be trained such as "vastus medialis muscle and vastus lateralis muscle", it is possible to apply a load to the muscle of the legs desired to be trained at an optimum timing, which allows effective training of the muscle of the legs desired to be trained. It is also possible to simulate walking with poles such as nordic walking, which allows training the muscle of the legs desired to be trained through high-quality natural walk in which the arms are swung correctly in synchronization with the legs.

Subsequently, as illustrated in FIG. 28A, in step S1618 to step S1622, the drive control unit 40 executes the processes in step S715 to step S735 (see FIG. 13A). In step S1623, the drive control unit 40 executes the process in step S1200 (see FIG. 15A). After that, in step S1624 to step S1628, the drive control unit 40 executes the processes in step S740 to step S760 (see FIG. 13B).

In step S1629, the drive control unit 40 executes the process in step S1300 (see FIG. 15B). Subsequently, after executing the processes in steps S765 to S785 (see FIG. 13B) in steps S1630 to S1634, the drive control unit 40 finishes the sub process, and returns to the overall process (see FIG. 24A and FIG. 24B).

The effects of the embodiments of the present invention will be described.

As described above, in the case where the operation mode of the walking assist device is switched to the training mode and the walking assist device is caused to travel forward or rearward with the user grasping the grasp portion, the walking assist device can apply a load to operation (walk and arm swing) of the body of the user performed during walk. In the case where the operation mode of the walking assist device is switched to the assist mode and the walking assist device is caused to travel forward or rearward with the user grasping the grasp portion, the walking assist device can alleviate the load on operation (walk) of the body of the user performed during walk. Consequently, it is possible to assist the user in walking, and to suppress a decrease in (maintain) the physical strength of the user by applying a moderate load at the same time.

The walking assist device according to the present invention is not limited to the configuration, structure, shape, process procedure, etc. described in relation to the first embodiment and the second embodiment, and may be modified, added, and deleted in various ways without departing from the scope and spirit of the present invention.

(A) In the first embodiment and the second embodiment, the walking assist device 10, 85 is a four-wheeled vehicle with two drive wheels. However, the walking assist device may be a three-wheeled vehicle with two, right and left, drive wheels and with the remaining wheel serving as a caster wheel. The present invention is also applicable to a walking cart that assists a user in walking on his/her own, a cart that assists elderly people in walking and that can carry baggage, and a hand cart.

(B) In the first embodiment and the second embodiment, the evaluation speeds are calculated through integration. However, the evaluation speeds may be calculated by a different method.

(C) In the walking assist device 85 according to the second embodiment, the drive control unit 40 detects the inclination angle of an inclined surface on which the walking assist device 85 is traveling using the three-axis acceleration/angular speed sensor 52. In the case where the walking assist device 85 is traveling on an inclined surface, the drive control unit 40 may adjust the load which is applied by the regenerated power collecting unit 65 and the motors 32R and 32L in accordance with the inclination angle of the inclined surface in each of the training modes 1, 3, and 4.

For example, in the case where the walking assist device 85 is traveling on an ascending inclined surface, the drive control unit 40 may decrease the load which is applied by the regenerated power collecting unit 65 and the motors 32R and 32L in accordance with the inclination angle with respect to a load corresponding to the time rate of the current walking state in each of the training modes 1, 3, and 4.

In the case where the walking assist device 85 is traveling on a descending inclined surface, the drive control unit 40 may increase the load which is applied by the regenerated power collecting unit 65 and the motors 32R and 32L in accordance with the inclination angle with respect to a load corresponding to the time rate of the current walking state in each of the training modes 1, 3, and 4. Consequently, the walking assist device 85 can make the load in each of the training modes 1, 3, and 4 constant even on an inclined surface, which allows effective training of the muscles of the legs desired to be trained.

(D) In the walking assist device 85 according to the second embodiment, the drive control unit 40 reads the walking distance, the walking time, or the elapsed time in each of the training modes 1, 3, and 4 from the operation history information 58. The drive control unit 40 may adjust the load which is applied by the regenerated power collecting unit 65 and the motors 32R and 32L in accordance with the walking distance, the walking time, or the elapsed time.

For example, in the case where the walking time in each of the training modes 1, 3, and 4 exceeds a predetermined time (e.g. about 15 minutes), the load which is applied by the regenerated power collecting unit 65 and the motors 32R and 32L may be decreased by about 50% to 30%. Consequently, the drive control unit 40 can change the magnitude of the load in accordance with the elapsed time in each of the training modes 1, 3, and 4, which allows effective training of the muscles of the legs in accordance with the fatigue thereof.

(E) In the walking assist device 85 according to the second embodiment, the drive control unit 40 may store the speed of forward travel which is detected by the travel speed acquisition unit 56R and the travel speed acquisition unit 56L in the RAM (not illustrated) as the walking speed of the user. The drive control unit 40 may change the load which is applied by the regenerated power collecting unit 65 and the motors 32R and 32L in accordance with the walking speed of the user in each of the training modes 1, 3, and 4.

For example, in the case where the walking speed of the user is high, that is, the travel speed of the walking assist device 85 is equal to or higher than a predetermined speed, e.g. equal to or higher than 3 km to 4 km per hour, in each of the training modes 1, 3, and 4, the load which is applied by the regenerated power collecting unit 65 and the motors 32R and 32L may be increased by about 30% to 50% with respect to a load corresponding to the time rate of the current walking state. For example, in the case where the walking speed of the user is low, that is, the travel speed of the walking assist device 85 is lower than a predetermined speed, e.g. lower than 1 km per hour, in each of the training modes 1, 3, and 4, the load which is applied by the regenerated power collecting unit 65 and the motors 32R and 32L may be decreased by about 30% to 50% with respect to a load corresponding to the time rate of the current walking state.

Consequently, the drive control unit 40 can reduce the load when the walking speed of the user is low in each of the training modes 1, 3, and 4, and increase the load when the walking speed of the user is high, which allows further effective training of the muscle of the legs desired to be trained.

(F) The walking assist device 85 according to the second embodiment may store gait cycle/muscle activity correlation information 103 illustrated in FIG. 32 in the storage unit (muscle activity correlation information storage unit) 44, in place of the muscle-specific load pattern storage section 44B of the storage unit 44, for example.

In step S1024, the drive control unit 40 reads the selected target muscle to be trained from the RAM again. Subsequently, the drive control unit 40 may prepare a muscle-specific load pattern intended to train the target muscle to be trained on the basis of the "intensity of muscle activity" of the target muscle to be trained which is stored in the gait cycle/muscle activity correlation information 103, store the prepared muscle-specific load pattern in the RAM (not illustrated) as the muscle-specific load pattern to be executed, and thereafter finish the sub process "training type select process".

The gait cycle/muscle activity correlation information 103 will be described with reference to FIG. 32. As illustrated in FIG. 32, the gait cycle/muscle activity correlation information 103 stores a plurality of muscle activity patterns 103A, 103B, . . . , etc. that represent the "intensity of muscle activity" with respect to the time rate of the walking state in one gait cycle for each muscle set for each of a plurality of types of muscles of the legs.

For example, the muscle activity pattern 103A represents the "intensity of muscle activity" with respect to the time rate of the walking state in one gait cycle for "tibialis anterior muscle". Specifically, in the muscle activity pattern 103A, with one gait cycle defined as a time rate of "100%", the intensity of muscle activity is abruptly increased when the time rate of the walking state in one gait cycle is about 50% to about 58% in the stance phase, and thereafter the intensity of muscle activity is abruptly decreased when the time rate is about 58% in the stance phase to about 63% in the swing phase.

The muscle activity pattern 103B represents the "intensity of muscle activity" with respect to the time rate of the walking state in one gait cycle for "soleus muscle". Specifically, in the muscle activity pattern 103B, with one gait cycle defined as a time rate of "100%", the intensity of muscle activity is increased when the time rate of the walking state in one gait cycle is about 20% to about 51% in the swing phase, and thereafter the intensity of muscle activity is abruptly decreased when the time rate is about 51% to about 53% in the swing phase.

Next, an example in which a muscle-specific load pattern intended to train the target muscle to be trained is prepared on the basis of the "intensity of muscle activity" of the target muscle to be trained which is stored in the gait cycle/muscle activity correlation information 103 will be described with reference to FIGS. 23 and 32.

For example, in the case where a muscle-specific load pattern 102D for "tibialis anterior muscle" illustrated in FIG. 23 is to be prepared, the drive control unit 40 first determines the time rate of the muscle activity pattern 103A for "tibialis anterior muscle" illustrated in FIG. 32 as the time rate of the walking state in one gait cycle of the right leg. The drive control unit 40 then prepares a load pattern for the right leg in which the load is abruptly increased when the time rate is about 50% to about 58% and thereafter the load is abruptly decreased when the time rate is about 58% to about 63% (see the muscle-specific load pattern 102D in FIG. 23).

Subsequently, the drive control unit 40 may prepare a load pattern for the left leg in which the load is abruptly increased when the time rate is about 0% to about 8% and thereafter the load is abruptly decreased when the time rate is about 8% to about 13% by delaying the load pattern for the right leg by half a cycle, and store the prepared load pattern for the left leg in the RAM (not illustrated) as the muscle-specific load pattern 102D for "tibialis anterior muscle". That is, the drive control unit 40 may prepare a muscle-specific load pattern 102D for "tibialis anterior muscle" by superposing the load pattern for the right leg and the load pattern for the left leg on each other, and store the prepared muscle-specific load pattern 102D in the RAM (not illustrated).

Consequently, the user can select the muscle of the legs on the muscle-specific training select screen 88C in step S1022 to step S1023 to automatically prepare a muscle-specific load pattern to be executed by the drive control unit 40, which allows effective training of the selected muscles of the right leg and the left leg.

The walking assist device 85 according to the second embodiment may include a communication device (not illustrated) that can communicate with an external server (not illustrated) or the like via the Internet or the like. An external server (not illustrated) may be configured to store the gait cycle/muscle activity correlation information 103 illustrated in FIG. 32.

In step S1024, the drive control unit 40 reads the selected target muscle to be trained from the RAM again. Subsequently, the drive control unit 40 may be configured to acquire data on the "intensity of muscle activity" in the gait cycle/muscle activity correlation information 103 corresponding to the target muscle to be trained from an external server or the like via a communication device (not illustrated). After that, the drive control unit 40 may prepare a muscle-specific load pattern intended to train the target muscle to be trained on the basis of the "intensity of muscle activity" of the target muscle to be trained which is acquired from the external server or the like, store the prepared muscle-specific load pattern in the RAM (not illustrated) as the muscle-specific load pattern to be executed, and thereafter finish the sub process "training type select process".

An external server (not illustrated) or the like may perform machine learning (supervised learning) using a large amount of data that contain combinations of the time rate of the walking state in one gait cycle for each of a plurality of types of muscles of the right leg and the left leg and the intensity of muscle activity with respect to the time rate of the walking state in one gait cycle. The external server or the like may learn the characteristics of the combinations of the large amount of data, and generate the muscle activity patterns 103A, 103B, etc. for each muscle with respect to the time rate of the walking state in one gait cycle which constitute the gait cycle/muscle activity correlation information 103 illustrated in FIG. 32.

(G) The walking assist device 85 according to the second embodiment uses a numerical index defined as "0%" to "100%" as an index for the time rate that indicates what phase in one gait cycle the walking state of the legs corresponds to, for example. However, character data (symbol data) such as "stance phase" and "swing phase" illustrated in FIG. 21 may also be used. For example, the time rate of the walking state in one gait cycle of the legs may be determined as being in the "early stance phase" in one gait cycle.

Matching of non-numerical or non-symbolic data such as images or the like may be used as an index that indicates what phase in one gait cycle the walking state of the legs corresponds to. Matching of non-numerical or non-symbolic data may be achieved by storing image data on the walking state of the legs at each phase in one gait cycle illustrated in FIG. 21 in the storage unit 44 in advance, collating the walking image of the user which is input from the camera 55, and determining the time rate of the walking state in one gait cycle in accordance with what image data in one gait cycle the input walking image is most similar to, for example. Characteristic amounts (such as the contour of the legs, for example) extracted from an image or generated through conversion may be used, rather than the image data of the walking state themselves. Non-numerical or non-symbolic data other than images may be used as long as it is possible to identify what phase in one gait cycle the walking state corresponds to.

(H) In the walking assist device 85 according to the second embodiment, for example, as illustrated in FIG. 21, a period from the start point at which the right heel contacts the ground to the end point at which the right heel contacts the ground again is defined as one gait cycle of the right leg. However, the present invention is not limited thereto, and the start point and the end point may be set to different walking states. The drive control unit 40 may determine the time rate of the walking state in one gait cycle of the left leg, rather than one gait cycle of the right leg, with a period from the start point at which the left heel contacts the ground to the end point at which the left heel contacts the ground again defined as one gait cycle of the left leg.

What is claimed is:

1. A walking assist device comprising:
a frame;
an arm portion provided on the frame and having a grasp portion that is graspable by a user;
a plurality of wheels provided at a lower end of the frame and including at least one drive wheel;
a drive unit that drives the drive wheel to cause the walking assist device to travel forward or rearward;
a battery that serves as a power source for the drive unit;
a drive control unit that controls the drive unit; and
an operation mode switching unit, wherein:
the walking assist device travels forward or rearward together with the user who walks while grasping the grasp portion; and
the operation mode switching unit switches between a training mode, in which a load is applied to operation of a body of the user performed as the user walks, and an assist mode, in which a load on operation of the body of the user performed as the user walks is alleviated.

2. The walking assist device according to claim 1, further comprising:

a state detection unit that detects at least one of a state of the grasp portion, a state of the walking assist device, a body state of the user, and an atmospheric state around the user; and a load amount/assist amount change unit that changes a magnitude of the load on the basis of a detection signal from the state detection unit in the training mode, and that changes a magnitude of an assist force on the basis of the detection signal from the state detection unit in the assist mode.

3. The walking assist device according to claim 2, wherein in the assist mode, the load amount/assist amount change unit calculates an assist force with which the operation of the body of the user performed as the user walks is equivalent to operation in a no-load state, or an assist force that is larger by a predetermined amount than the assist force with which the operation of the body of the user performed as the user walks is equivalent to the operation in the no-load state.

4. The walking assist device according to claim 2, wherein:
the state detection unit includes at least one of detection units including
a grasp portion state detection unit that detects the state of the grasp portion,
a vehicle body state detection unit that detects the state of the walking assist device including an operation history of the walking assist device,
a body state detection unit that detects the body state including a body information history of the user, and
an atmospheric state detection unit that detects the atmospheric state around the user; and
the load amount/assist amount change unit changes the magnitude of the load on the basis of a detection signal from the at least one of the detection units in the training mode, and changes the magnitude of the assist force on the basis of the detection signal from the at least one of the detection units in the assist mode.

5. The walking assist device according to claim 4, wherein:
the arm portion has
a pair of right and left handle guide units provided on the frame so as to extend along a front-rear direction of the frame, and
movable handles provided on the respective handle guide units so as to be movable in the front-rear direction along the handle guide units, the movable handles each serving as the grasp portion;
the grasp portion state detection unit has
a movable handle movement amount detection unit that detects at least one of an arm position, an arm swing speed, and an arm swing width at a time when the user walks while grasping the movable handles and swinging his or her arms, and
a movable handle acting force detection unit that detects a movable handle acting force with which the user pushes forward and pulls rearward the movable handles which are grasped by the user; and
the state of the grasp portion is calculated on the basis of the at least one of the arm position, the arm swing speed, the arm swing width, and the movable handle acting force.

6. The walking assist device according to claim 4, wherein:
the grasp portion has a pair of right and left fixed handles fixed to the frame;

the grasp portion state detection unit has a fixed handle acting force detection unit that detects a fixed handle acting force with which the user pushes forward and pulls rearward the fixed handles which are grasped by the user; and
the state of the grasp portion is calculated on the basis of the fixed handle acting force.

7. The walking assist device according to claim 4, wherein the load amount/assist amount change unit has a learning unit that adjusts a magnitude of the load in the training mode, and adjusts a magnitude of the assist force in the assist mode, on the basis of at least one of
the atmospheric state around the user which is detected using the atmospheric state detection unit,
the operation history of the walking assist device which is detected using the vehicle body state detection unit, and
the body state and the body information history of the user which are detected using the body state detection unit.

8. The walking assist device according to claim 2, wherein:
the state detection unit has
an operation state detection unit that detects an operation state of arms or legs of the user, and
a walking state determination unit that determines a time rate of a walking state in one gait cycle, which is index information that represents a phase in one gait cycle, on the basis of the operation state of the arms or the legs which is detected by the operation state detection unit; and
in the training mode, the load amount/assist amount change unit changes a magnitude of the load in accordance with the time rate of the walking state in one gait cycle which is determined by the walking state determination unit.

9. The walking assist device according to claim 8, wherein the walking state determination unit determines the time rate of the walking state in one gait cycle of one of the legs on the basis of the operation state of the arms or the legs which is detected by the operation state detection unit.

10. The walking assist device according to claim 8, wherein:
the arm portion has
a pair of right and left handle guide units provided on the frame so as to extend along a front-rear direction of the frame, and
movable handles provided on the respective handle guide units so as to be movable in the front-rear direction along the handle guide units, the movable handles each serving as the grasp portion;
the operation state detection unit has a movable handle movement amount detection unit that detects at least one of an arm position, an arm swing speed, and an arm swing width at a time when the user walks while grasping the movable handles and swinging his or her arms; and
in the case where at least one of the arm position, the arm swing speed, and the arm swing width is detected by the movable handle movement amount detection unit, the walking state determination unit determines the time rate of the walking state in one gait cycle on the basis of the at least one of the arm position, the arm swing speed, and the arm swing width which is detected by the movable handle movement amount detection unit.

11. The walking assist device according to claim 10, further comprising:
- a pair of movable handle drive units that move a pair of the movable handles in the front-rear direction along the handle guide units, wherein
- the load amount/assist amount change unit changes the magnitude of the load by driving the pair of movable handle drive units and the drive unit in the training mode.

12. The walking assist device according to claim 8, wherein:
- the operation state detection unit has an imaging unit provided on the frame to image the legs of the user, or an acceleration sensor that is carried by the user; and
- the walking state determination unit determines the time rate of the walking state in one gait cycle on the basis of a state of the legs which are imaged by the imaging unit or an acceleration measured by the acceleration sensor.

13. The walking assist device according to claim 8, wherein:
- the training mode includes a plurality of training types in which the load is applied in accordance with a load pattern set in correspondence with one gait cycle for each of a plurality of types of muscles of the legs; and
- the load amount and assist amount change unit
  - has a selection reception unit that receives selection of one of the plurality of training types, and
  - changes a magnitude of the load in accordance with the time rate of the walking state in one gait cycle which is determined by the walking state determination unit in accordance with the load pattern corresponding to the one of the training types which is received by the selection reception unit in the training mode.

14. The walking assist device according to claim 8, wherein
- the load amount and assist amount change unit sets a first load corresponding to the time rate of the walking state in one gait cycle with one-leg support in which only one foot contacts a ground to be larger than a second load corresponding to the time rate of the walking state in one gait cycle with two-leg support in which two feet contact the ground.

15. The walking assist device according to claim 2, wherein:
- the training mode includes a plurality of training types in which the load is applied in accordance with a load pattern set in advance; and
- the load amount/assist amount change unit
  - has a selection reception unit that receives selection of one of the plurality of training types, and
  - changes the magnitude of the load in accordance with the load pattern corresponding to the one of the training types which is received by the selection reception unit in the training mode.

* * * * *